United States Patent
Tyleshevski et al.

(10) Patent No.: US 11,177,088 B2
(45) Date of Patent: Nov. 16, 2021

(54) MOTOR CONTROL CENTER (MCC) UNITS WITH DUAL DISCONNECT SWITCHES, DUAL OPERATOR HANDLES, RETRACTABLE POWER CONNECTOR AND INTERLOCKS

(71) Applicant: Eaton Intelligent Power Limited, Dublin (IE)

(72) Inventors: Nicholas Tyleshevski, Hope Mills, NC (US); Brian Sidle, Smithfield, NC (US); William Purnell, Parkton, NC (US)

(73) Assignee: Eaton Intelligent Power Limited, Dublin (IE)

( * ) Notice: Subject to any disclaimer, the term of this patent is extended or adjusted under 35 U.S.C. 154(b) by 48 days.

(21) Appl. No.: 16/795,702

(22) Filed: Feb. 20, 2020

(65) Prior Publication Data
US 2020/0273639 A1     Aug. 27, 2020

Related U.S. Application Data

(60) Provisional application No. 62/955,560, filed on Dec. 31, 2019, provisional application No. 62/808,969, filed on Feb. 22, 2019.

(51) Int. Cl.
*H01H 9/24* (2006.01)
*H02B 1/36* (2006.01)
(Continued)

(52) U.S. Cl.
CPC .............. *H01H 9/24* (2013.01); *H01H 9/22* (2013.01); *H02B 1/36* (2013.01); *H02B 11/133* (2013.01);
(Continued)

(58) Field of Classification Search
CPC ........ H01H 9/24; H01H 9/22; H01H 71/0228; H01H 71/1009; H02B 1/36; H02B 11/133; G05G 1/04
(Continued)

(56) References Cited

U.S. PATENT DOCUMENTS

| | | | |
|---|---|---|---|
| 1,838,898 A | 12/1931 | Aldeen | |
| 2,042,886 A | 6/1936 | Ferguson | |

(Continued)

FOREIGN PATENT DOCUMENTS

| | | |
|---|---|---|
| CN | 108539647 A | 9/2018 |
| DE | 10033643 A1 | 1/2002 |

(Continued)

OTHER PUBLICATIONS

Arc-flash—the threat that is real, Freedom Arc Resistant Motor Control Center, product brochure, Eaton (2 pages) (Mar. 2014).
(Continued)

*Primary Examiner* — Edwin A. Leon
(74) *Attorney, Agent, or Firm* — Myers Bigel, P.A.

(57) ABSTRACT

Motor control centers have units or buckets with an extendable/retractable power connection (stab) assembly and one or more operating lever interlocks that include a unit latch to latch to a cabinet and a power connection position interlock that blocks the handles of the units or buckets based on position of the power connection assembly, optionally also including a shutter cam that slides a shutter right and left.

20 Claims, 38 Drawing Sheets

(51) Int. Cl.
  *H01H 9/22* (2006.01)
  *H02B 11/133* (2006.01)
  *H01H 71/02* (2006.01)
  *H01H 71/10* (2006.01)
  *G05G 1/04* (2006.01)
(52) U.S. Cl.
  CPC ............ *G05G 1/04* (2013.01); *H01H 71/0228* (2013.01); *H01H 71/1009* (2013.01)
(58) Field of Classification Search
  USPC ...... 200/50.02; 361/338, 339, 344, 390, 391
  See application file for complete search history.

(56) References Cited

U.S. PATENT DOCUMENTS

| | | |
|---|---|---|
| 2,809,085 A | 10/1957 | Fall |
| 2,914,707 A | 11/1959 | Timmerman |
| 2,921,998 A | 1/1960 | Pokorny et al. |
| 3,203,575 A | 8/1965 | Anderson et al. |
| 3,479,104 A | 11/1969 | Kobryner |
| 4,024,441 A | 5/1977 | Coyle et al. |
| 4,086,452 A | 4/1978 | Collins |
| 4,090,230 A | 5/1978 | Fuller et al. |
| 4,206,944 A | 6/1980 | Kumagai et al. |
| 4,371,223 A | 2/1983 | Grunert et al. |
| 4,486,815 A | 12/1984 | Takahashi |
| 4,503,408 A | 3/1985 | Mrenna et al. |
| 4,612,424 A | 9/1986 | Clark et al. |
| 4,754,367 A | 6/1988 | Bohnen |
| 4,789,919 A | 12/1988 | Cox et al. |
| 4,806,710 A | 2/1989 | Kalvaitis et al. |
| 4,835,350 A | 5/1989 | Ozu et al. |
| 4,926,286 A | 5/1990 | Maki et al. |
| 5,006,682 A | 4/1991 | Sloff et al. |
| 5,343,355 A | 8/1994 | Ishikawa |
| 5,609,244 A | 3/1997 | Reiter |
| 5,625,531 A | 4/1997 | Padilla et al. |
| 5,910,760 A | 6/1999 | Malingowski et al. |
| 6,031,192 A | 2/2000 | Liebetruth |
| 6,087,602 A | 7/2000 | Bernier et al. |
| 6,194,983 B1 | 2/2001 | Bogdon et al. |
| 6,284,989 B1 | 9/2001 | Bernier et al. |
| 6,423,913 B1 | 7/2002 | Gupta et al. |
| 6,437,262 B1 | 8/2002 | Gupta et al. |
| 6,689,968 B2 | 2/2004 | Trivette et al. |
| 6,711,001 B2 | 3/2004 | Hernandez et al. |
| 6,943,999 B2 | 9/2005 | Gray et al. |
| 7,186,933 B2 | 3/2007 | Turner |
| 7,420,133 B2 | 9/2008 | Farrow et al. |
| 7,510,223 B2 | 3/2009 | Malkowski, Jr. et al. |
| 7,684,199 B2 | 3/2010 | Yee et al. |
| 7,688,572 B2 | 3/2010 | Yee et al. |
| 7,800,888 B2 | 9/2010 | Morris et al. |
| 7,965,493 B2 | 6/2011 | Leeman et al. |
| 7,987,555 B2 | 8/2011 | Chen et al. |
| 8,108,971 B2 | 2/2012 | Florek |
| 8,198,557 B2 | 6/2012 | Lee et al. |
| 8,199,022 B2 | 6/2012 | Morris et al. |
| 8,243,422 B2 | 8/2012 | Leeman et al. |
| 8,248,761 B2 | 8/2012 | Leeman et al. |
| 8,294,051 B2 | 10/2012 | Park et al. |
| 8,305,736 B2 | 11/2012 | Yee et al. |
| 8,395,064 B2 | 3/2013 | Kim et al. |
| 8,511,510 B2 | 8/2013 | Pratte et al. |
| 8,537,518 B2 | 9/2013 | Morris et al. |
| 8,590,106 B2 | 11/2013 | Lu |
| 8,710,390 B2 | 4/2014 | Kim |
| 8,791,362 B2 | 7/2014 | Kumar |
| 8,817,454 B2 * | 8/2014 | Morris .................... H05K 7/02 361/614 |
| 8,891,229 B2 | 11/2014 | Fischer-Carne et al. |
| 8,934,218 B2 | 1/2015 | Morris |
| 8,952,252 B2 | 2/2015 | Bugaris et al. |
| 9,153,947 B2 | 10/2015 | Fleitmann et al. |
| 9,451,718 B2 | 9/2016 | Oneufer et al. |
| 9,466,965 B2 | 10/2016 | Lehtola et al. |
| 9,472,369 B2 | 10/2016 | Dozier et al. |
| 9,531,169 B2 | 12/2016 | Oneufer et al. |
| 9,607,784 B2 | 3/2017 | Benke et al. |
| 9,805,881 B2 | 10/2017 | Richards et al. |
| 9,825,439 B2 | 11/2017 | Yang et al. |
| 9,831,645 B2 | 11/2017 | Espinosa Gutierrez et al. |
| 9,843,174 B2 | 12/2017 | Cieply et al. |
| 9,859,068 B2 | 1/2018 | Oneufer et al. |
| 9,871,356 B2 | 1/2018 | Bellows et al. |
| 9,882,358 B2 | 1/2018 | Kim |
| 9,888,589 B2 | 2/2018 | Oneufer et al. |
| 10,020,642 B2 | 7/2018 | Oneufer et al. |
| 10,186,847 B2 | 1/2019 | Kroushl et al. |
| 10,211,606 B2 | 2/2019 | Kroushl et al. |
| 10,211,609 B2 | 2/2019 | Kim et al. |
| 10,320,162 B2 | 6/2019 | Oneufer et al. |
| 10,637,217 B2 | 4/2020 | Oneufer et al. |
| 10,720,761 B2 | 7/2020 | Kroushl et al. |
| 10,742,004 B2 | 8/2020 | Kroushl et al. |
| 2008/0022673 A1 | 1/2008 | Morris et al. |
| 2008/0023211 A1 | 1/2008 | Yee et al. |
| 2008/0258667 A1 | 10/2008 | Morris et al. |
| 2009/0086414 A1 | 4/2009 | Yee et al. |
| 2012/0064746 A1 | 3/2012 | Bellows et al. |
| 2013/0077210 A1 | 3/2013 | Morris |
| 2013/0088812 A1 | 4/2013 | Yee et al. |
| 2014/0362498 A1 | 12/2014 | Morris et al. |
| 2015/0103472 A1 | 4/2015 | Oneufer et al. |
| 2015/0221458 A1 | 8/2015 | Oneufer et al. |
| 2015/0380910 A1 * | 12/2015 | Oneufer ............... H01H 71/128 361/622 |
| 2015/0382492 A1 | 12/2015 | Oneufer et al. |
| 2017/0063056 A1 | 3/2017 | Oneufer et al. |
| 2017/0155234 A1 | 6/2017 | Benke et al. |
| 2017/0264085 A1 | 9/2017 | Cieply et al. |
| 2018/0083426 A1 | 3/2018 | Ali et al. |
| 2018/0083513 A1 | 3/2018 | Pharne |
| 2018/0084662 A1 | 3/2018 | Pharne |
| 2018/0096803 A1 | 4/2018 | Blochouse et al. |
| 2019/0190240 A1 * | 6/2019 | Kroushl ............... H05K 7/1414 |

FOREIGN PATENT DOCUMENTS

| | | |
|---|---|---|
| EP | 0109544 | 5/1984 |
| EP | 0308868 A2 | 3/1989 |
| FR | 2747877 | 10/1997 |
| FR | 2814321 | 3/2002 |
| JP | 599459 | 1/1984 |
| JP | S62175635 U | 11/1987 |
| JP | 2011234542 | 11/2011 |
| KR | 20110087155 A | 8/2011 |
| WO | 2014010110 A1 | 1/2014 |
| WO | 2015047236 | 4/2015 |
| WO | 2015047307 | 4/2015 |
| WO | 2019120622 | 6/2019 |

OTHER PUBLICATIONS

"Centerline® 2100 SecureConnect™: Help Reduce Exposure to Electrical Shock and Hazards" Product Information Sheet, Allen-Bradley www.rockwellautomation.com (4 pages) (2017).

Drawings/Views of internal components of an MCC (Flashgard) unit sold by Eaton, Inc. at least as early as 2012 (6 pages).

"Evolution E9000* MCC with AFM Arc Flash Mitigation Units for Low-Voltage Motor Control" Fact Sheet, GE Industrial Solutions (2 pages) (2014).

International Search Report and the Written Opinion of the International Searching Authority corresponding to International Patent Application No. PCT/IB2015/054355 (17 pages) (dated Oct. 26, 2015).

International Search Report and the Written Opinion of the International Searching Authority corresponding to International Patent Application No. PCT/IB2015/054356 (11 pages) (dated Aug. 19, 2015).

(56) References Cited

OTHER PUBLICATIONS

International Search Report and the Written Opinion of the International Searching Authority corresponding to International Patent Application No. PCT/US2017/057802 (15 pages) (dated Jan. 19, 2018).

International Search Report and the Written Opinion of the International Searching Authority corresponding to International Patent Application No. PCT/EP2018/025324 (8 pages) (dated Mar. 7, 2019).

Invitation to Pay Additional Fees for related PCT Application No. PCT/IB2015/054355 (6 pages) (dated Aug. 19, 2015).

* cited by examiner

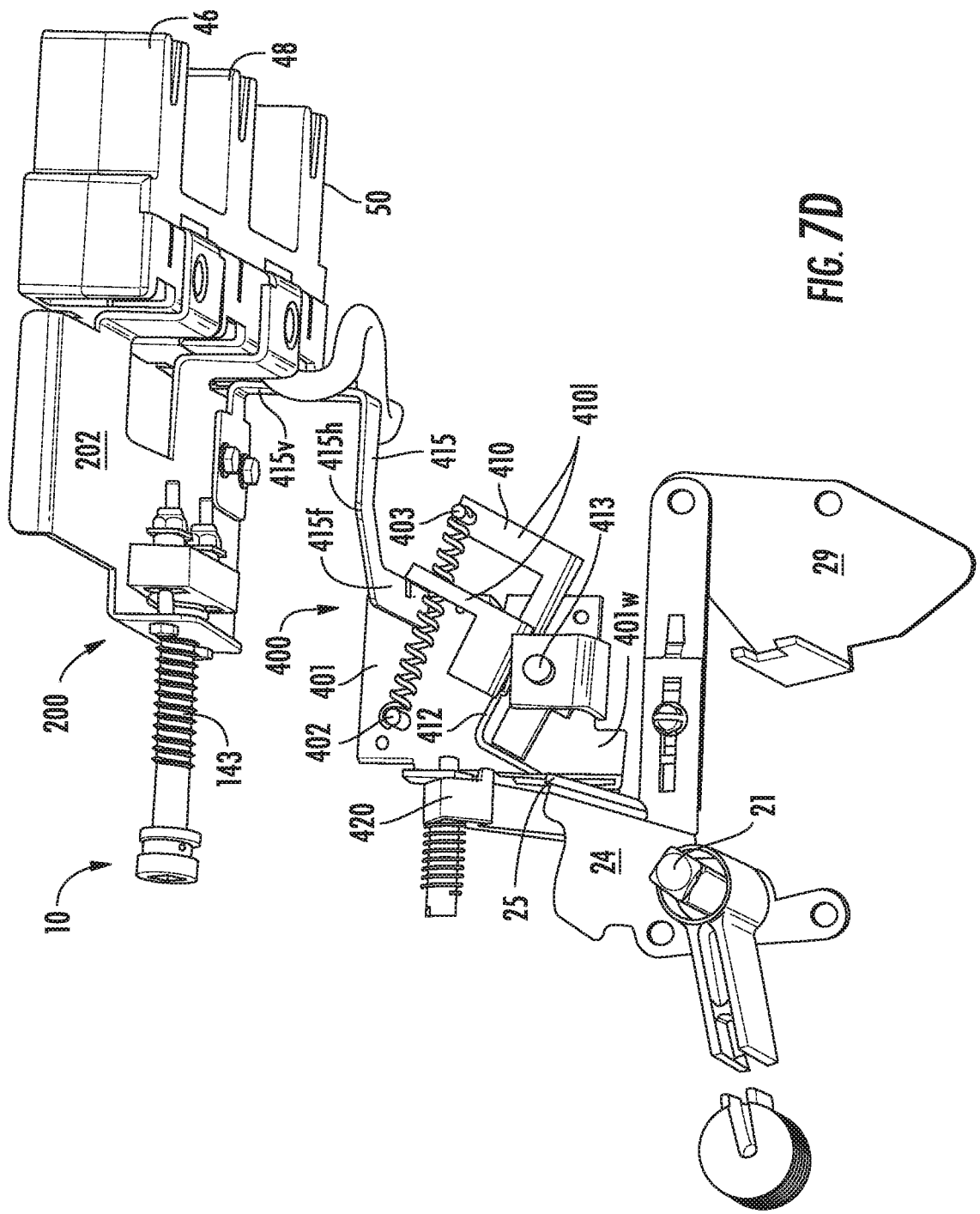

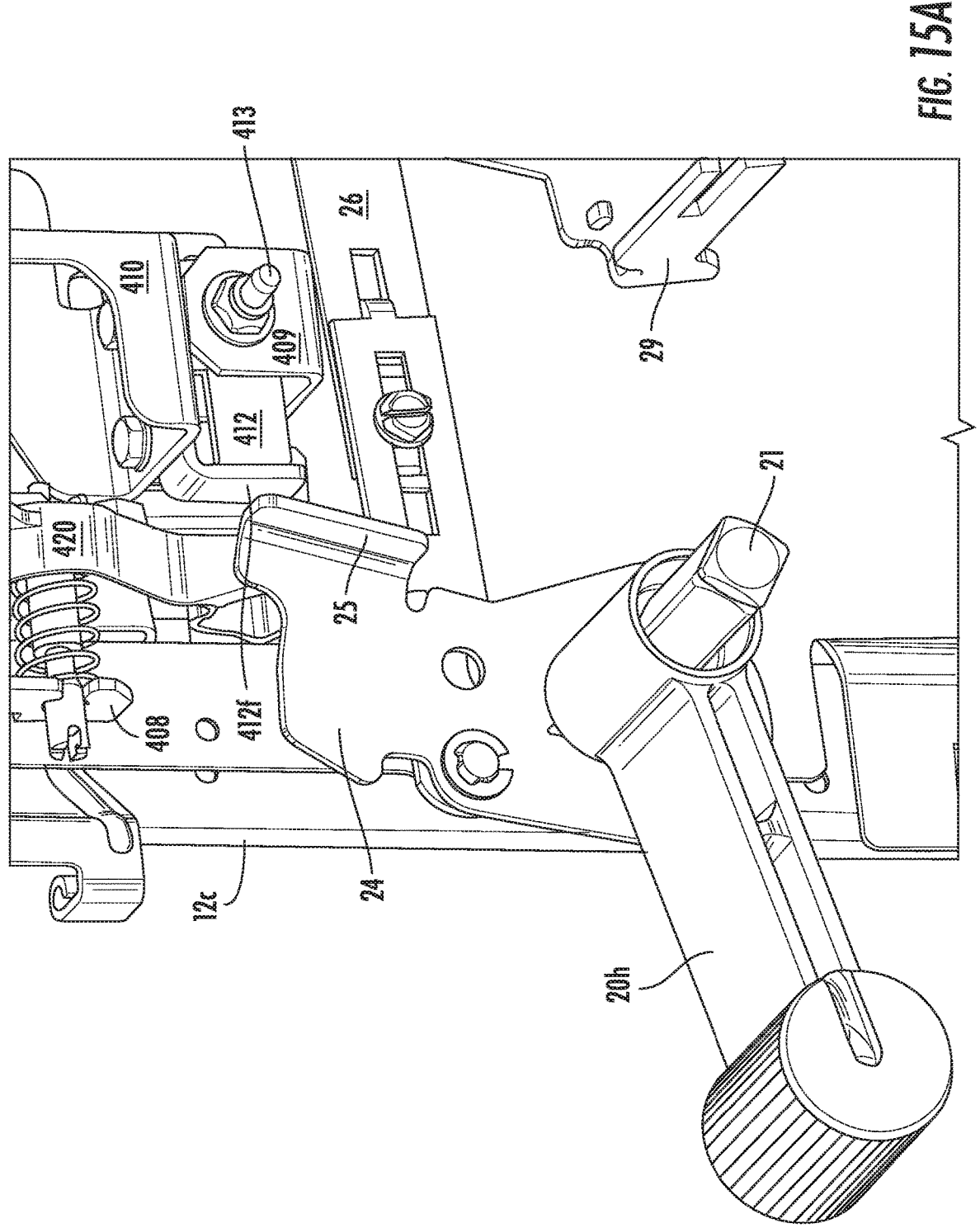

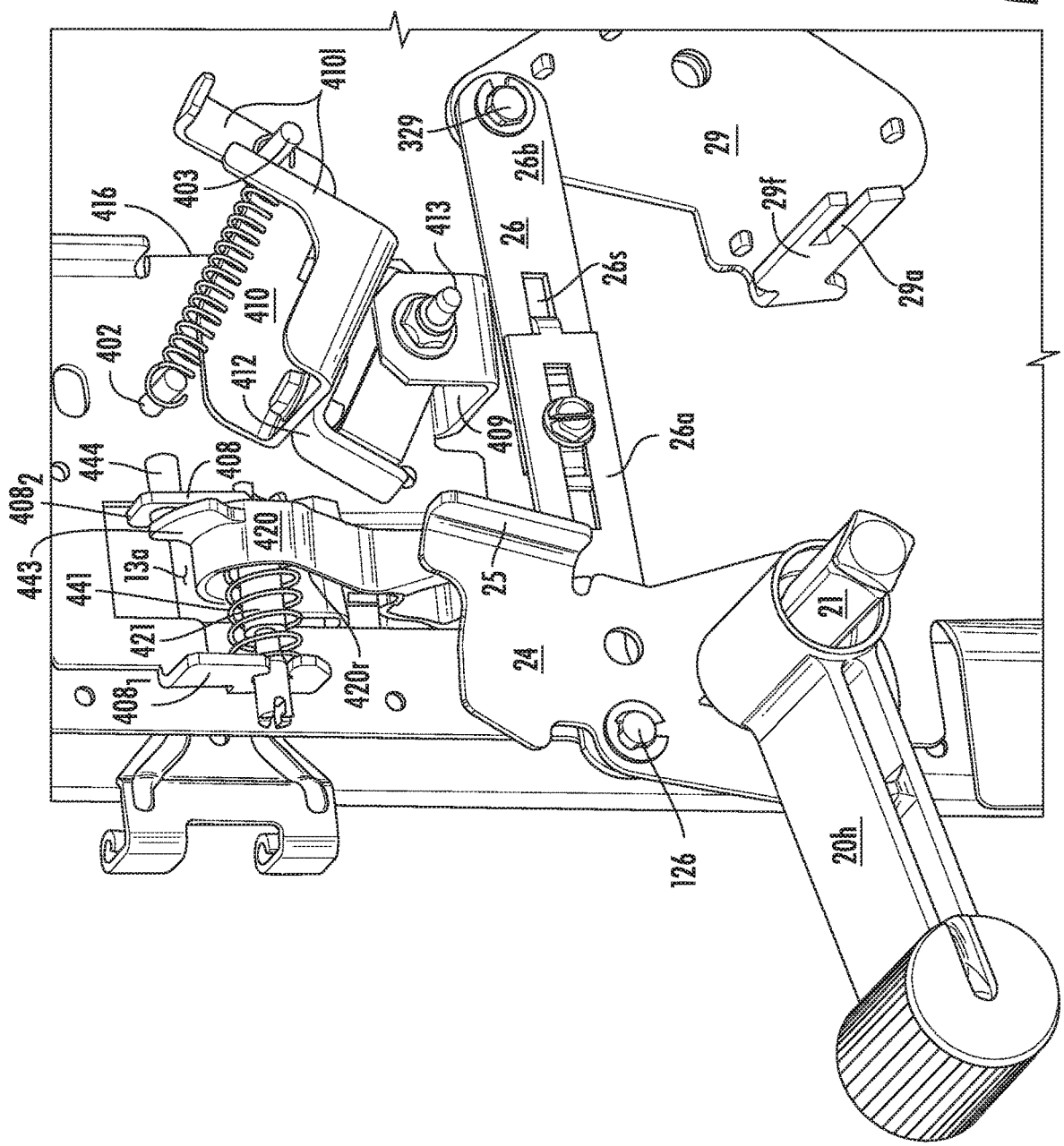

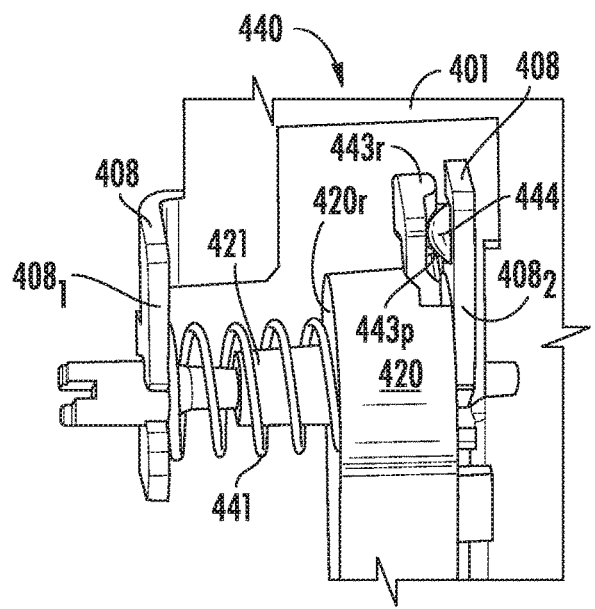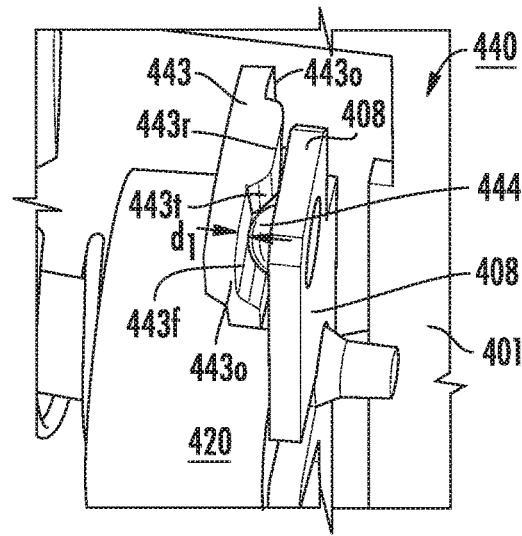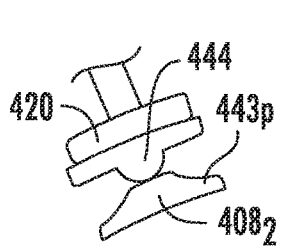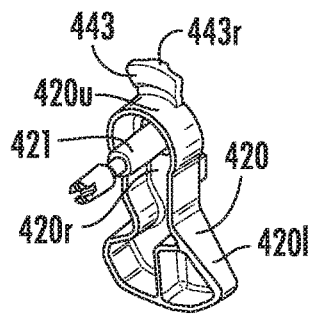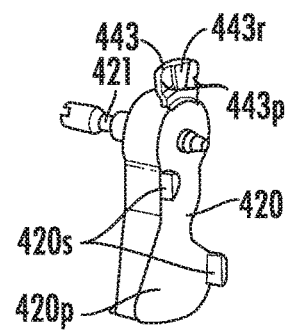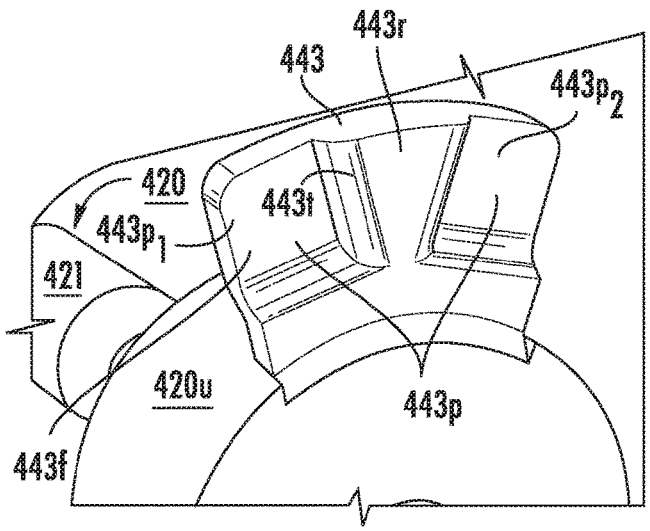

MOTOR CONTROL CENTER (MCC) UNITS WITH DUAL DISCONNECT SWITCHES, DUAL OPERATOR HANDLES, RETRACTABLE POWER CONNECTOR AND INTERLOCKS

RELATED APPLICATIONS

This patent application claims the benefit of and priority to U.S. Provisional Application Ser. No. 62/808,969, filed Feb. 22, 2019, and U.S. Provisional Application Ser. No. 62/955,560, filed Dec. 31, 2019, the contents of which are hereby incorporated by reference as if recited in full herein.

FIELD OF THE INVENTION

The present invention relates to motor control systems and more particularly to motor control center units.

BACKGROUND OF THE INVENTION

As is known to those of skill in the art, a Motor Control Center (MCC) can include cabinets or enclosures that hold multiple, typically modular, bucket assemblies of various sizes. See, e.g., U.S. Pat. No. 4,024,441, the contents of which are hereby incorporated by reference as if recited in full herein. Eaton Corporation has recently introduced an MCC product line with compact bucket assemblies that conveniently plug into a slot or space in an MCC cabinet. The product is sold under the product name, Freedom 2100 MCC. See also, U.S. Patent Application Publication Serial Number US2013/0077210, the contents of which are hereby incorporated by reference as if recited in full herein.

MCCs are used, for example, in some commercial and industrial applications to distribute electrical power to a variety of loads (e.g., without limitation, relatively high power electrical motors, pumps, and other loads).

The bucket assemblies (also known as "buckets" or "units") can include respective handles that are disposed on the front door. See, e.g., U.S. Pat. Nos. 6,194,983 and 7,186,933, the contents of which are incorporated by reference as if recited in full herein. FIG. 1, for example, shows a portion of a prior art motor control center 100. The motor control center 100 includes a multi-compartment enclosure 12 (also referred to as a cabinet) with sidewalls 12w for receiving a plurality of motor control units 10. Typically, each bucket 10 is a removable, pull-out unit that has a respective door 22 (which may be under a front panel). The door 22 is typically coupled to the enclosure housing 12 by hinges 28 (shown in phantom line drawing in FIG. 1) to permit access to motor control components of the bucket 10 while it is installed in the enclosure 12. For example and without limitation, the door 22 can permit access to a disconnect circuit assembly 30, a stab indicator 32, a shutter indicator 34, and a line contact actuator 36. When the bucket 10 is fully installed and electrically connected, a user-operator may operate the disconnect handle 20h.

In a de-energized state of the motor control center 100, the user-operator may operate an isolation feature by moving a slide 140 and inserting crank 42 through an access portal or hole 43 in a cover of the bucket to access the line contact actuator or leadscrew 143 to move a number of electrical connectors with line contacts (see, for example, stab power contacts "S" or 46,48,50 of the prior art bucket 10 of FIG. 2) to an isolated position out of (see FIG. 2) electrical contact with power lines or buses of the motor control center 100. Motor control centers and units therefor (also sometimes called "subunits") are described in greater detail, for example, in commonly assigned U.S. Patent Application Publications 2009/0086414, 2008/0258667, 2008/0023211 and 2008/0022673, which are hereby incorporated herein by reference.

Despite the above, there remains a need for alternate bucket configurations.

SUMMARY OF EMBODIMENTS OF THE INVENTION

Embodiments of the invention provide bucket assemblies, i.e., units, with a power connector position interlock and a pivoting latch interlock member that latches to a cabinet, both of which can independently interlock the operator handles.

Embodiments of the invention are directed to a bucket assembly that includes: a unit housing having a front and opposing laterally spaced apart sidewalls; a first operator handle supported by the unit housing that faces the front of the unit housing; a second operator handle supported by the unit housing that faces the front of the unit housing and that is laterally spaced apart from the first operator handle; a first laterally extending shaft attached to the first operator handle and that resides inside the unit housing; a first handle cam attached to the first operator handle and that resides inside the unit housing; a second laterally extending shaft attached to the second operator handle and that resides inside the unit housing; a second handle cam attached to the second operator handle and that resides inside the unit housing; a power connection assembly held in the unit housing, the power connection assembly comprising power connectors movable between power connection extended and retracted positions; and a power connection position interlock in the unit housing, wherein the power connection position interlock is coupled to the power connection assembly and engages the first and second handle cams to block the first and second handle cams from movement toward an ON position when the power connection assembly is in the retracted position.

Embodiments of the invention are directed to bucket assemblies that include: a unit housing having a front and opposing laterally spaced apart sidewalls; a first operator handle supported by the unit housing that faces the front of the unit housing; a second operator handle supported by the unit housing that faces the front of the unit housing and that is laterally spaced apart from the first operator handle; a first laterally extending shaft attached to the first operator handle and that resides inside the unit housing; a first handle cam attached to the first operator handle and that resides inside the unit housing; a second laterally extending shaft attached to the second operator handle and that resides inside the unit housing; a second handle cam attached to the second operator handle and that resides inside the unit housing; and a power connection assembly held in the unit housing. The power connection assembly has power connectors movable between power connection extended and retracted positions. The bucket assemblies also include a power connection position interlock in the unit housing. The power connection position interlock is coupled to the power connection assembly and engages the first and second handle cams to block the first and second handle cams from movement toward an ON position when the power connection assembly is in the retracted position.

The bucket assembly can further include a coupler attached to a carriage of the power connection assembly that is configured to pivot a laterally extending pivot plate of the power connection position interlock when the power connection assembly is in the extended position to unblock the first and second handle cams to allow movement toward the ON position. The laterally extending pivot plate can have a laterally extending length that is greater than a laterally extending width of one disconnect switch and less than a laterally extending width between the sidewalls of the unit housing.

The bucket assembly can further include first and second spaced apart disconnect switches, the first disconnect switch coupled to the first operator handle and the second disconnect switch coupled to the second operator handle. The bucket assembly can also include an intermediate wrapper that resides between the first and second disconnect switches in the unit housing. The intermediate wrapper can be parallel to the sidewalls of the unit housing and can have a front edge that is forward of the first and second disconnect switches. The power connection position interlock can include a laterally extending pivot plate that is pivotably attached to the intermediate wrapper. The laterally extending pivot plate can be configured to concurrently engage the first and second handle cams of the power connection position interlock to block the first and second handle cams from movement toward the ON position when the power connection assembly is in the retracted position.

The intermediate wrapper can have a top portion with first and second laterally spaced apart wall segments. A fixation member can be attached to the first and second wall segments and an innermost end portion of the pivot plate.

The bucket assembly can further include a unit latch having a unit latch body configured to pivot between a first extended position to extend out of one of the sidewalls of the unit housing and a second retracted position to reside inside the unit housing. The unit latch can further include a laterally extending linkage wherein the laterally extending linkage has opposing first and second end portions. The first end portion can be coupled to the unit latch body and the second end portion can reside adjacent the second handle cam in the unit housing.

The bucket assembly can further include first and second spaced apart disconnect switches, the first disconnect switch can be coupled to the first operator handle and the second disconnect switch can be coupled to the second operator handle. The bucket assembly can also include an intermediate wrapper that resides between the first and second disconnect switches in the unit housing. The intermediate wrapper can be parallel to the sidewalls of the unit housing and can have a front edge that is forward of the first and second disconnect switches. The bucket assembly can also include a unit latch assembly having a first unit latch and a laterally spaced apart second unit latch. The first unit latch and the second unit latch can be configured to pivot in concert whereby the first unit latch blocks the first operator handle from movement and the second unit latch blocks the second operator handle from movement when the first unit latch is in a retracted position inside the unit housing.

The bucket assembly can have a bracket coupled to the intermediate wrapper and coupled to the second unit latch. The bracket can be configured to allow the second unit latch to pivot in clockwise and counterclockwise directions. When the first unit latch is in an extended position associated with the first unit latch extending out of one of the sidewalls confirming an installed bucket assembly placement in a cabinet, the first unit latch allows the first operator handle to move to an ON position and the second unit latch allows the second operator handle to move to an ON position.

The bucket assembly can have an externally accessible screw facing the front of the unit housing and coupled to the first unit latch. A user can rotate the externally accessible screw in a first direction to extend the first unit latch out of the sidewall to a latched position whereby the second unit latch concurrently pivots to a first position. A user can rotate the externally accessible screw in a second opposing direction to retract the first unit latch into the unit housing to the retracted position whereby the second unit latch concurrently pivots to a second position.

The first unit latch and the second unit latch can each have a shaft that is orthogonal to the first and second laterally extending shafts of the first and second operator handles. The first and second unit latches can each have a body with a curvilinear perimeter, upper and lower portions and a shoulder residing between the upper and lower portions. The shoulders can be attached to the laterally extending linkage to couple the opposing end portions of the laterally extending linkage to the first and second unit latches.

The bucket assembly can include first and second spaced apart disconnect switches, the first disconnect switch can be coupled to the first operator handle and the second disconnect switch can be coupled to the second operator handle. The first and second operator handles can pivot vertically between a first position associated with the ON position (power conduction) and a second position associated with an OFF position (no power conduction).

The bucket assembly can also include a unit latch subsystem with a first unit latch and a laterally spaced apart second unit latch residing inside the unit housing, the first unit latch comprising a shaft and the second unit latch having a coupling feature. The unit latch subsystem can also include a laterally extending linkage coupled to the first and second unit latches.

The shaft of the first unit latch can be orthogonal to the first and second laterally extending shafts of the first and second operator handles. The first and second unit latches can be configured to pivot between latched and unlatched positions. In the latched position, the first unit latch can be configured to latch to a cabinet of a motor control center (MCC). When the bucket assembly is installed in the cabinet of the MCC (a) if either of the first and second disconnect switches are in the ON state with the first and second operator handles in the first position, the unit latch is in the latched position and the bucket assembly cannot be disengaged from the cabinet and (b) if both of the first and second disconnect switches are in the OFF state with the first and second operator handles in the second position, the unit latch can be disengaged from the cabinet by a user rotating an externally accessible slot of a shaft coupled to the first unit latch whereby the first and second unit latches pivot in concert to the unlatched position.

Each of the first and second handle cams can have a plate with a curvilinear perimeter and a laterally inward extending ledge that is orthogonal to the plate. The ledge of the first handle cam can contact a first unit latch of a unit latch subsystem and the ledge of the second handle cam can contact a second unit latch of the unit latch subsystem when the unit latch is in the unlatched position.

The power connection assembly can further include an internal lead screw that faces the front of the unit housing.

The bucket assembly can also include first and second spaced apart disconnect switches, the first disconnect switch coupled to the first operator handle and the second disconnect switch coupled to the second operator handle. The first and second operator handles can pivot vertically between a first position associated with the ON position and a second position associated with an OFF position. The bucket assembly can further include a shutter with a shutter portal that is in front of the internal lead screw, closer to the front of the unit housing; a first shutter cam in the unit housing and coupled to the first operator handle and a second shutter cam in the unit housing and coupled to the second operator handle; and a biasing member coupled to one side of the shutter and the unit housing. When both the first and second shutter cams are disengaged from the shutter, the biasing member can mechanically slide the shutter laterally to align the shutter portal with the lead screw to thereby allow access to the lead screw. The first and second shutter cams can be configured to engage the shutter to slide the shutter portal laterally to block access to the lead screw if either of the first and second operator handles is in the ON position.

The biasing member can be or include a coil spring.

The shutter can have a primary body with the shutter portal and outwardly extending and laterally spaced apart first, second and third projections. The first projection can engage the first shutter cam, the second projection can engage the second shutter cam, and the third projection can be coupled to the biasing member.

In some embodiments, the bucket assembly can be provided as a plurality of bucket assemblies, all configured to be housed in a motor control center.

Other embodiments are directed to methods of operating a unit a Motor Control Center (MCC). The methods include providing a unit with a retractable/extendable power connection assembly, a unit latch and a power connection position interlock, both selectively in communication with first and second handle cams of respective first and second operator handles of the unit. The methods further include concurrently blocking movement of the first and second handle cams of the first and second operator handles of the unit by the unit latch if the unit latch is not engaged with a cabinet of the MCC; concurrently blocking movement of the first and second handle cams of the unit by the power connection position interlock if the power connection assembly is not in an extended position; rotating the unit latch from an unlatched position to a latched position whereby the unit latch engages the cabinet and allows the first and second handle cams to rotate inward past the unit latch; and pivoting the power connection position interlock in response to movement of a carriage of the power connector assembly to allow the first and second operator handles to rotate past the power connection interlock when the power connector assembly is in the extended position.

The unit latch and the power connection position interlock can both be coupled to a mount bracket attached to one sidewall of the unit. The unit latch can reside in front of the power connection position interlock, typically closer to a front of the unit. The pivoting of the power connection position interlock can be carried out by contacting an upwardly extending leg of the power connection position interlock with a coupler attached to a carriage of the power connection assembly. The blocking movement of the first and second handle cams of the unit by the power connection position interlock can be carried out by pivoting a pivot plate down so the pivot plate of the power connection position interlock concurrently blocks the first and second handle cams from rotation toward an On position.

The unit latch can include first and second laterally spaced apart unit latches that pivot in concert as the first unit latch pivots between a latched position and an unlatched position.

The first unit latch can be configured to pivot to extend outside the unit housing to engage the cabinet when in the latched position while the second unit latch resides entirely inside the unit housing. The first unit latch can block the first handle cam and the second unit latch blocks the second handle cam when the first unit latch is in the unlatched position.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIGS. 7C and 7D are partial, side perspective views of the power connector assembly shown in FIGS. 7A and 7B coupled to the power connector position interlock assembly shown in FIG. 6A according to embodiments of the present invention.

FIG. 8 shows the shutter positioned with a shutter portal providing access to the lead screw while FIG. 9 shows the shutter translated to block access according to embodiments of the present invention.

FIG. 15A is an enlarged partial side perspective view of a unit with the handle blocked by the power connector position interlock assembly when the power connectors are not extended according to embodiments of the present invention.

FIG. 15B is an enlarged partial side perspective view of a unit with the handle not blocked by the power connector position interlock assembly when the power connectors are extended according to embodiments of the present invention.

FIG. 19A is a side, perspective view of a portion of a unit latch assembly with a detent sub-assembly according to embodiments of the present invention.

FIG. 19B is a top, side perspective view of the unit latch assembly shown in FIG. 18A.

FIG. 19C is a top view of an alternate embodiment of the unit latch assembly shown in FIG. 19B according to embodiments of the present invention.

FIG. 20A is a front, side perspective view of a unit latch according to embodiments of the present invention.

FIG. 20B is a back, side perspective view of the unit latch shown in FIG. 19A.

FIG. 20C is a greatly enlarged back view of the upper portion of the unit latch shown in FIG. 20B.

DETAILED DESCRIPTION OF EMBODIMENTS OF THE INVENTION

Figure 1:
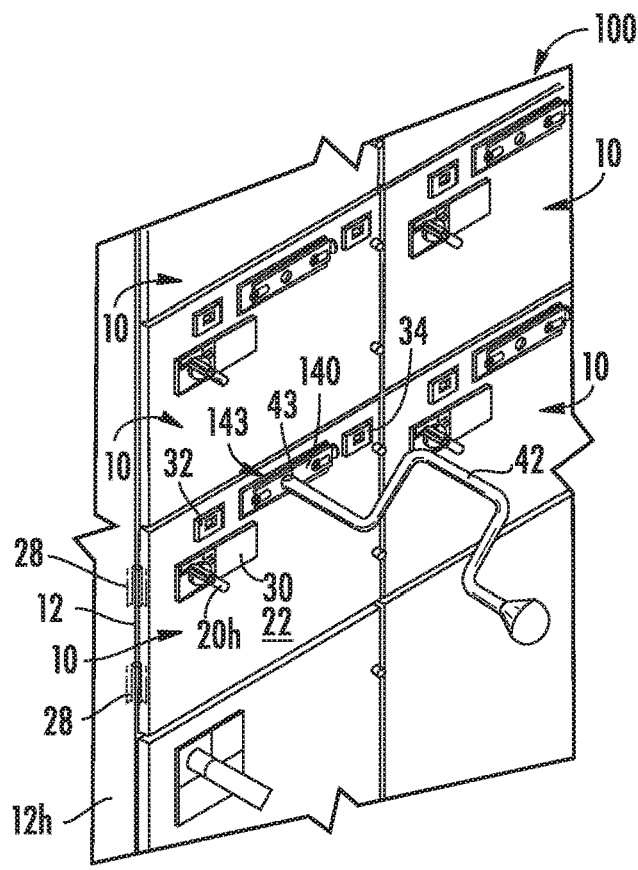
FIG. 1 is a partial front perspective view of an exemplary prior art Motor Control Center (MCC).

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10", 10'").

The term "Fig." (whether in all capital letters or not) is used interchangeably with the word "Figure" as an abbreviation thereof in the specification and drawings. In the figures, certain layers, components or features may be exaggerated for clarity, and broken lines illustrate optional features or operations unless specified otherwise. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "about" refers to numbers in a range of +/−20% of the noted value.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

In the present disclosure, the terms "bucket" or "unit" are used interchangeably and are intended to mean a motor control center unit that may be configured to be a removable modular unit capable of being installed behind individual or combined sealed doors on the motor control center enclosure. The unit may contain various motor control and motor protection components such as motor controllers, starters, contactor assemblies, overload relays, circuit breakers, motor circuit protectors, various disconnects, and similar devices for electric motors. The unit is configured to connect to a common power bus of the motor control center and conduct supply power to the line side of the motor control devices for operation of motors or feeder circuits.

Figure 2:
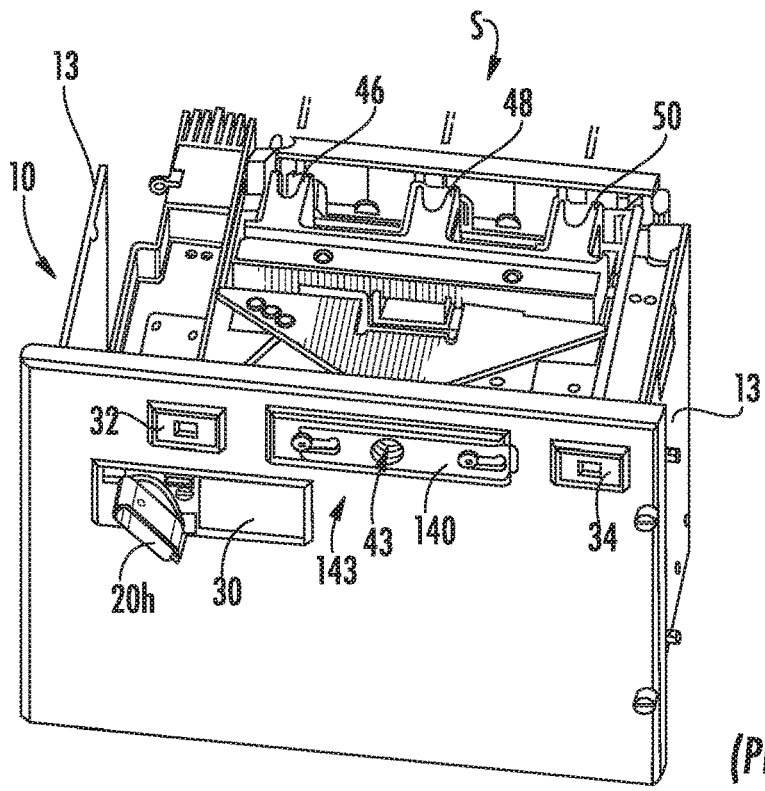
FIG. 2 is a top perspective view of an example of a prior art unit of the MCC shown in FIG. 1.

As discussed before, units may be configured as "starter units" for supplying power to and/or controlling electrical motors and pumps or as general "feeder units" for supplying feeder circuits. The terms "bucket assembly", "bucket" and "unit" are used interchangeably and refer to a structure (typically having sides of a protective metal shell) that contains either a switch with a fuse or a circuit breaker for turning power ON/On and OFF/Off to a motor, or feeder circuit, typically for controlling power to motor starters. As noted above, the bucket or unit can be a feeder unit or a starter unit. The bucket can include other components such as a power transformer, a motor starter to control a single motor and PLCs (programmable logic controllers), drives and the like. The bucket can be configured as a modular device to allow the internal components to be assembled as a unit that can be easily installed into a Motor Control Center (MCC) compartment. As is well known, the bucket 10 can have a bus grid with power stabs "S", shown as three power connectors 46, 48, 50 (FIG. 2) that can extend out of the back of the bucket 10 that connect to bus bars that carry power (current) to the compartments of a vertical section in an MCC cabinet 100 (FIG. 1). The bus bars are connected to larger horizontal bus bars that bring power to the vertical sections. The horizontal bus bars are usually in the top, but some MCC designs may have them in the center or bottom.

A "feeder unit" refers to a motor control center unit for supplying feeder circuits. A feeder unit may have one or more feeders or power supply lines to supply feeder circuits or devices. A feeder unit (also called a "feeder") can have a "line side", which refers to the side of the feeder configured to be directly or indirectly connected to the common power bus of the motor control center. A feeder can also have a "load side", which refers to the side of the feeder configured to be connected to and deliver current to a feeder circuit. A feeder may comprise a circuit breaker, a fuse and disconnect switch, or another configuration. The terms "feeder circuit" and "feeder device" are used interchangeably and are intended to mean circuits or devices connected to feeder units or "feeders".

A disconnect switch such as a "circuit breaker", "breaker", "disconnect switch and fuse", "molded case circuit breaker", "MCCB" are devices designed to open and close a circuit, typically allowing both manual open and close operation and automatic circuit interruption, the latter to open a circuit under certain conditions, e.g., an overcurrent. The disconnect switch can be for a motor starter unit or feeder unit, for example.

The terms "motor", "load", and "load device" are used interchangeably and are intended to mean devices bearing electrical load that are connected to and controlled by the motor control center. Load devices are typically motors but may also be pumps or other machinery that may comprise motors or pumps. Load devices may be connected to starter units.

The terms "operating mechanism" and "operator mechanism" are used interchangeably and refer to an assembly for moving contacts in a switching mechanism between first and second positions in a circuit and/or for opening and closing separable main contacts, in a disconnect circuit such as a circuit breaker or for turning power ON and OFF using a switch associated with a fuse as a disconnect.

MCCs usually have a wire way for wires from respective units 10 to the motors and other loads and control wires. U.S. Patent Application Publication 2013/0077210 describes an MCC with both right and left side wireways, the contents of which are hereby incorporated by reference as if recited in full herein. The wireways are typically provided as an enclosed space in an MCC cabinet proximate but outside stacked units. MCCs can be configured in many ways. Each compartment can have a different height to accept different frame sizes of respective bucket assemblies or units 10, typically in about 6-inch increments. The vertical bus can be omitted or not run through the full height of the section to accommodate deeper buckets for larger items like variable frequency drives. The MCC can be a modular cabinet system for powering and controlling motors or feeder circuits. Several may be powered from main switchgear which, in turn, gets its power from a transformer attached to the incoming line from the power company. A typical MCC cabinet is an enclosure with a number of small doors arranged in rows and columns along the front. The back and sides are typically flat and mostly featureless. The buckets can be provided in varying sizes. For starter units, the size can be based on the size of the motor they are controlling. The bucket assembly can be configured to be relatively easily removable for repair, service or replacement. MCCs can have regular starters, reversing starters, soft start, and variable frequency drives. MCCs can be configured so that sections can be added for expansion if needed. The buckets or units 10 of a motor control center 100 can have the same or different configurations.

Figure 3:
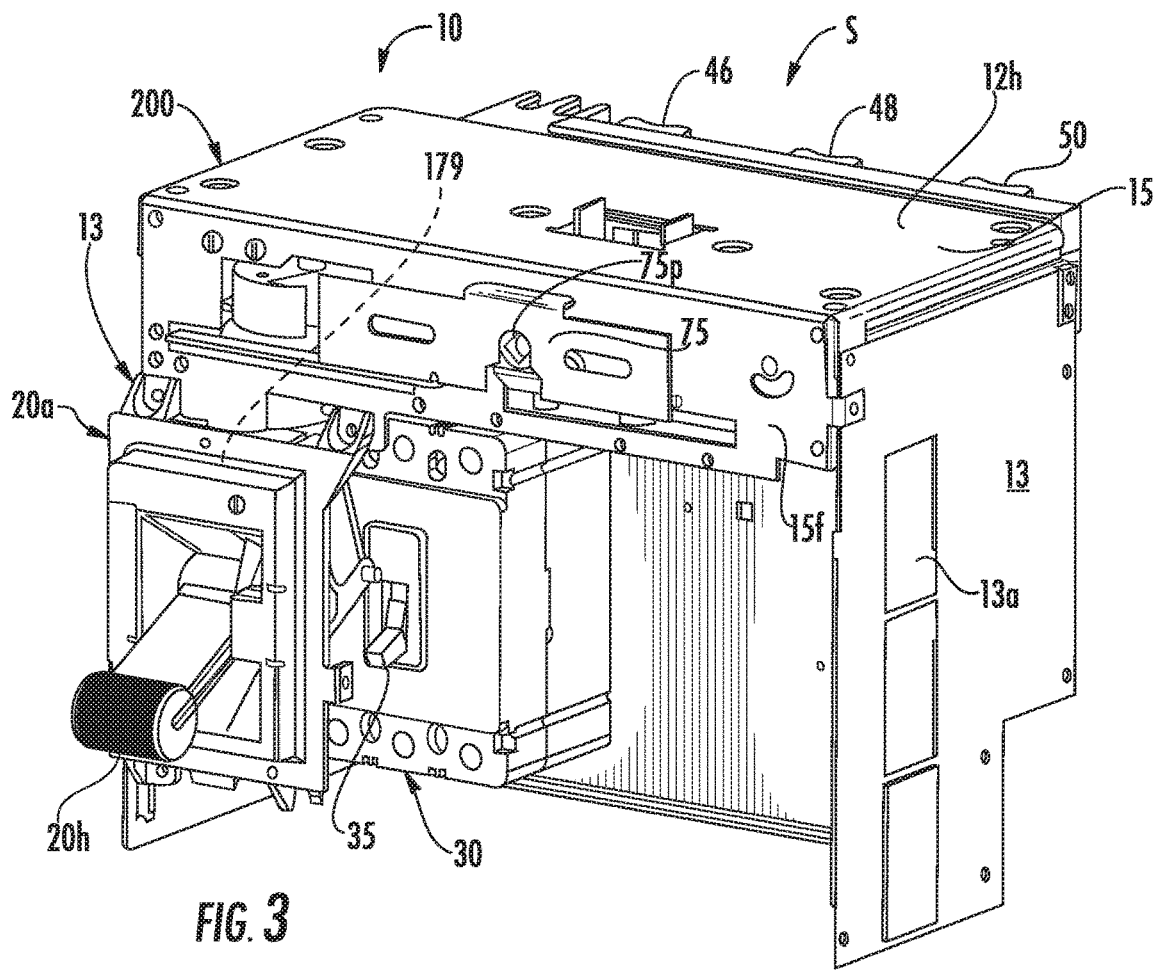
FIG. 3 is a front perspective view of an exemplary unit according to embodiments of the present invention.

The terms "right side" and "left side" refer to when the unit or MCC is viewed from the front, e.g., the front is associated with the unit 10 orientation shown in FIG. 3, for example, with the handle 20h facing forward and the disconnect connectors 46, 48, 50 facing rearward as shown.

The term "compact" refers to units 10 held in a condensed configuration (package) relative to conventional units/buckets. The MCC structure or cabinet 100 (FIG. 1) can be designed to receive multiple bucket units 10 ranging in various defined sizes. The units 10 can be provided in package or frame sizes of about 6 inches to about 72 inches (tall) with substantially common depth and width dimensions, known as 1X (6 inches) to 12X (72 inches) sizes. The sizes can be in single X increments, from 1X, 2X, 3X, 4X, 5X, 6X, 7X, 8X, 9X, 10X, 11X and 12X. Thus, a 5X MCC unit 10 can be about 30 inches tall. The frame sizes can be provided for a plurality of amperages, including a plurality of: 125 A, 150 A, 225 A, 250 A, 400 A, 600 A, 1200 A and 2000 A, for example. A unit 10 is typically about 7 inches deep but larger or smaller sizes may be appropriate in some embodiments.

Referring to FIG. 3, the unit 10 can have a handle assembly 20a with a handle 20h that can communicate with an internal shutter 75 residing adjacent, and typically above, the handle 20h. The term "handle" with respect to the operator handle input can interchangeably referred to as a "handle lever" or "lever operator" herein. The handle 20h can be provided as a vertical handle that moves up and down between first and second positions, typically ON and OFF positions associated with conduction and non-conduction, respectively. In other embodiments, the handle 20h can be provided as a rotary (circumferentially rotational) handle configuration. It is noted that the exemplary unit 10 is shown as a single feed, but may be a dual feed configuration, typically in side by side arrangements, but it is contemplated that vertically aligned handles 20h may also or alternatively be used with the respective circuits/switch assemblies 30 placed in the unit accordingly.

As shown in FIGS. 3 and 4A-4C, the bucket assembly or unit 10 includes a handle assembly 20a that cooperates with the shutter 75 and an operator mechanism 40 that engages the lever/toggle 35 of the switch assembly 30. As shown, for example, in FIGS. 3 and 5, the unit 10 also includes a retractable power connector assembly 200 with a lead screw 143 as will be discussed further below. The bucket assembly 10 can be configured for DC (direct current) or AC (alternating current) operation.

The handle assembly 20a can include a front cover plate 23 (which may also be referred to as a "housing") with a channel 23c that allows the handle lever 20h to pivot up and down between first and second positions, typically, but not limited to, ON and OFF positions. The front cover plate 23 can include visual indicia 23i (i.e., text) identifying the position of the handle 20h relative to the first and second positions of the switch (i.e., ON, OFF status) of the unit 10. The handle assembly 20a can include an internal cam 24, such as a shaped cam plate 24p that is attached to the handle 20h via a shaft 21. The shaft 21 can be orthogonal to the cam 24 and the handle lever 20h so that the handle lever 20h rotates along a common axis A-A with the cam plate 24.

As shown in FIG. 3, for example, the bucket assembly 10 can have a metal enclosure with sidewalls 13, and a metal ceiling 15. The metal ceiling 15 can extend down in a front direction to form a partial internal front upper wall 15f (the metal ceiling and partial front wall can also be referred to as a "top wrapper") that resides in front of the disconnect operator mechanism 40 and in front of the lever 35 of the disconnect circuit assembly 30. The partial front wall 15f can be a shaped front internal partial wall as an extension of the top or may be attached to the top as a separate component.

Figure 4A:
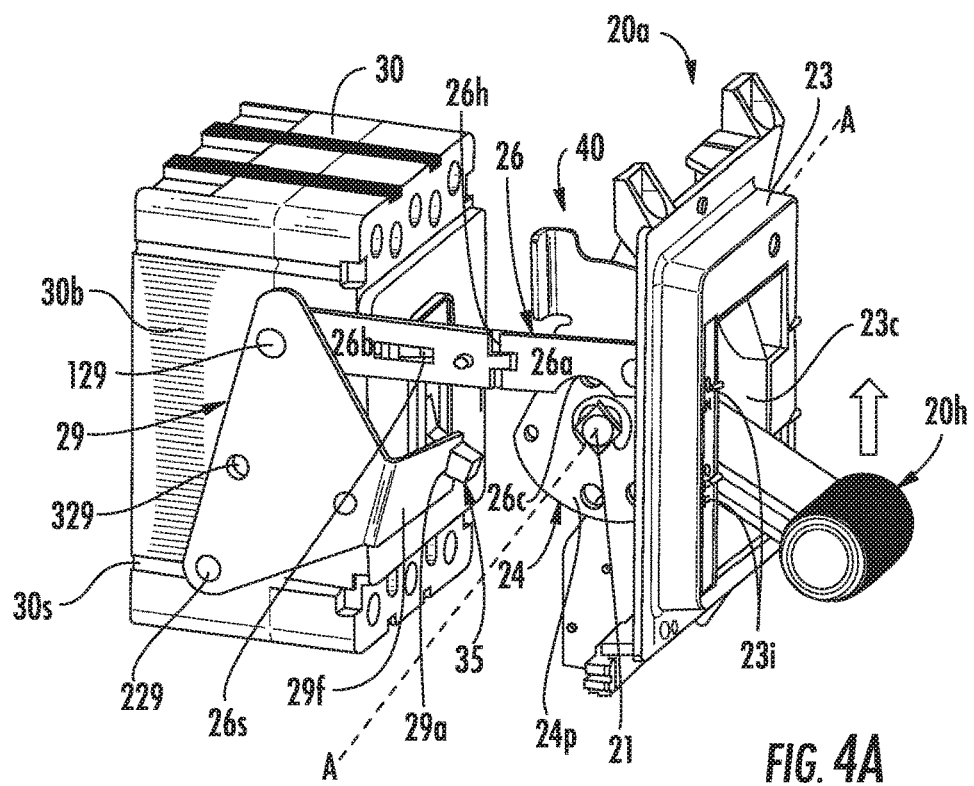
FIGS. 4A-4C are partial side perspective views of exemplary "OFF" (FIG. 4A), "ON" (FIG. 4B) and optional "TRIP" (FIG. 4C) operational positions of the handle assembly shown in FIG. 3 for the associated internal disconnect according to embodiments of the invention.
Figure 4B:
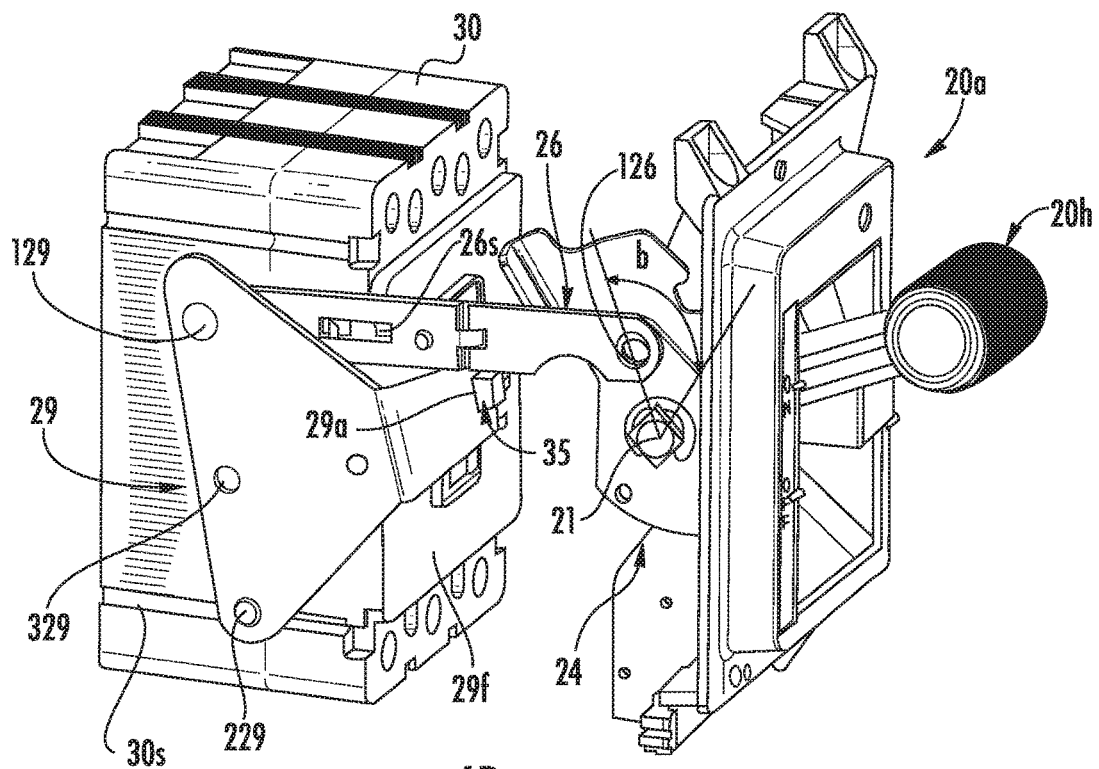
Figure 4C:
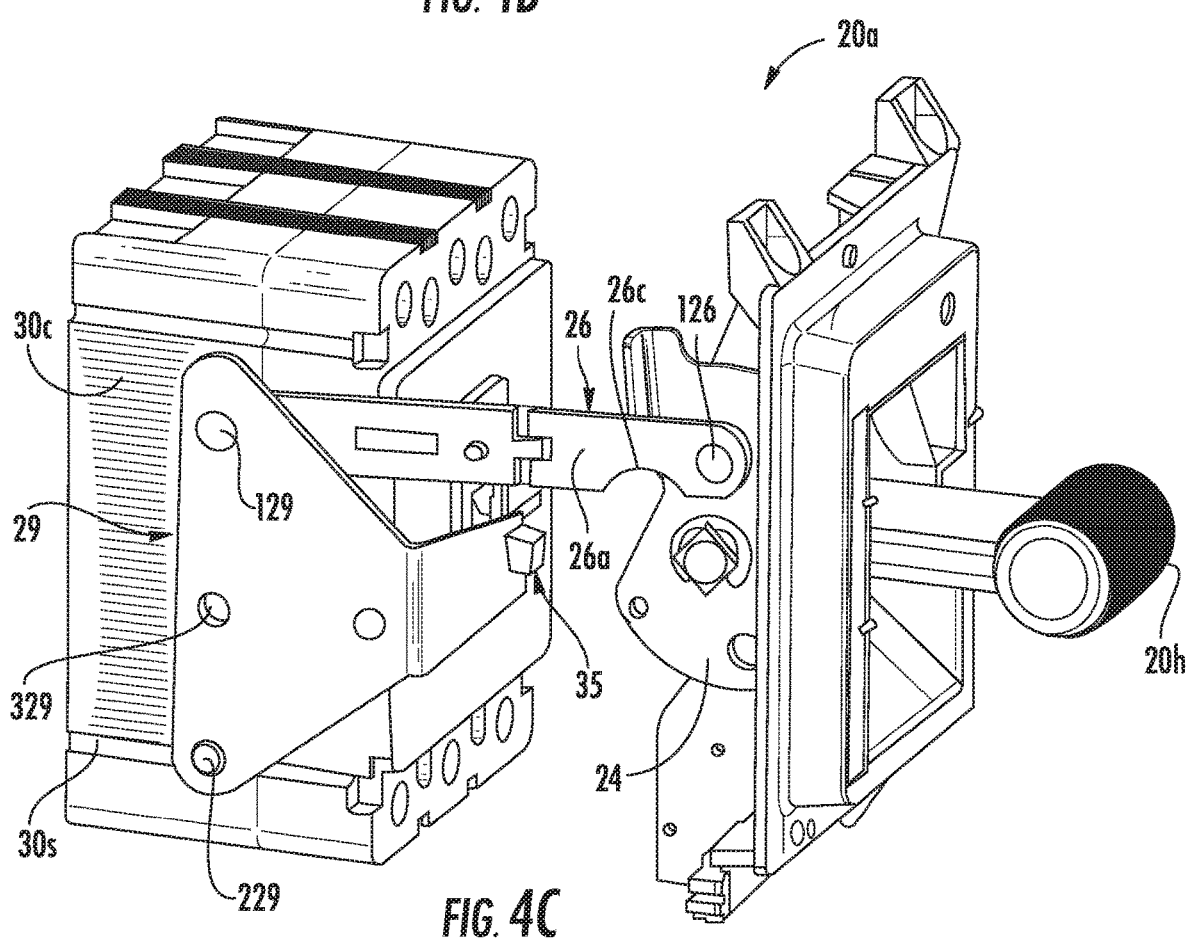

As shown in FIGS. 4A-4C, the cam plate 24p, pivot plate 29 and linkage 26 may be conventional components used in known buckets 10 with the handle assembly 20a modified as shown in FIG. 3, for example, and other figures as will be discussed further below.

The operator mechanism 40 can include a linkage 26 that is attached to the cam 24. The cam 24 can be attached to the linkage 26 via attachment member 126 that can reside on an upper end portion of the cam 24 above the shaft 21. The linkage 26 can extend inward and attach to a pivot plate 29 using an attachment member 129. The pivot plate 29 engages the lever of the disconnect switch assembly 30 to move the lever 35 between first and second positions, i.e., between ON and OFF positions.

The linkage 26 can optionally have an end portion that has an arcuate (curved) shape 26c that faces the shaft 21. The linkage 26 can comprise cooperating first and second links 26a, 26b which may be hingeably attached at hinge 26h. The innermost link 26b can comprise a slot 26s and the other link 26a can comprise the arcuate segment 26c.

The pivot plate 29 can be attached to a horizontally extending channel 30s via attachment member 229. Where used, and optionally, the attachment member 229 can move straight forward and rearward in the channel 30s in response to the opposite movement (rearward and forward movement) of the linkage 26. The channel 30s may be a slot directly formed in the sidewall of the body 30b or may be provided by a pair of rails or other members held by the (disconnect) switch assembly 30, typically at a lower sidewall of the body 30b. Also optionally and/or alternatively, the pivot plate 29 can be attached to the sidewall 13 (FIG. 3) of the bucket 10 via attachment member 329 to allow a pivoting motion of the pivot plate 29 relative to the sidewall 13 and does not require any connection to the slot nor any slot 30s in the body 30b.

The pivot plate 29 can have a side portion that merges into a front portion 29f that has a laterally extending front segment that may extend a partial distance over the front of the body 30b of the disconnect switch assembly 30 to engage the lever 35. The laterally extending front segment 29f can have an aperture 29a with upper and lower segments extending about the aperture 29a. The lever 35 extends through the aperture 29a a distance for secure engagement. The front segment 29f may alternatively extend entirely across the front of the body 30b (not shown). The aperture 29a can be an open gap or window or an open or closed slot in the wall of the laterally extending front segment 29f.

As shown in FIGS. 4A and 4B, lifting the handle lever 20h up from the first position a sufficient distance causes the cam 24 to rotate counterclockwise and push the lever 35 from the first position to the second position (typically from the OFF to the ON position). In the reverse, rotating the handle lever 20h down from the second position to the first position causes the lever 35 to rotate down to the first position. As shown in FIGS. 4A and 4B, the cam 24 can rotate at an angle "P" that is between about 30-45 degrees to move the linkage 26 inward a distance to pivot the pivot plate 29 upward to move the lever 35 upward to the second position (i.e., the ON position).

FIG. 4C illustrates an On to Trip configuration. If the breaker is in the On position and trips, the breaker lever 35 will rotate to the tripped position which drives the handle lever 20h to the tripped position which is the position shown in FIG. 4C, with the linkage 26 substantially horizontal (+/−10% of horizontal) and/or the handle 20h substantially horizontal (+/−10% of horizontal) or at least more horizontal relative to either the On or Off positions thereof.

Figure 5:
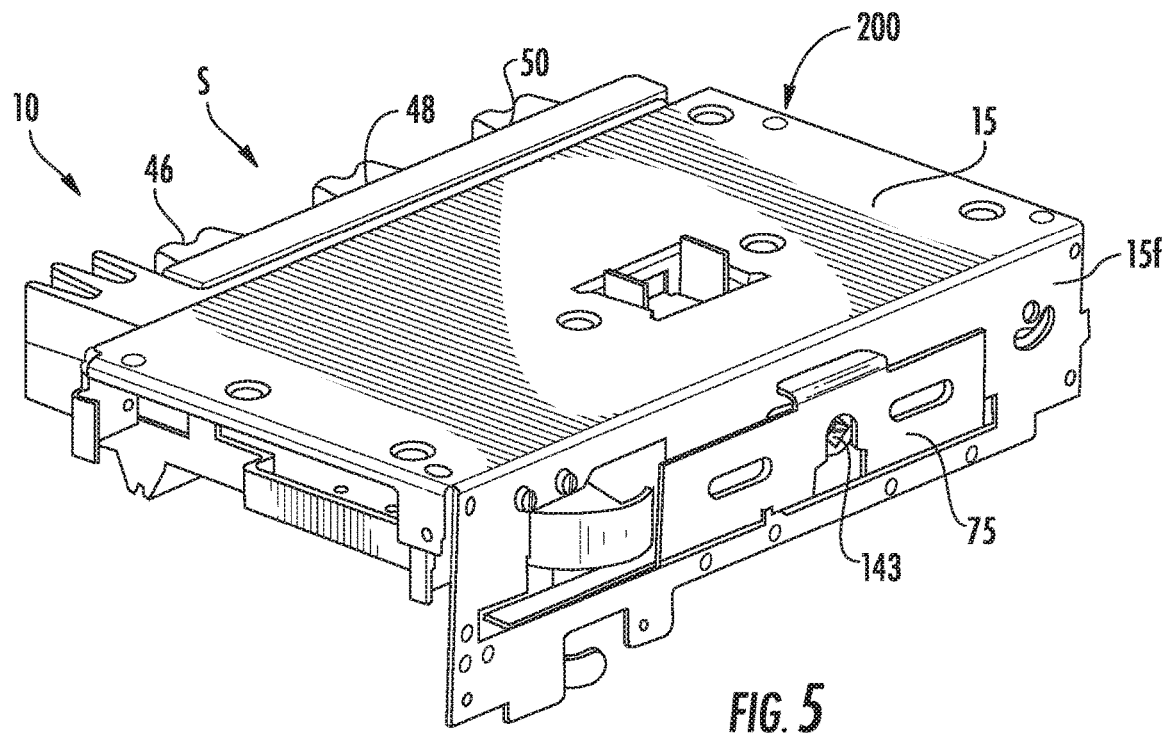
FIG. 5 is a front, side perspective view of a retractable power assembly for a unit and an internal slidable shutter with the external cover over the racking (stab isolation) portal omitted according to embodiments of the present invention.
Figure 7A:
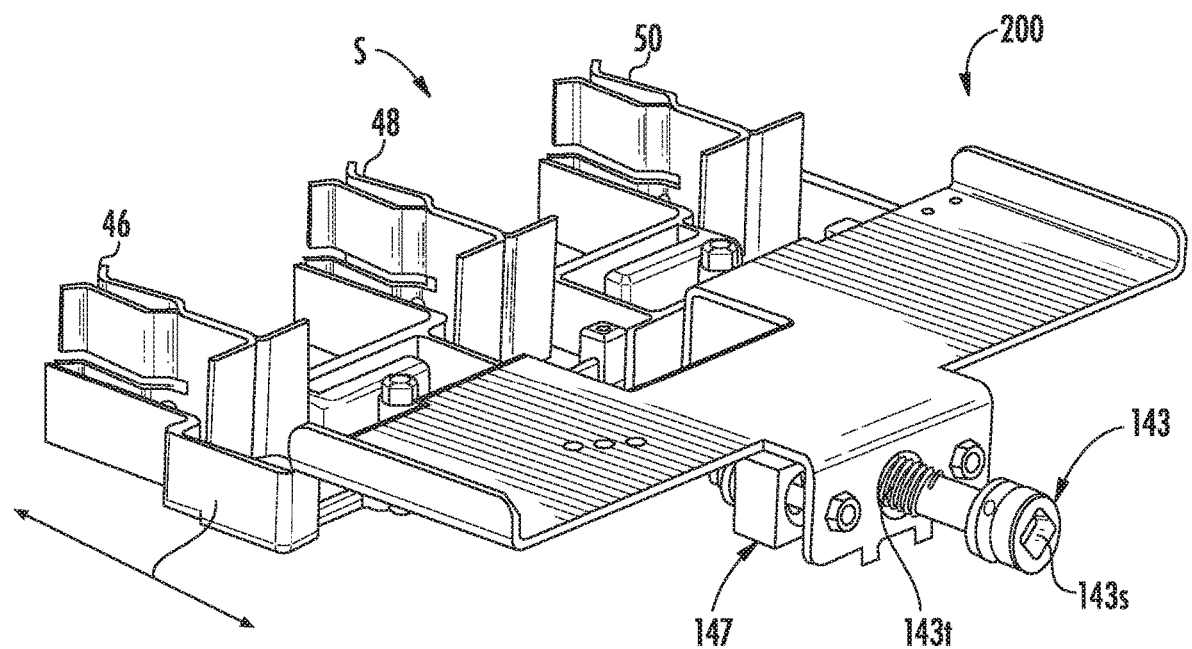
FIGS. 7A and 7B are front, side perspective views of the unit shown in FIG. 5 without the top cover illustrating a retractable/extendable power connector (stab) configuration (FIG. 7A shows the power connectors partially retracted and FIG. 7B shows them fully extended) according to embodiments of the present invention.
Figure 7B:
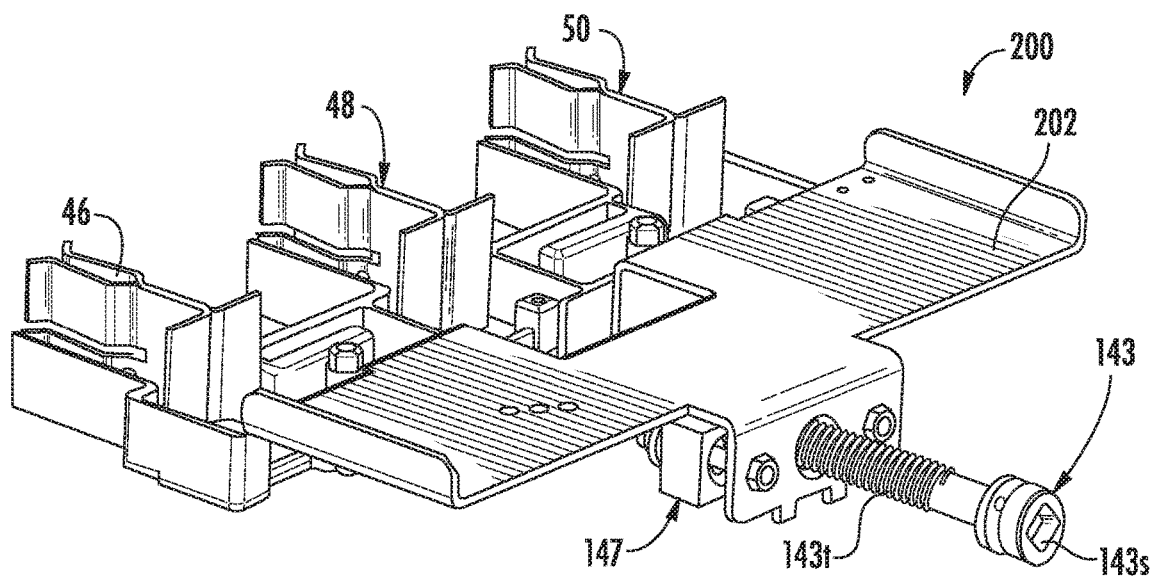

As shown in FIGS. 3 and 5, the unit 10 can comprise a retractable power connector assembly 200 with a carriage 202 (FIG. 7B) that holds the power connectors 46, 48, 50 which allows the operator to extend and retract the power connects 46, 48, 50 by rotating a lead screw 143 (FIGS. 7A, 7B). In order for the bucket 10 to be either installed into or removed from the cabinet 100, the power connectors 46, 48, 50 must be in the retracted position which isolates the bucket 10 from the bus bars. See, U.S. Pat. No. 7,668,572, the contents of which are hereby incorporated by reference as if recited in full herein. The unit 10 also includes the slidable shutter 75 with a portal 75p that can block external access to the lead screw 143.

Figure 6A:
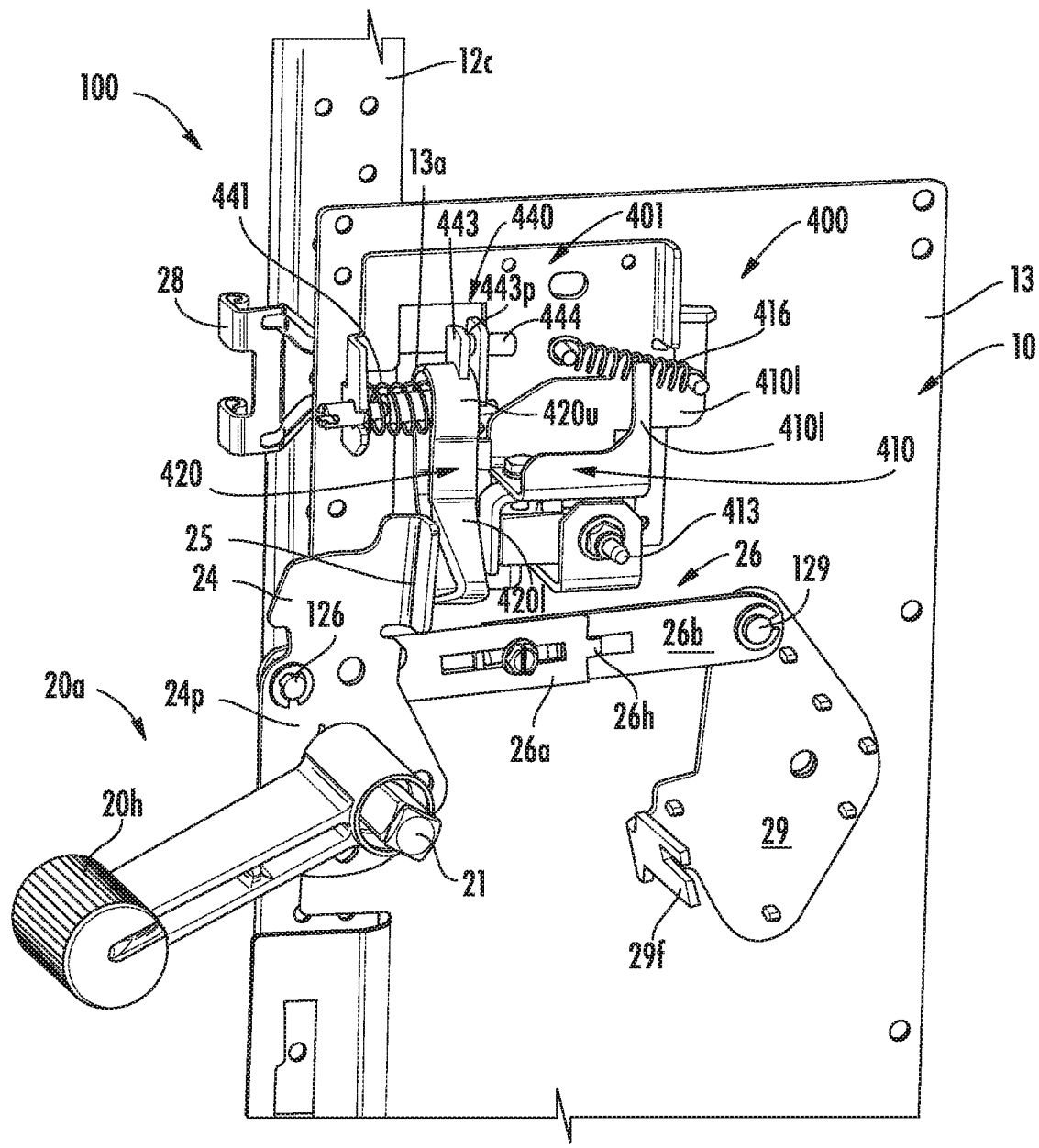
FIG. 6A is a side perspective partial view of a unit illustrating a power connector position interlock assembly with unit latch according to embodiments of the present invention.
Figure 6B:
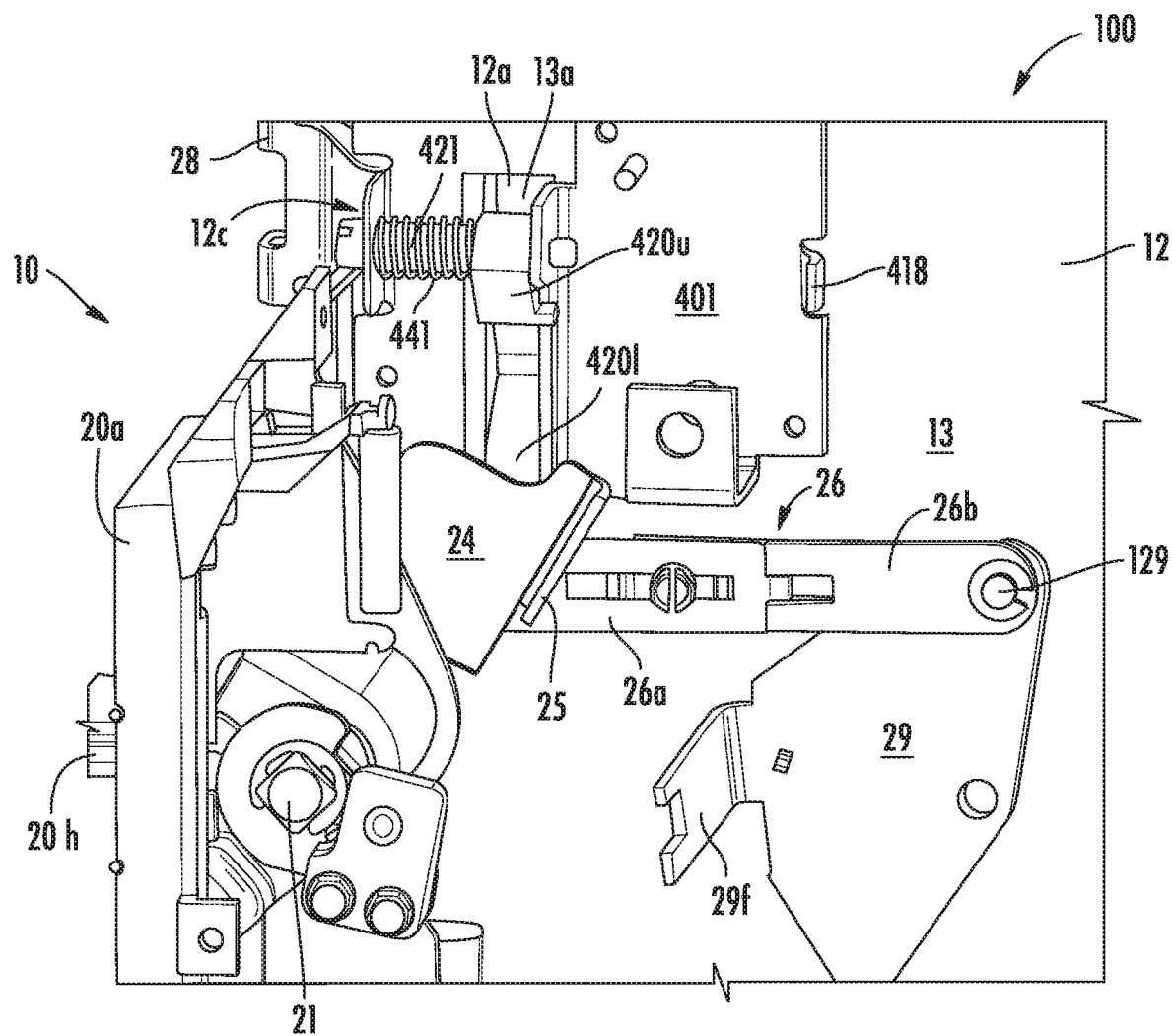
FIG. 6B is side perspective partial view of the unit shown in FIG. 6A with the unit latch shown without the power connector position interlock.

FIGS. 6A and 6B illustrate that the unit 10 can include a power connector position interlock assembly 400. The assembly 400 includes a power connector position interlock 410 and a unit latch 420 (see also, e.g., FIGS. 4D, 4E). The unit sidewall 13 includes an aperture 13a that aligns with a corner post 12c of the MCC cabinet (housing/enclosure) 12. The enclosure can include an internal aperture 12a (which can be a cutout or region in one wall of the corner post) of the MCC housing/enclosure 12 to allow the latch to engage this structure to latch. The unit latch 420 can rotate in and out to latch and unlatch the handle 20h. The assembly 400 can include a mount bracket 401 that attaches to the sidewall 13 and positions the unit latch 420 in-line with the aperture 13a. The cabinet/enclosure 12 can include a corner post 12c and the aperture 12a can be in or adjacent the corner post 12c, typically inside the external wall of the enclosure.

The power connector position interlock 410 can include a pivot plate 412 attached to a laterally extending shaft 413 that is coupled to the sidewall 13 of the unit 10. The shaft 413 can reside behind and above the shaft 21 of the handle lever 20h. The power connector position interlock 410 can track the movement of the power connector assembly 200 (stabs S, i.e., power connectors 46, 48, 50, FIG. 7A). The power connector interlock 410 is connected to the carriage 202. The carriage 202 keys to the power connection position interlock 410 when stabs/power connectors 46, 48, 50 are in a power connected position with stabs extended, FIG. 7B. The pivot plate 412 can pivot up and down. When down, the pivot plate 412 can block the handle cam 24 (from rotation toward an On position) when the power connector assembly is in a retracted position. The term "pivot plate" is used broadly to refer to any suitable configuration capable of providing the structural blocking function and can also be described as a "pivot block" of the interlock 410.

Figure 7C:
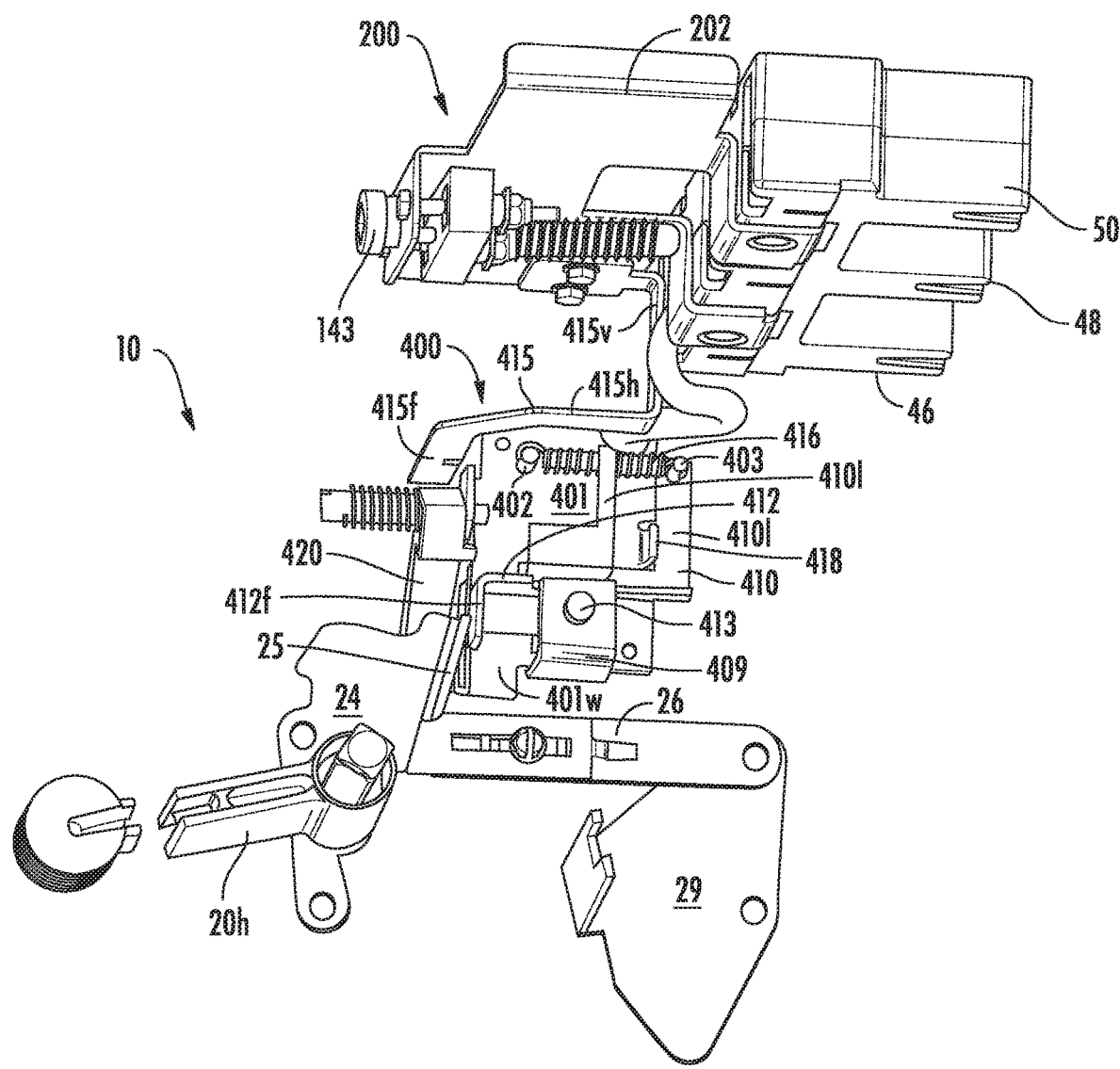

FIGS. 7C and 7D illustrate the carriage 202 of the power connector assembly 200 connected to a coupler 415 that can selectively engage the interlock 410 in a connected state associated with extension of the power connectors 46, 48, 50. As shown in FIGS. 7D and 15B, when the carriage 202 is in the extended position to extend the power connectors 46, 48, 50 (i.e., also known as contact bus bars or stabs) out of the back of the unit 10 to a power-connect state, the coupler 415 causes the power connector position interlock 410 to pivot up which releases the handle cam 24 and therefore does not block the handle 20h, allowing the handle 20h to rotate. FIGS. 7C and 15A illustrate that when the carriage 202 is retracted with the power connectors 46, 48, 50 in a disconnected state inside the unit 10, a front segment of the coupler 415 resides forward of the interlock 410, adjacent and above the unit latch 420, and the interlock 410 via pivot plate 412, blocks the handle cam 24 from rotation (toward an On position).

Referring to FIGS. 7C, 15A, 15B, 16A, 16B, 17A and 17B, for example, the power connector position interlock 410 can include first and second legs 4101 that are spaced apart laterally and also in a front to back direction of the unit 10 and can reside above the pivot plate 412. The rear one of the legs 410l can be attached to a biasing member 416, such as a coil spring, that is attached to the mount bracket 401 of the interlock assembly 400. Inwardly spaced apart posts 402, 403 (spaced apart in the front to back direction) can hold the biasing member 416. The first post 402 can be stationary and held on a wall 401w of the mount bracket 401 (see also, FIGS. 21A, 21B). The first post 402 can reside above a bracket 409 held by the wall 401w (FIG. 21A) that holds the pivot plate 412 (FIGS. 7C, 7D). The second post 403 can be held by the second (rear) leg 410l of the interlock and can pivot with the interlock 410. The front one of the legs 410l can contact the coupler 415 when the power connectors 46, 48, 50 are extended (FIG. 7D).

Figure 16A:
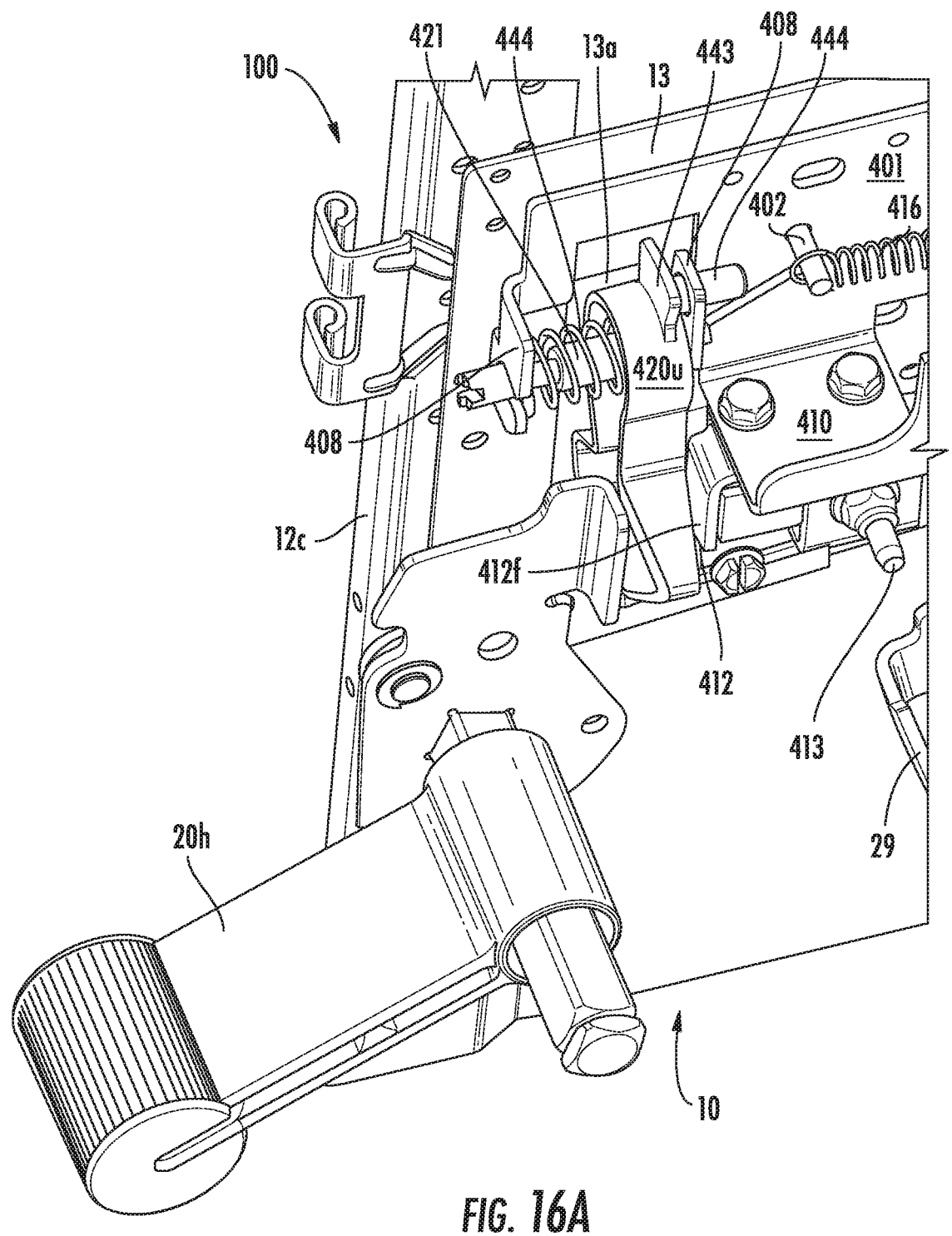
FIG. 16A is an enlarged partial side perspective view of a unit with the handle blocked (from rotation toward an On position) by the unit latch when the unit latch is not engaged according to embodiments of the present invention.

The pivot plate 412 can have a front segment 412f that resides in front of the shaft 413 and that can be vertical or substantially vertical in the block configuration associated with the non-extended position of the connector assembly 200 which may be termed a "home" position (FIGS. 7C, 15A, 16A).

The mount bracket 401 can include a travel stop feature 418 as shown in FIGS. 6B and 7C and the rear leg 410l of the power connection position interlock 410 can abut this travel stop feature 418 in the power connector retracted position (FIG. 7C) for the travel stop for the biased "home" position of the power connector position interlock 410.

Referring again to FIGS. 6A and 6B, the unit latch 420 can be a pendulum latch that is pivotably held by an inwardly extending shaft 421 that is held by the mounting plate 401 that is held by the sidewall 13. The shaft 421 of the unit latch 420 can be held on support flanges 408 that project inwardly from the mount bracket wall 401w. The unit latch shaft 421 can be held orthogonal to the shaft 21 of the handle lever 20h and/or the shaft 413 of the power connector position interlock 410. The term "shaft" 421 with respect to the unit latch 420 is used broadly to refer to a component that allows the unit latch 420 to be pivoted between latched and unlatched positions, typically by a user accessing a slot 1420 extending from an outer facing end portion of the shaft to rotate the unit latch 420. The unit latch 420 can include an upper end portion 420u and a lower end portion 420l. The upper end portion 420u can be held by the shaft 421 and the lower portion can be a free end that can have a larger size and a different shape than the upper portion 420u. The lower end portion 420l can cooperate with a laterally inwardly extending ledge 25 of the cam 24 attached to the shaft 21 of the handle lever 20h. The upper portion 420u can be held by the shaft 421 to pivot in and out between unlatched and latched positions.

The shaft 421 can be spring loaded in an axial direction (perpendicular to the shaft 21 of the handle 20h) via spring 441 as shown in FIG. 6B, for example. The spring 441 can be held between the shaft flanges 408$_1$ and a recess 420r in the unit latch 420 (FIGS. 15B, 16A) and may be attached to the shaft 421 or unit latch 420 via e-clips or other suitable attachment members or features or may free float between the shaft flanges 408 (typically in an axially compressed configuration).

Figure 4D:
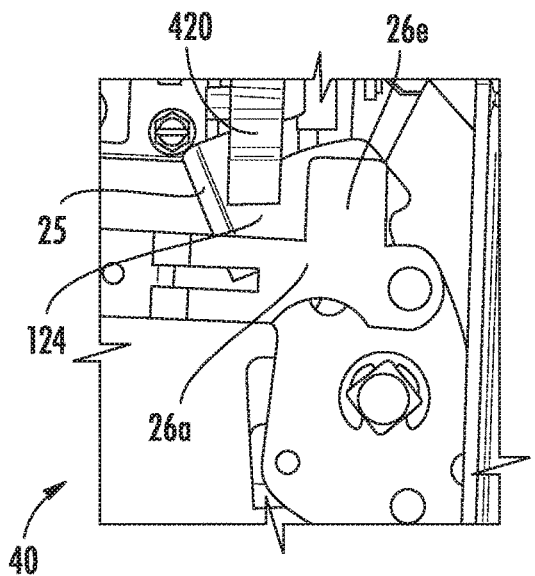
FIGS. 4D and 4E are partial side perspective views of the handle assembly shown in FIG. 3 with an extension on the link to cooperate with the handle cam according to embodiments of the present invention.
Figure 4E:
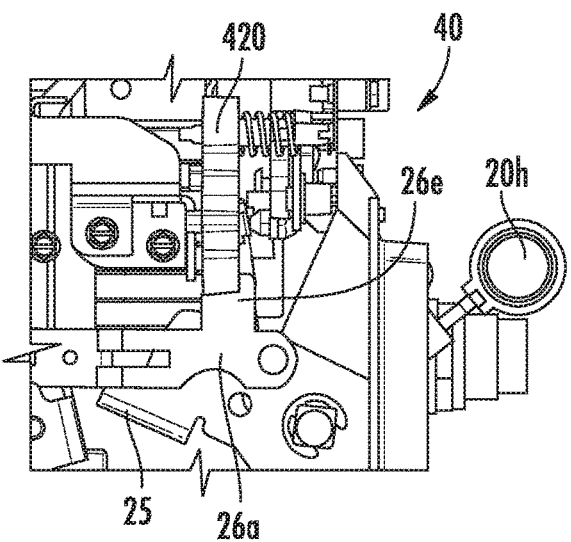

Referring to FIGS. 4D and 4E, the unit latch 420 can be prevented from being rotated from the latched to the unlatched position when the breaker is ON. The unit latch 420 can be blocked by a surface 124 of the handle cam 24, depending upon the position of the handle lever 20h as it rotates from Off toward the On position. As the handle 20h begins to rotate from the Off toward the On position (FIG. 4E), the unit latch 420 can be blocked by an extension 26e on the link 26a to prevent the unit latch 420 from rotation to the unlatched position.

As will be discussed further below, as shown in FIG. 6A, the unit latch 420 can be in communication with a detent sub-assembly 440 to provide latch reinforcement to inhibit unintentional unlatching of the latch 420 due to its weight and/or shock or vibration forces of the handle 20h during operation. The detent sub-assembly 440 can comprise the spring 441 that is held by the shaft 421 and that is coupled to a detent member 444 via a flange 443 with at least one inner facing pocket 443p (FIGS. 16B, 20B, 20C) to provide a spring-loaded detent 444. The term "detent" refers to a positional detent or preferential "stop" position associated with a latch and/or unlatched position. The detent sub-assembly 440 can optionally also provide tactile feedback to a user upon turning the latch in an operative turn amount placing the detent member into a pocket 443p (FIGS. 16B, 20B, 20C), such as about a quarter (¼) turn or about a one eighth (⅛) turn, to secure the unit 10 to the cabinet 12 of the MCC for tactile feedback confirmation of the proper movement of the latch in one or both bi-stable states. The tactile feedback can be provided in a single direction, i.e., a positive latch tactile feedback (single pocket) or both directions (dual pockets), latch and unlatch tactile feedback.

The detent member 444 can be provided by any suitable member such as, for example, a shaped projection 444p in the (metallic) wall 408w of the shaft flange 408$_2$ (FIGS. 19B, 21B) or a ball bearing 444b, which can be a axially spring-loaded ball bearing, held by the shaft flange 408$_2$ (FIGS. 15B and 16A, for example). The detent member 444 can slidably extend into and out of at least one pocket 443p in the latch flange 443 as the unit latch 420 rotates to lock into a latch position and/or an unlatched position to provide a hold force in an axial direction of the shaft 421 as will be discussed further below. It is noted that the detent member 444 may alternatively be held on the latch flange 443 and the cooperating pocket(s) 443p can be held on the unit latch shaft flange 408$_2$ (FIG. 19C).

Figure 6C:
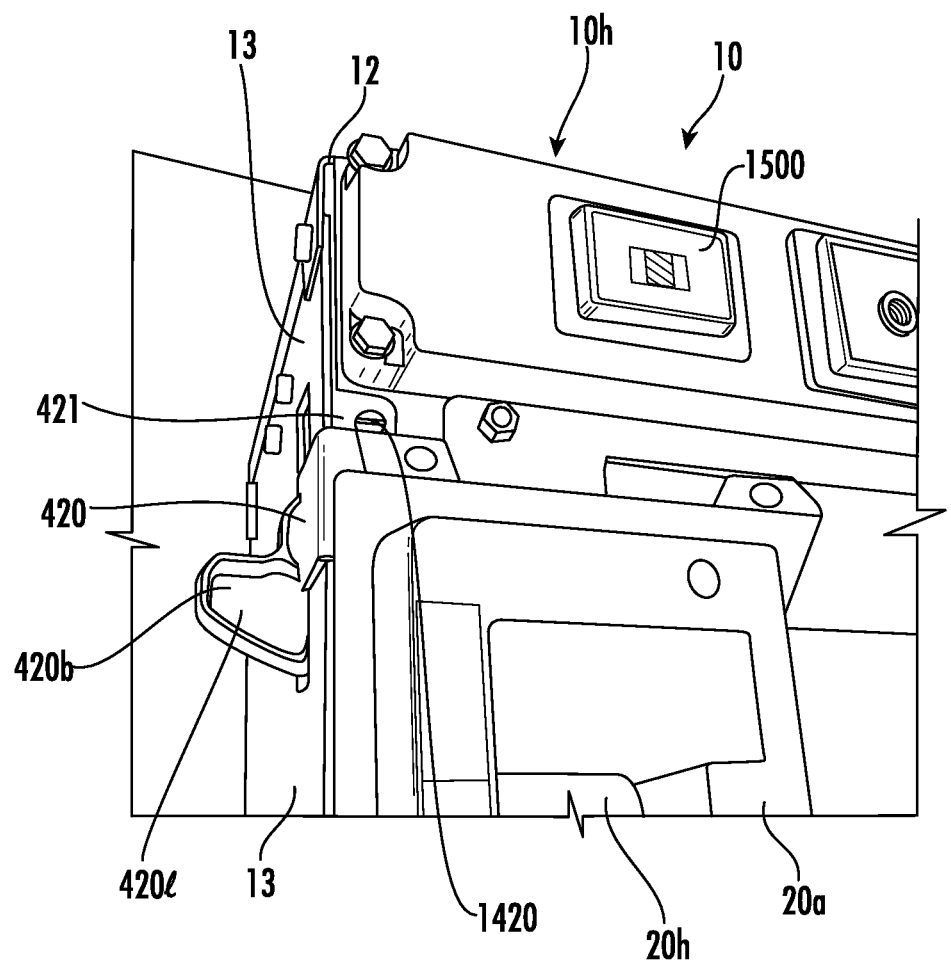
FIG. 6C is a front view of an example unit with a unit latch coupled to a position control member according to embodiments of the present invention.

FIG. 6C illustrates that the unit latch 420 (bucket placement interlock) can be configured to have a slot 1420 that allows a user to turn the shaft 421 in one direction to extend the unit latch 420 out of the sidewall 13 and to turn the shaft 421 in an opposing direction to retract the unit latch into the sidewall 13. The shaft 421 can be fabricated as a unitary member with the slot 1420. The shaft 421 may be fixably coupled to a screw providing the slot 1420 so that the shaft and screw rotate as a unit, e.g., move in concert to move the unit latch 420 to the retracted and extended positions. The shaft 421 can reside above a lower portion of the primary body 420b of the unit latch 420. The unit latch 420 can be configured to move to the retracted and extended positions based on a movement of the shaft 421, typically requiring less than a full turn, such as, for example, about a ¼ or ½ turn of the slot 1420, in some example embodiments. The unit 10 can also include a power stab connection status indicator 1500, typically showing green when disconnected and red when connected.

FIG. 7A shows a partially retracted position of the stabs S, i.e., power connectors 46, 48, 50, and FIG. 7B illustrates a fully extended position to illustrate the operation of extending the power connectors 46, 48, 50. A lead screw 143 with a socket 143s is rotated clockwise which drives a nut 147 which is part of the assembly 200 that contains the power connectors 46, 48, 50 In the retracted position, the connectors 46, 48, 50 are not in contact with the bus bars (not shown). If the lead screw 143 with threaded shaft 143t and socket 143s continues to be rotated clockwise the power connectors 46, 48, 50 will eventually come into contact with the bus bars (not shown) when fully extended (FIG. 7B).

As discussed above, FIGS. 7C and 7D illustrate the carriage 202 of the power connector assembly 200 can be connected to a coupler 415 that can selectively engage the interlock 410 in a connected state associated with extension of the power connectors 46, 48, 50. The coupler 415 can have a vertical segment 415v that merges into a horizontal segment 415h that extends toward the front of the unit and that merges into a front segment 415f that extends laterally a distance. The horizontal segment 415h can have a length that is greater than the length of the front segment 415f. The horizontal segment 415h can have a length sufficient to place the front segment 415f in front of the inner shaft flange 408 when the power connectors are retracted (FIG. 7C). The front segment 415f can have a length that is between 1-4 inches.

Figure 8:
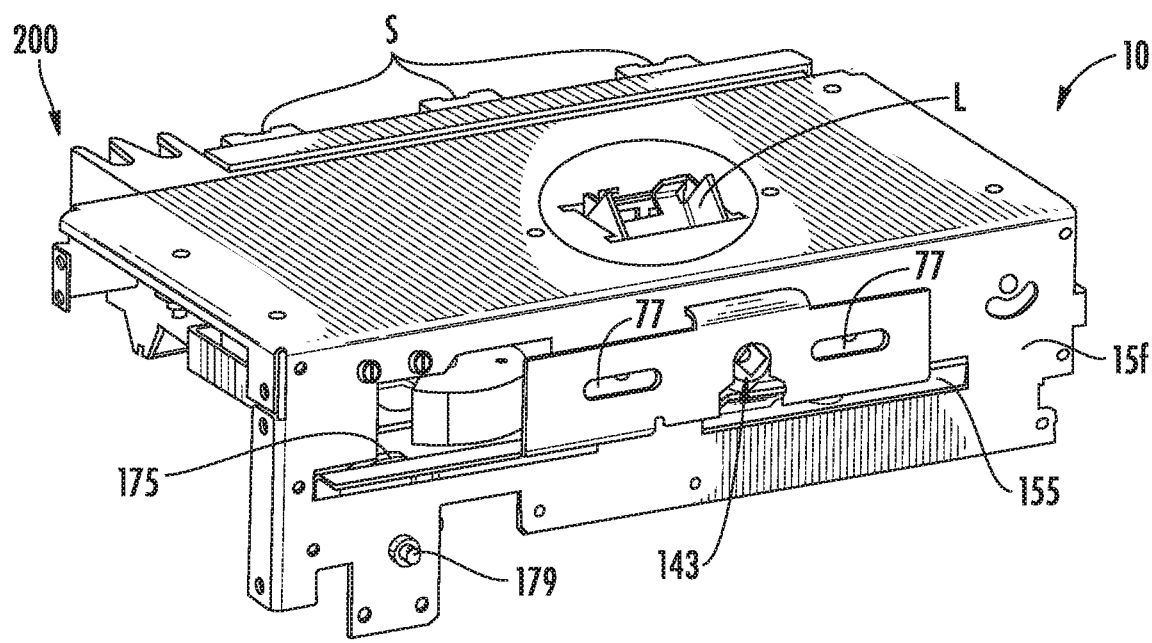
FIGS. 8 and 9 are front, side perspective views of a portion of a unit with a sliding shutter according to embodiments of the present invention.
Figure 9:
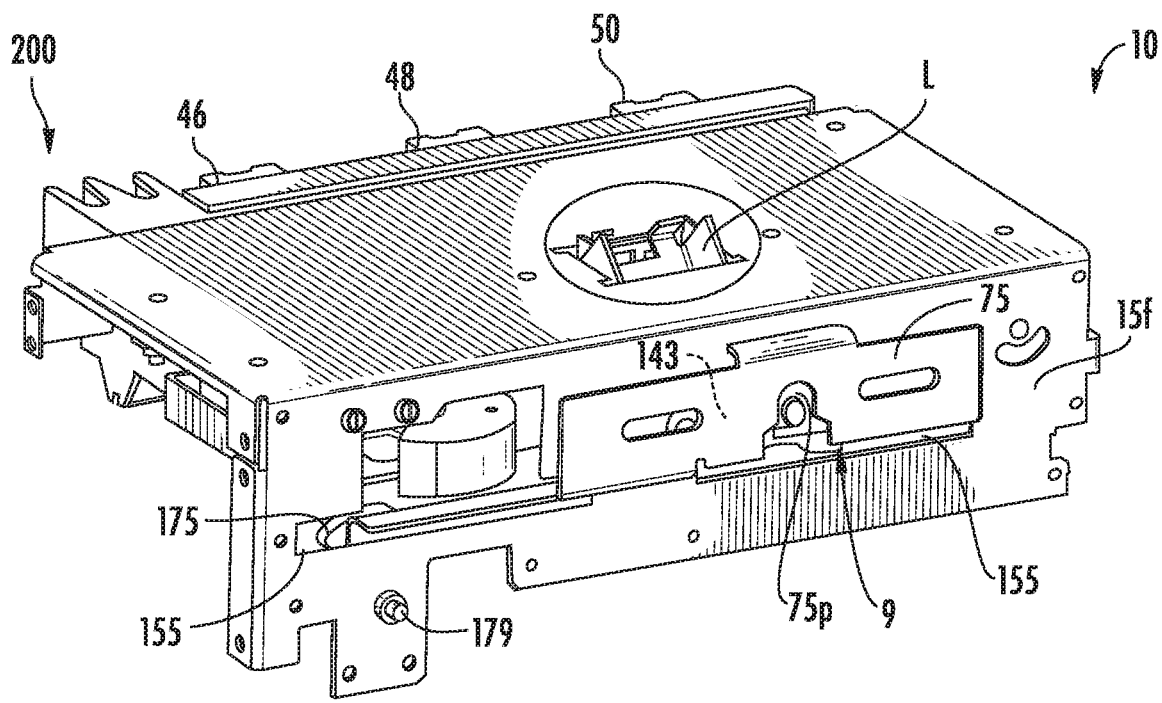

Referring to FIGS. 8 and 9, for example, the sliding shutter 75 provides a safety interlock to prevent the operator from accessing the lead screw socket 143s when the breaker 30 is in the ON state. When the disconnect switch assembly 30 (i.e., breaker) is in the OFF state, the shutter 75 positions the shutter portal 75p over the socket 143s and permits access to the socket 143s as shown in FIG. 8. When the disconnect switch assembly 30 (i.e., breaker) is in the ON position, the shutter 75 slides to the right to a closed position which blocks access to the lead screw 143 and socket 143 as shown in FIG. 9 (shown as slid in one direction but the opposing sliding direction may be used to block access with the shutter portal 75p).

FIGS. 8 and 9 illustrate that the shutter 75 can be parallel to the partial front wall 15f. The lead screw 143 can extend out of an aperture in the partial front wall 15f. The partial front wall 15f can have at least one horizontally extending gap space or slot 155 that allows the shutter 75 to slide right and left in response to rotation of a shutter cam 175 (FIGS. 9, 10A, 10B, 11). The shutter cam 175 can slidably attach to the partial front panel 15f and be in communication with at least one laterally slidable shutter 75 with a portal 75p. When the portal 75p is aligned with the isolation portal 43 (FIG. 2) and an internal lead screw 143 with a socket (FIGS. 7A, 7B), external access to the portal 43 and the lead screw with socket 143 is allowed.

Figure 10A:
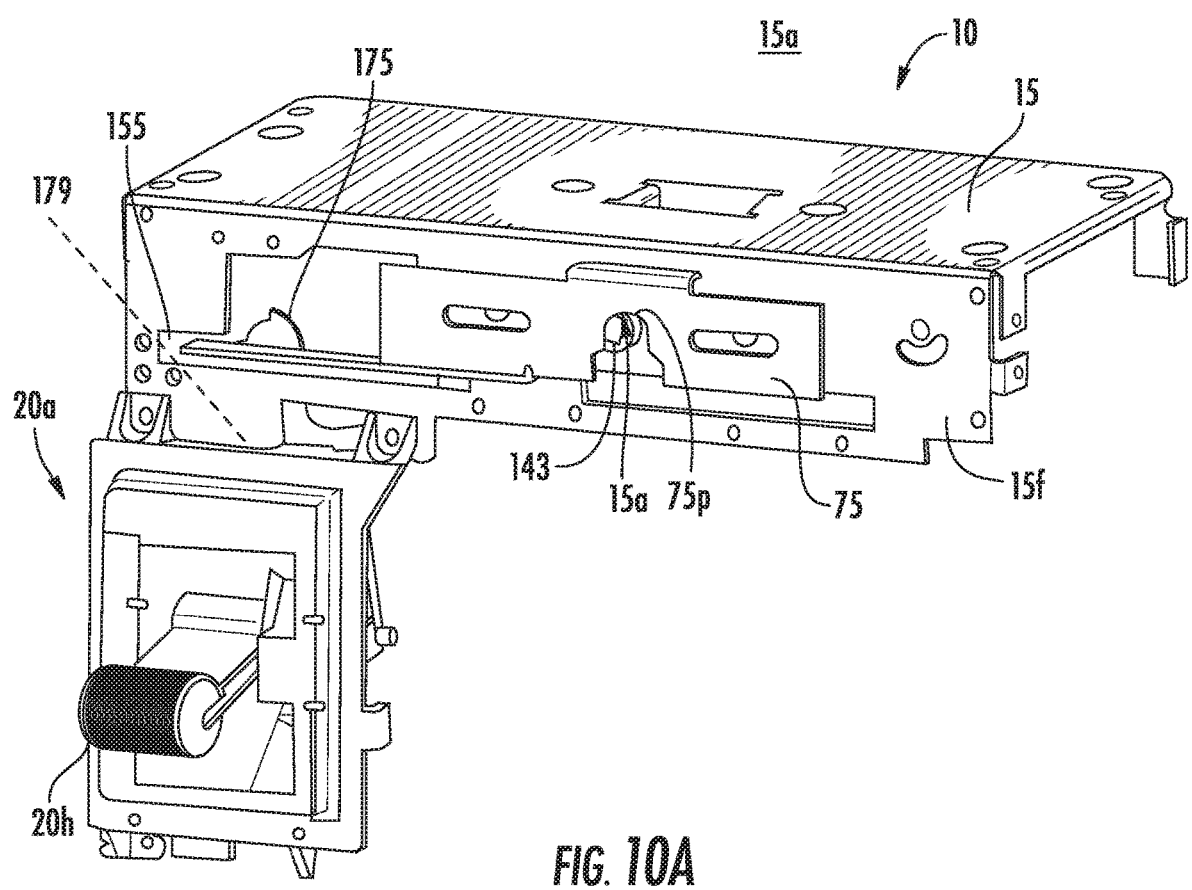
FIG. 10A is a front perspective view of a portion of a unit showing a sliding shutter and a vertically operational handle lever according to embodiments of the present invention.
Figure 10B:
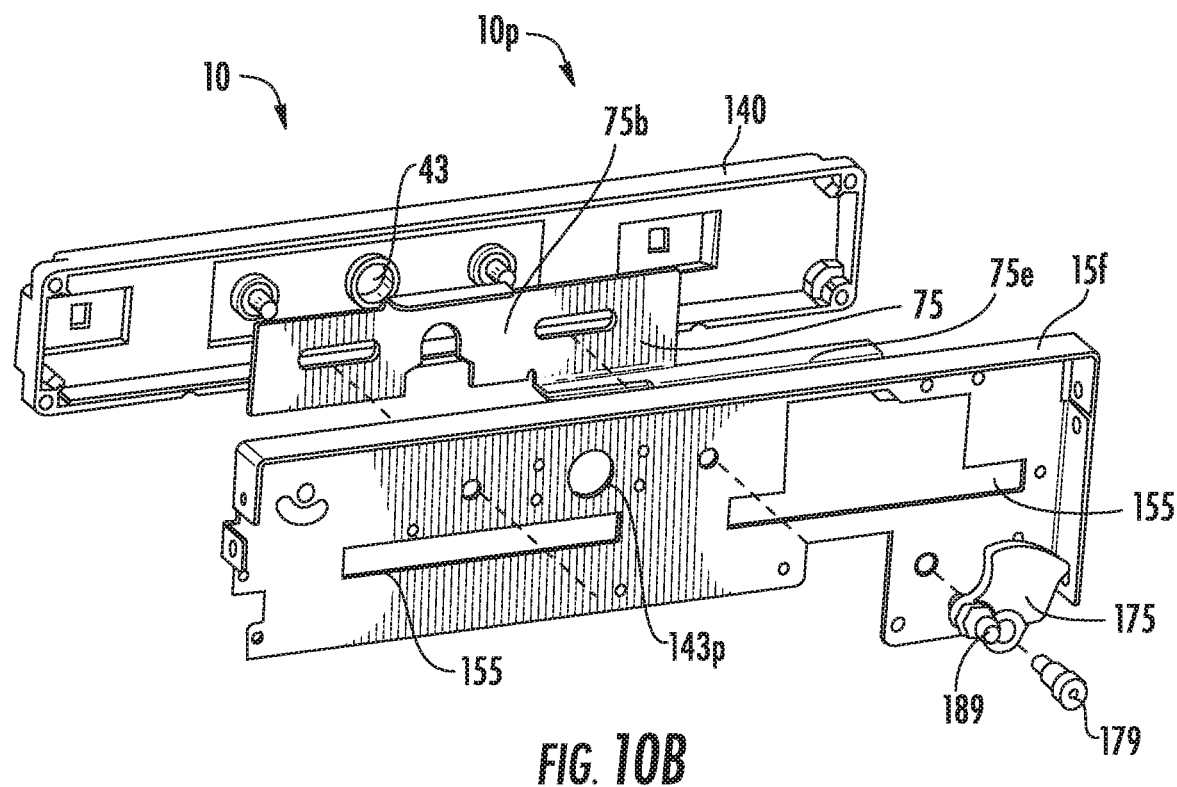
FIG. 10B is a partial back perspective exploded view of a top plate assembly for the unit shown in FIG. 10A according to embodiments of the present invention.

FIG. 10B shows a top plate sub-assembly 10p with the shutter cam 175 attached to the partial front wall 15f, which is behind the shutter 75, which is behind a front cover panel 140 with an external access portal 43. The shutter cam 175 is shown with the upper attachment member 189 can extend horizontally outward behind the partial front wall 15f and shutter cam 175 in this embodiment.

Figure 11:
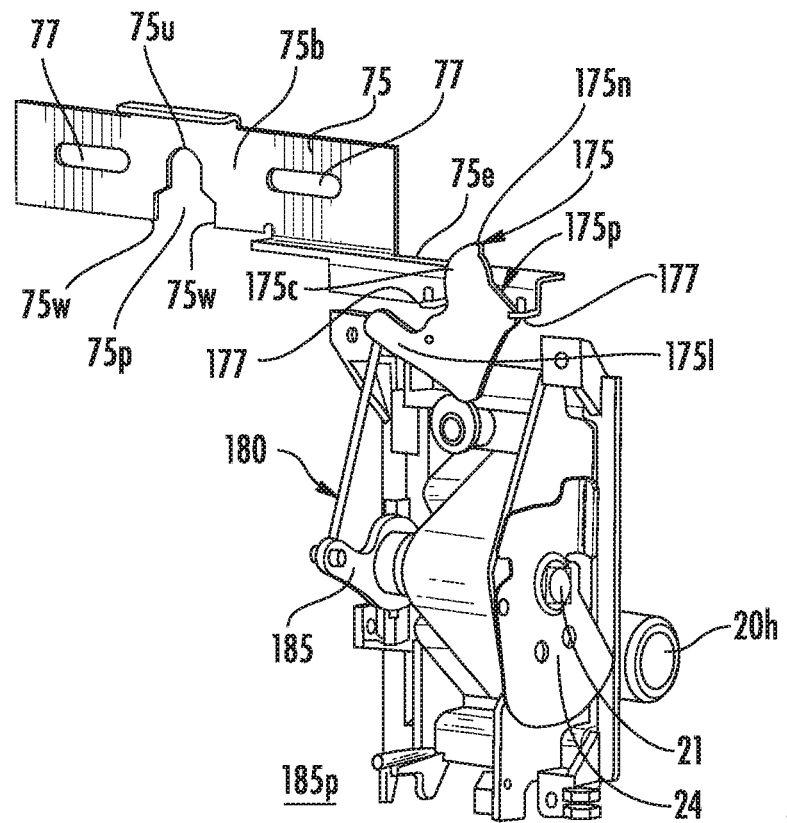
FIG. 11 is a rear side perspective view of a shutter assembly according to embodiments of the present invention.

An example rear view of the handle 20h and shutter 75 in the OFF state is shown in FIG. 11. The position of the shutter 75 is controlled by the position of the handle lever 20h by a shutter linkage 180 that drives a rotating shutter cam 175. As the handle lever 20h rotates, the linkage 180 pulls or pushes the shutter cam 175 which rotates and contacts one of the right or left shutter tabs 177 as shown in FIG. 11. Depending upon the shutter cam 175 rotation direction, the shutter 75 is pushed toward either the open or closed position (left or right). The shutter linkage 180 can comprise a straight rod or pin and can be attached to a handle link 185, such as a planar clamp or other link segment or member attached to the handle shaft 21.

The lower end portion of the shutter linkage 180 can be attached to a handle assembly link 185. The handle assembly link 185 can project inward a distance on one side of the shaft 21 (opposite the side holding the cam 24 that engages the linkage 26) and each can reside on opposing end portions of the shaft 21. The shutter cam 175 can be parallel to the primary body 75b of the shutter 75 that holds the portal 75p. The shutter cam 175 can have a leg 175l that is attached to the upper end of the handle assembly linkage 180. The handle assembly linkage 180 can be a plate or planar shaped member.

The shutter cam 175 can be attached to the downwardly extending partial front wall 15f (FIGS. 3, 9, 10B) via at least one attachment member 179 that allows the pivoting/rotation motion of the shutter cam 175. The attachment member 179 can be a shoulder screw, for example. The attachment member 179 can attach the shutter cam 175 to the partial front wall segment 15f at a position that is below the shutter 75 and to one side of the shutter portal 75p.

The shutter 75 can have at least one lateral extension 75e that extends off a respective side of the shutter primary body 75b (shown as the left side (when looking from the front of the unit) in FIGS. 10B and 11). The extension 75e can comprise laterally spaced apart tabs 177 that can serially engage different perimeter segments of the shutter cam 175 to move the shutter 75 right and left. The extension can have a height that is much less (50% to 90% less) than the height of the primary body 75b and may extend a distance below the primary body 75b as shown. The tabs 177 are shown as extending inward into the unit and the shutter cam 175 is shown as residing behind the shutter 75 but other arrangements can be used. For example, the shutter 75 or extension thereof 75e can reside in back of the shutter cam 175 and the tabs 177 can project forward.

The shutter cam 175 can be planar and extend parallel to the primary body of the shutter 75.

Referring to FIG. 11, the shutter portal 75p can have an arcuate upper end portion 75u that merges into a wider open space at a bottom thereof and the perimeter shape of the portal may have sidewalls 75w that are parallel and straight at the bottom end portion under the arcuate upper portion. The shutter may include elongate horizontal slots 77 that face slots 155 in the front partial wall 15f.

Still referring to FIG. 11, the shutter cam 175 can be a plate 175p that is parallel to the primary body 75b of the shutter 75. The plate 175p can be planar and can have a cam perimeter profile that is curvilinear with a leg segment 175l attached to the linkage 180 that extends upward from the shaft 21 of the handle 20h and with a curvilinear spaced apart portion that engages and disengages with the shutter 75. As shown, in some particular embodiments, the cam perimeter profile comprises an upper portion with a curved segment 175c with a radius of curvature "R" and a spaced apart peak or node segment 175n. The curved segment 175c can have an angular extension α of about 15-180 degrees measured from a center defining a radius of curvature for an arc, more typically between about 20-135 degrees, in some embodiments. The curved and the peak or node segments 175c, 175n can both reside above the tabs 177 and/or above the segment that is attached to the linkage 180. However, it is contemplated that other cam perimeter profiles and attachment configurations may be used and that the leg is not required.

In some embodiments, the unit/bucket assembly 10 can comprise a molded case circuit breaker as the disconnect switch assembly 30. Molded case circuit breakers are well known to those of skill in the art, as exemplified by U.S. Pat. Nos. 4,503,408 and 5,910,760, the contents of which are incorporated herein by reference as if recited in full herein. In other embodiments, the bucket assembly 10 can be configured to house a fused disconnect switch to turn power on and off.

As shown in FIG. 8, for example, the unit 10 can be configured so that the stab S is offset to reside closer to one side of the unit, e.g., so that a left side stab 46 or right side stab 50 (and/or the center stab 48) is closer to a respective left or right side of the unit 10. FIGS. 7 and 8 show the center stab 48 as residing closer to the right side of the unit 10, according to some embodiments. FIGS. 8 and 9 also illustrate that, as conventional, the unit 10 can have an interlock L typically via the top surface of the unit.

FIG. 4A illustrates an exemplary "OFF" orientation/position of the handle 20h and lever 35 (shown as both in a down position) while FIG. 4B illustrates an exemplary "ON" position of the handle 20h and lever 35 (shown as in a pivoted up position). The reverse orientations of ON and OFF may also be used. In operation, the pre-defined orientation of the handle 20h with respect to operation status can provide a visual indication to a user-operator of the conduction status of the disconnect circuit assembly 30, e.g., breaker or switch disconnect (optionally with a fuse) being ON/OFF.

The terms "ON" and "On" with respect to handle position/orientation are used interchangeably and refer to the associated unit 10 having conduction with the operator disconnect switch closed (circuit breaker closed or fused switch being ON/switch closed). The terms "OFF" and "Off" with respect to handle position/orientation are used interchangeably and refer to the associated unit 10 having no conduction with the disconnect switch open (circuit breaker open or fused disconnect switch OFF/switch open).

The lateral stroke distance of the shutter 75 and/or the shutter extension 75e in each direction, right to left and/or left to right to open/close the access path to the lead screw 143 can be between about 0.25 inches to about 3 inches, more typically between about 1 inch to about 2 inches.

Figure 12:
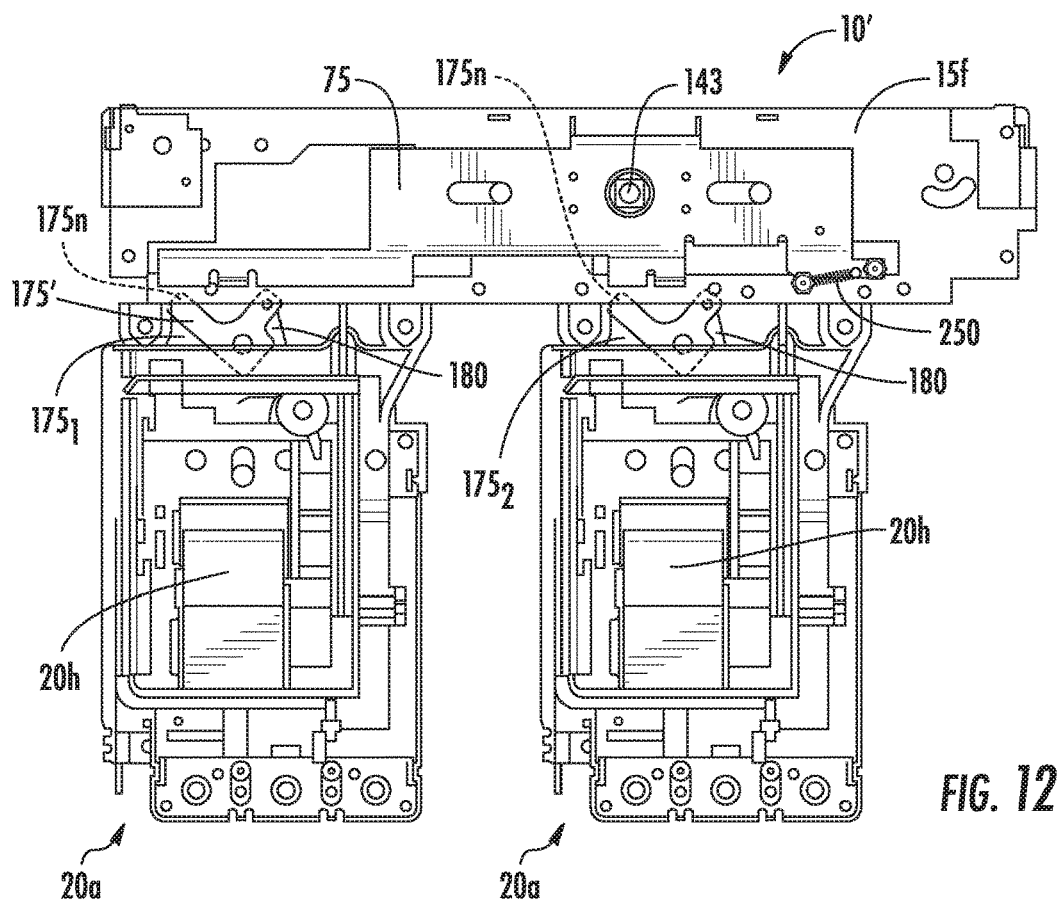
FIGS. 12 and 13 are front views of a unit with a dual disconnect switch configuration according to embodiments of the present invention.
Figure 13:
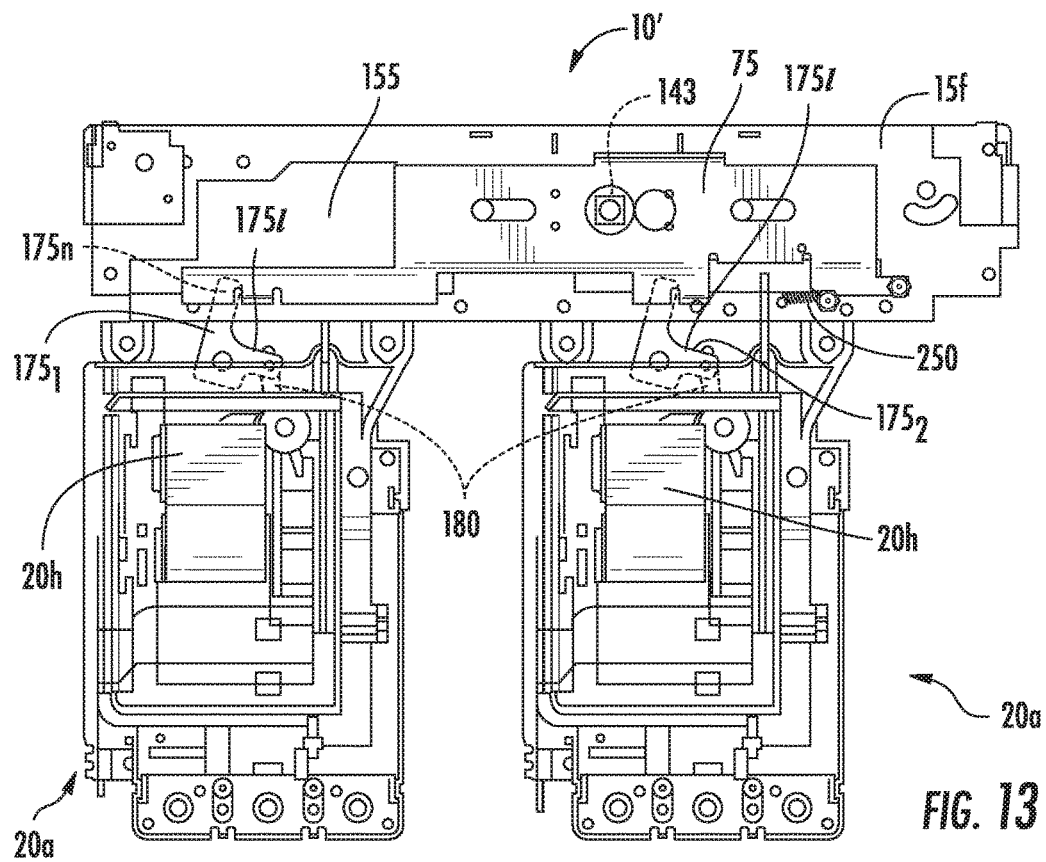
Figure 14:
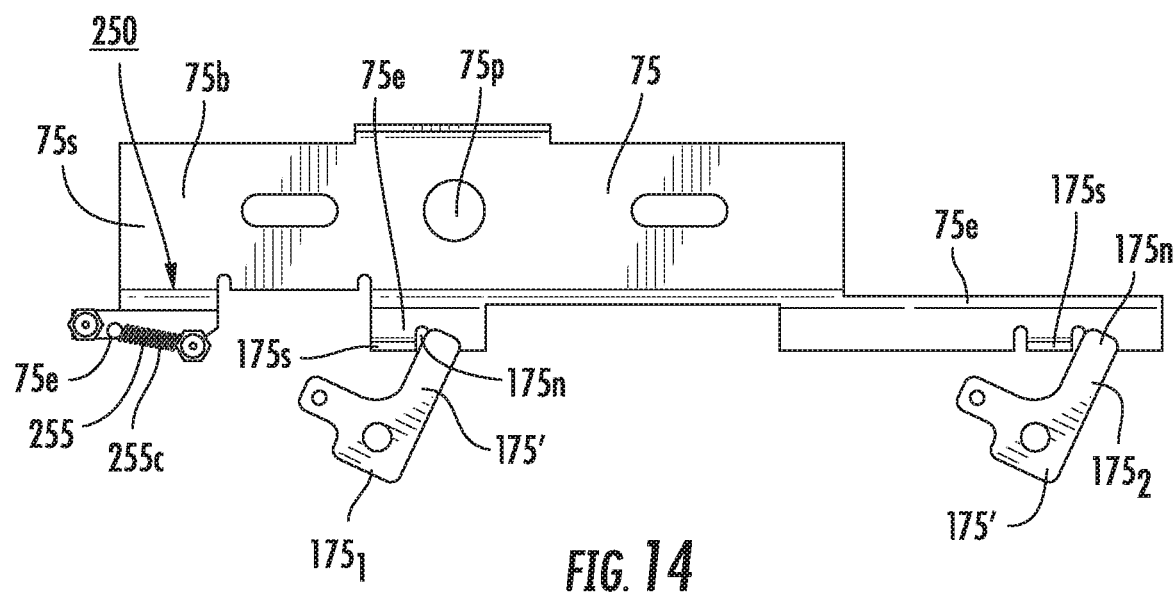
FIG. 14 is a rear view of an example shutter sub-assembly of the unit shown in FIGS. 12 and 13 according to embodiments of the present invention.

As shown in FIGS. 12, 13 and 14, in some embodiments, the unit 10' can be a dual starter and/or feeder unit and the shutter 75 can engage two handles 20h in a single unit 10', and each handle 20h may have a dedicated shutter cam 175', shown as shutter cams $175_1$, $175_2$ that cooperates with the shutter 75. In other embodiments, two or more separate shutters 75 may be provided, such as one for each handle 20h. If two shutters are used, one can reside in front of the other and independently slide right and left in response to respective handle position 20h. In other embodiments, where two shutters are used, one each can reside in the same plane and laterally move to provide the access and blocking configurations. FIG. 12 illustrates a first state of the unit 10' with disconnect switches (e.g., breakers) OFF and the retractable power connector assembly 200 (FIGS. 7A-7C) accessible via lead screw 143 and aligned shutter portal 75p. FIG. 13 illustrates the second state of the unit 10' with any disconnect switch 30 ON and the retractable power connector assembly 200 inaccessible.

As shown, each shutter cam 175' can be attached to a respective shutter linkage 180 and each can pivot to block socket access. A node 175n of the shutter cam 175' can raise and lower relative to the shutter 75 to thereby selectively block or allow the shutter 75 to slide laterally. When either of the handles 20h are ON, the lead screw 143 is blocked by the shutter 75 (FIG. 13). When both handles 20h are OFF (FIG. 12), the shutter cam 75 can slide to align the portal 75p with the lead screw 143.

Referring to FIG. 14, the shutter 75 can have two spaced apart lateral extensions 75e that extend off the shutter primary body 75b. An engagement surface 175s of the lateral extensions 75e can engage a respective shutter cam $175_1$, $175_2$ to move the shutter 75 right and left. As discussed above, the lateral extensions 75e can have a height that is much less (50% to 90% less) than the height of the primary body 75b and may extend a distance below the primary body 75b as shown.

As also shown in FIG. 14, the shutter 75 can be attached to a mechanical automatic return assembly 250 with a biasing member 255, shown as a coil spring 255c. The return assembly 250 can also be directly or indirectly attached to the housing of the unit 10'. In operation, access to the socket or portal 143 can be automatically and mechanically restored based on a biasing force applied by the biasing member 255 when both shutter cams 175' disengage the shutter 75. The shutter cams 175' each extend the biasing member 255 as they contact and engage the shutter 75 and laterally slide the shutter 75 away from one side of the unit 10' (shown as a right side) toward the other side of the unit 10' (shown as a left side). The return assembly 250 can be attached to a lateral extension 75e appended to or extending under and adjacent one outer side 75s of the shutter 75.

For fused switch disconnects, the operator mechanism 40 can engage and move a fuse switch lever 35, up and down for ON/OFF operation. Exemplary fuses are FUSETRON™ 600V Class RK5 fuses (BU-SB13729) available from Cooper Bussmann Company, St. Louis, Mo. However, the design is flexible and can accommodate other fuses including those in different classes.

Figure 16B:
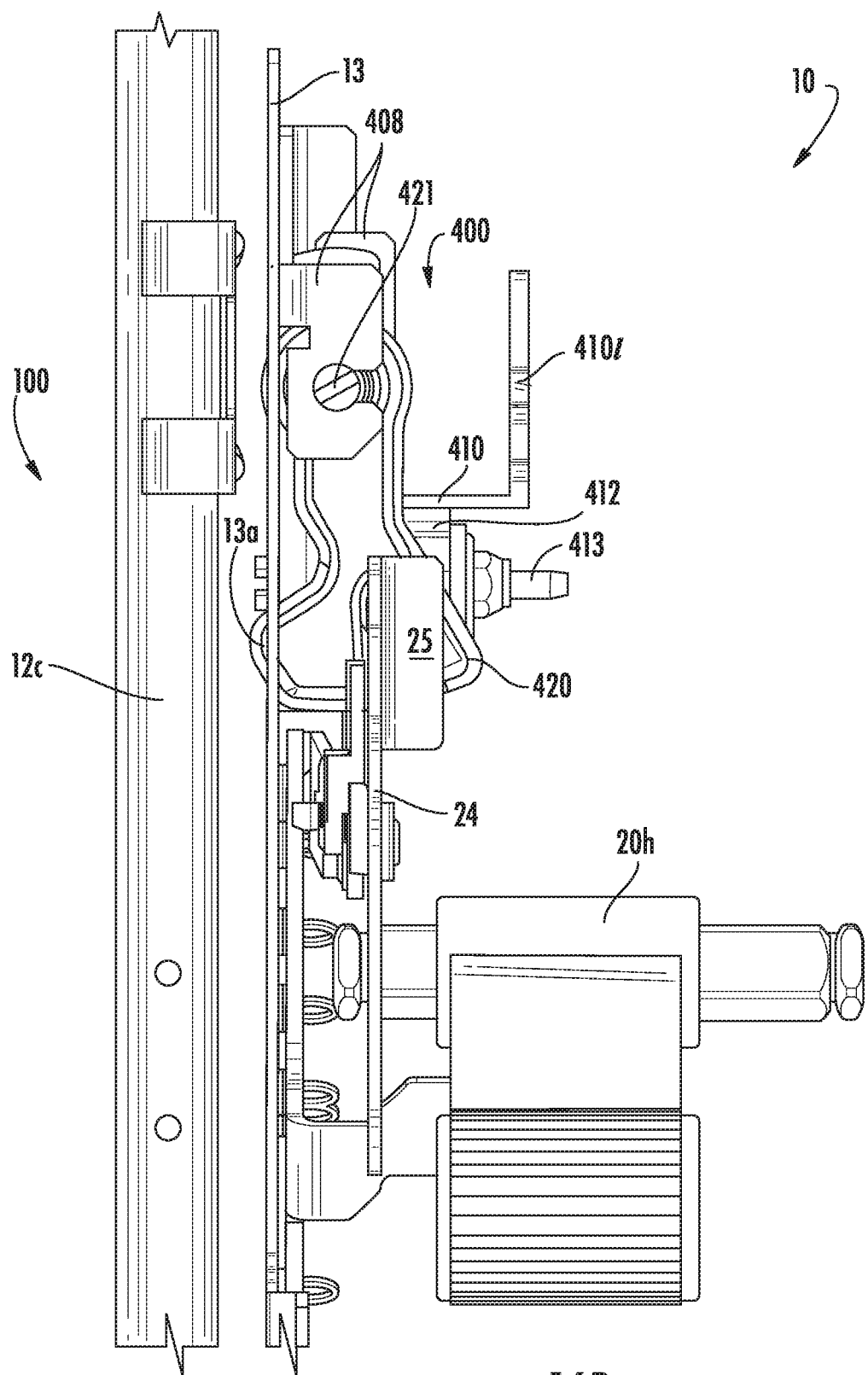
FIG. 16B is a front partial view of the unit with the unit latch not engaged and the handle blocked (from rotation toward an On position) according to embodiments of the present invention.

Referring to FIGS. 16A and 16B, as shown, when the unit latch 420 is not engaged (i.e., is disengaged from the cabinet 12 of the MCC 100), the handle 20h is blocked from movement by the unit latch 420. In this position, the inwardly laterally extending ledge 25 is pivoted to an inward stop position, away from the sidewall 13 of the unit 10 and abuts a lower portion 420l of the unit latch 420 preventing rotation of the handle 20h.

Figure 17A:
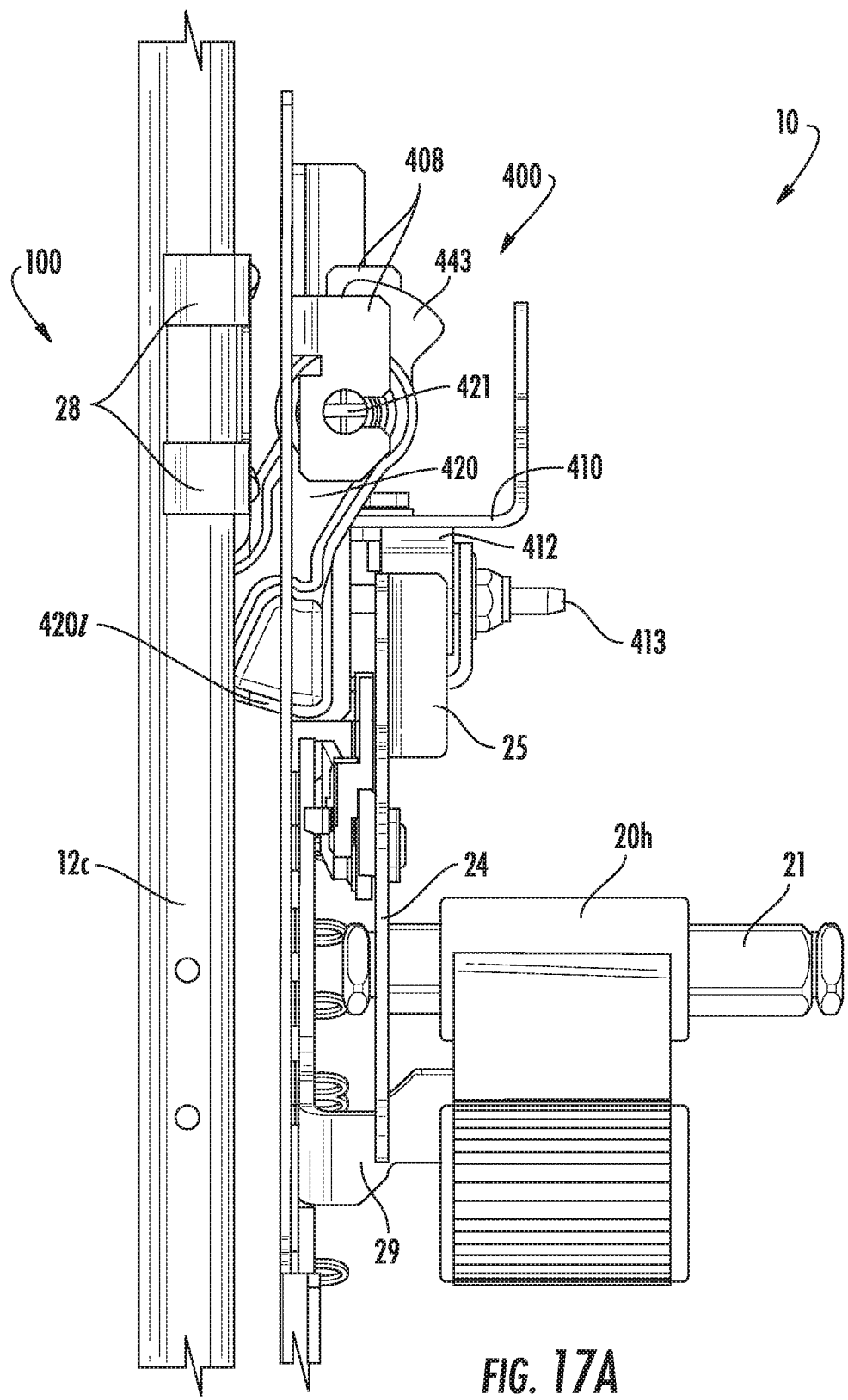
FIG. 17A is a front partial view of the unit with the unit latch engaged according to embodiments of the present invention.
Figure 17B:
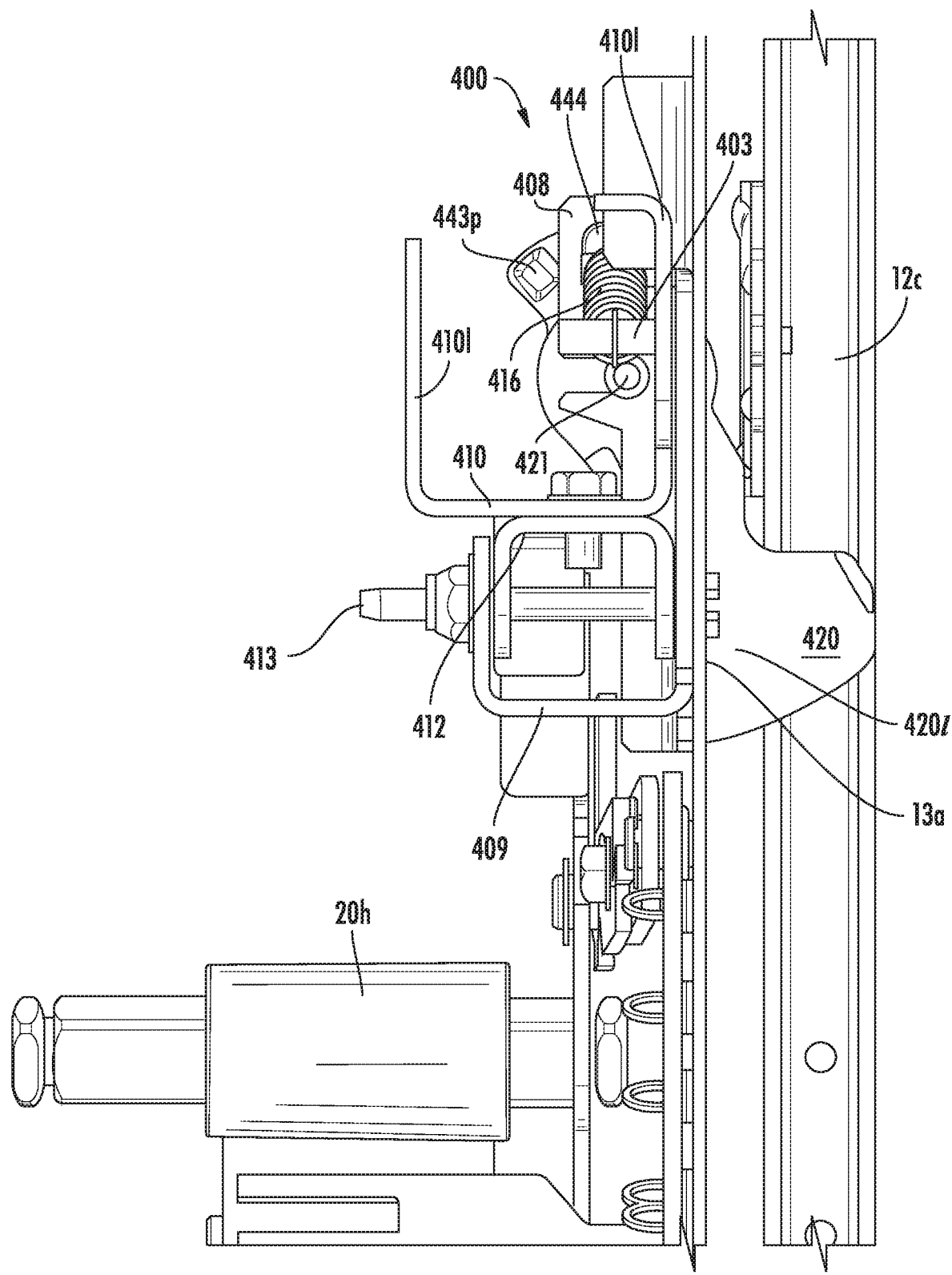
FIG. 17B is a rear partial view of the unit with the unit latch engaged according to embodiments of the present invention.

Referring to FIGS. 17A and 17B, when the unit latch 420 is engaged, with the lower portion 420l extending out of the unit sidewall 13 to reside adjacent or behind the corner post 12c of the cabinet/enclosure 12, the unit latch 420 no longer blocks the ledge 25 of the handle cam 24 and the handle clears the unit latch and is free to rotate, but only if the position interlock 410 is also in the appropriate position to allow this action.

Thus, the interlock assembly 400 with the mount bracket 401 provides an adjacent dual interlock configuration, one based on the latch or unlatched condition of the unit with respect to the enclosure 12 and one based on the position of the power connector assembly 200, and both can use the same handle cam interface 25. The interlock members 410, 420 can be held closely spaced apart, front to back, one in front of the other, when in a respective handle block position.

Figure 18A:
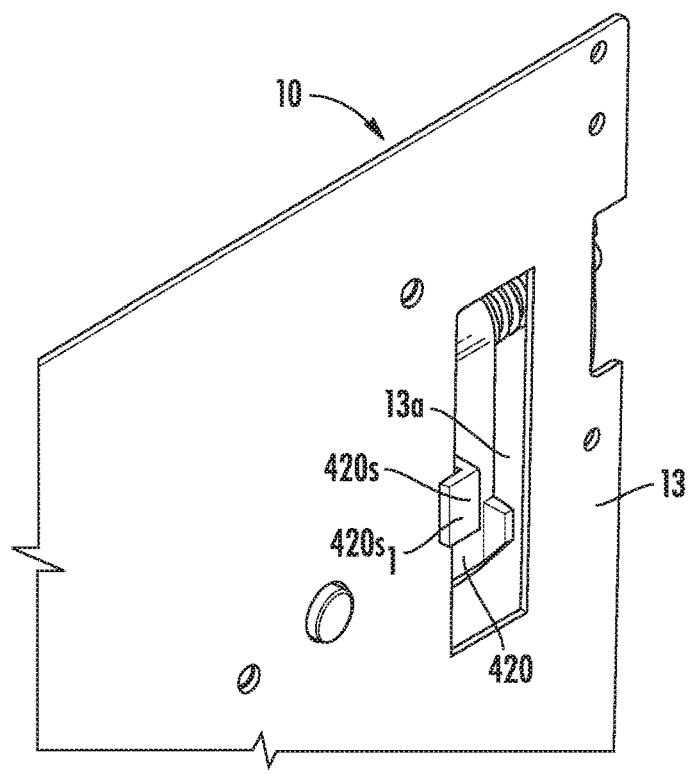
FIGS. 18A and 18B are enlarged side perspective views of the unit latch illustrating inbound and outbound travel stops according to embodiments of the present invention.
Figure 18B:
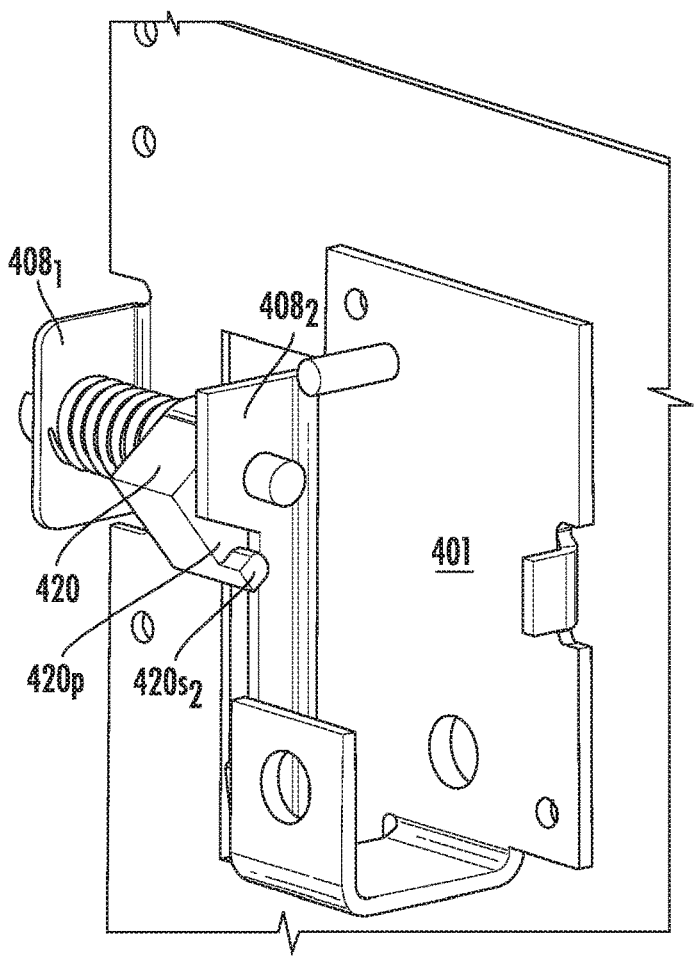

FIGS. 18A, 18B and 20B, for example, illustrate that the unit latch 420 can include travel stops 420s. The travel stops can be an inbound travel stop $420s_1$ (FIG. 18A) and an outbound travel stop $420s_2$. The travel stops 420s can reside on a common planar surface 420p facing the inner unit latch shaft flange $408_2$.

FIGS. 20A-20E illustrate an exemplary unit latch 420 which may be a monolithic single piece member that has an integrated shaft 421, a recess 420r and a flange 443 with at least one pocket 443p. In some embodiments, the flange 443 comprises first and second pockets $443p_1$, $443p_2$ that are spaced apart in a right to left direction when mounted to the unit 10.

Referring to FIGS. 19A, 19B, 20A-20C, and 20E, the flange 443 can have a raised wall segment 443r (i.e., increased wall thickness) between the pockets $443p_1$, $443p_2$. FIG. 19C illustrates that the flange 443 can comprise the detent member 444 and the latch flange $408_2$ can comprise the at least one pocket 443p.

Referring to FIGS. 19B and 20C, the at least one pocket 443p can have a tapered inner wall 443t that merges down to a floor surface 443f and which can extend to the outer edge thereof 443o (without raising to form an outer wall boundary). That is, the floor 443f can have a constant depth extending to the outer ends of the flange 443. There can be a nominal clearance $d_1$ between the detent member 444 and the floor 443f of the pocket of the flange 443 of the unit latch 420 when the unit latch 420 is at either end of its travel as shown in FIG. 19B, for example. The nominal clearance can be between about 0.010 and 0.020, such as about 0.016, in some embodiments.

Figure 20D:
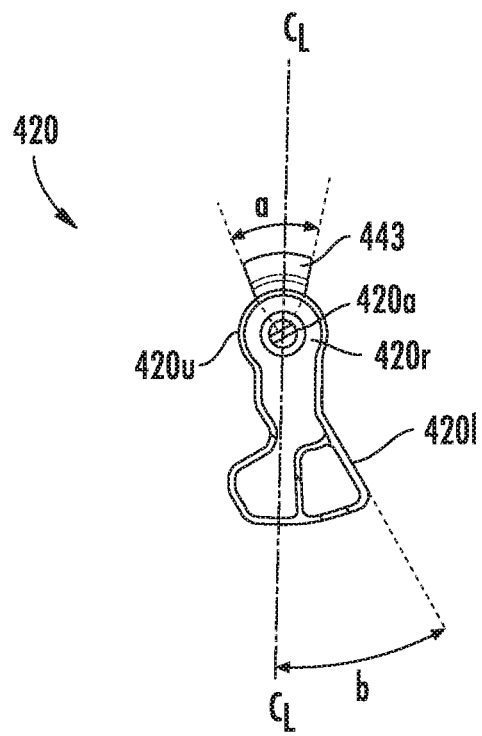
FIG. 20D is a front view of the unit latch shown in FIG. 20A.
Figure 20E:
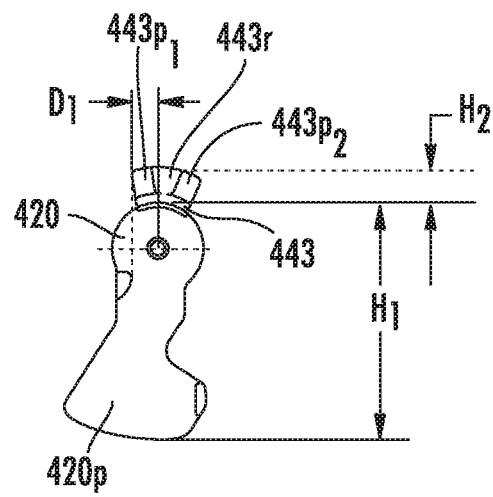
FIG. 20E is a back view of the unit latch shown in FIG. 20A.

As shown in FIGS. 20D and 20E, the lower end of the unit latch 420 can have a curved segment with a radial extent 13 that can be between about 30-40 degrees, such as about 32 degrees and may have a radius of curvature R of about 2.100, measured from the centerline drawn through the centerline C/L of the aperture 420a that receives the shaft 421. The flange 443 can have an angular extent "α, also measured relative to the centerline C/L that is between about 15 degrees to about 60 degrees. The flange 443 can have a maximal height $H_2$ that is less than the maximal height $H_1$ of the unit latch 420. The flange 443 can have a height $H_2$ that is between 10-20% of the height $H_1$ of the primary body of the unit latch 420p, typically between about 0.26 inches to about 0.5 inches. The height $H_1$ of the primary body of the latch 420p can be between about 2.0-3.0 inches, such as about 2.6 inches, in some embodiments.

Figure 21A:
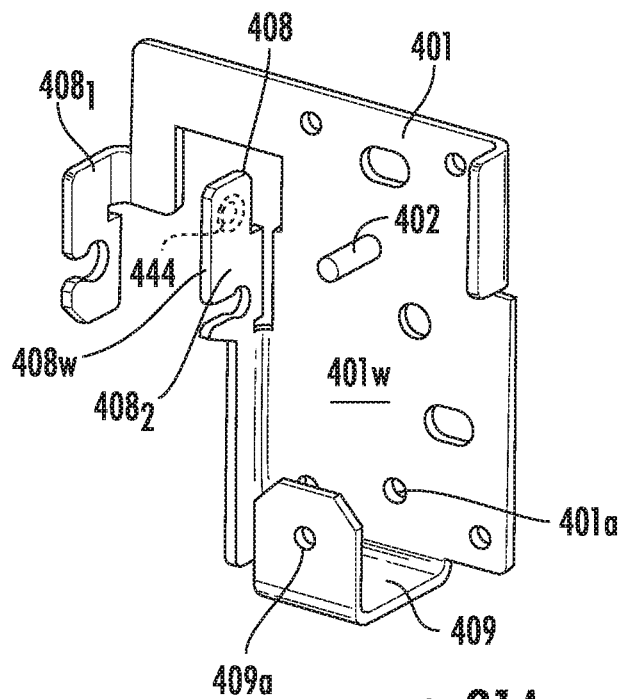
FIG. 21A is a side perspective view of a unit interlock mounting bracket according to embodiments of the present invention.
Figure 21B:
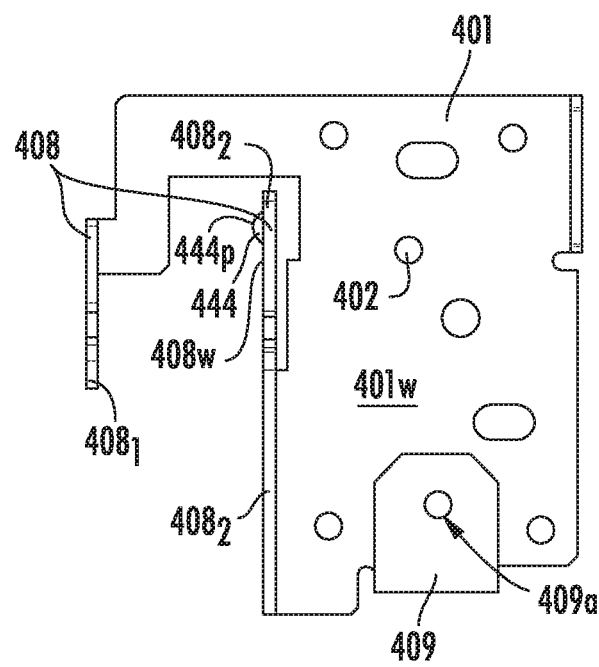
FIG. 21B is a side view of the unit interlock mounting bracket shown in FIG. 21A.

FIG. 20E illustrates that a respective pocket 443p can have a laterally extending maximal extent D1 that is between about 0.01 and 0.75 inches, typically about 0.0.5 inches. FIGS. 21A and 21B illustrate an exemplary mount bracket 401 that can hold both the unit latch interlock assembly 420 and the power connection position interlock 410. As shown, the mount bracket 401 includes a primary planar wall 401w that includes a post 402, a bracket 409 for the pivot plate 412 of the interlock 410, and spaced apart unit latch shaft flanges 408. The unit latch flanges 408 include a first (front) flange $408_1$ and a second (more rearward) flange $408_2$, each cooperating to hold the shaft 421 as discussed above. The mount bracket 401 can be metal. The second flange $408_2$ can hold the detent member 444. As shown, the detent member 444 is a formed projection 444p on a wall 408w of the second flange $408_2$ that faces the first flange $408_1$. The bracket 409 can include an aperture and the wall 401w can include an aligned aperture 401a that cooperate to hold the shaft 413 of the pivot plate 412 (FIGS. 6A, 7C, for example).

Figure 22:
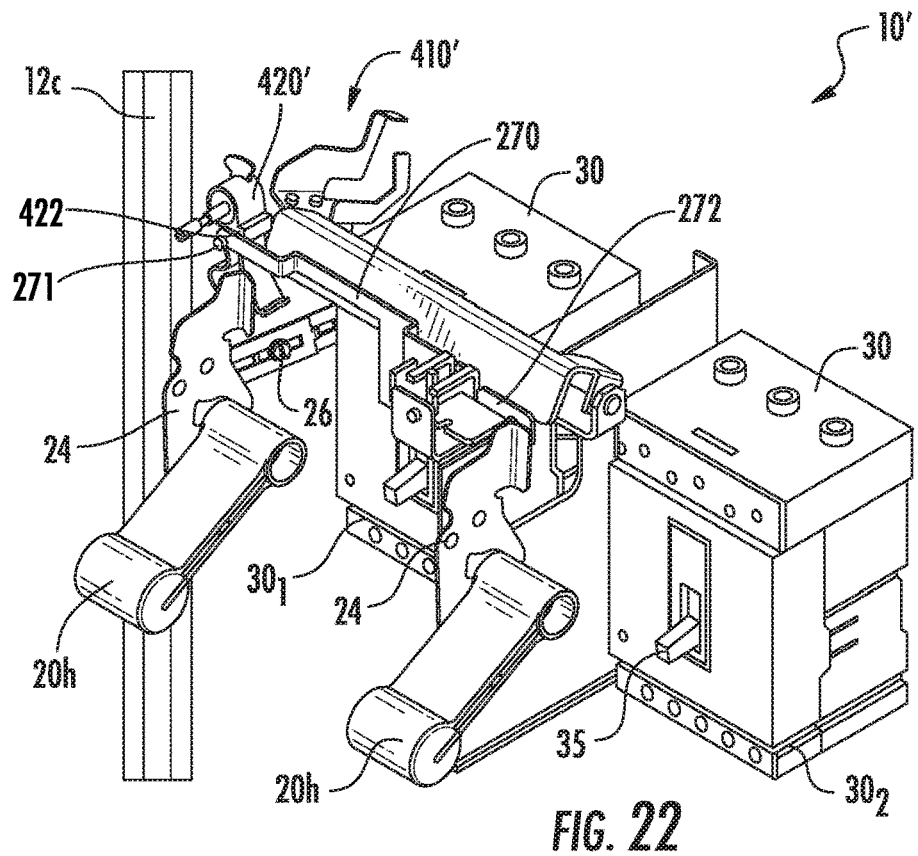
FIGS. 22 and 23 are front partial illustrations of a unit with a dual disconnect switch configuration that cooperate with a unit latch according to embodiments of the present invention.
Figure 23:
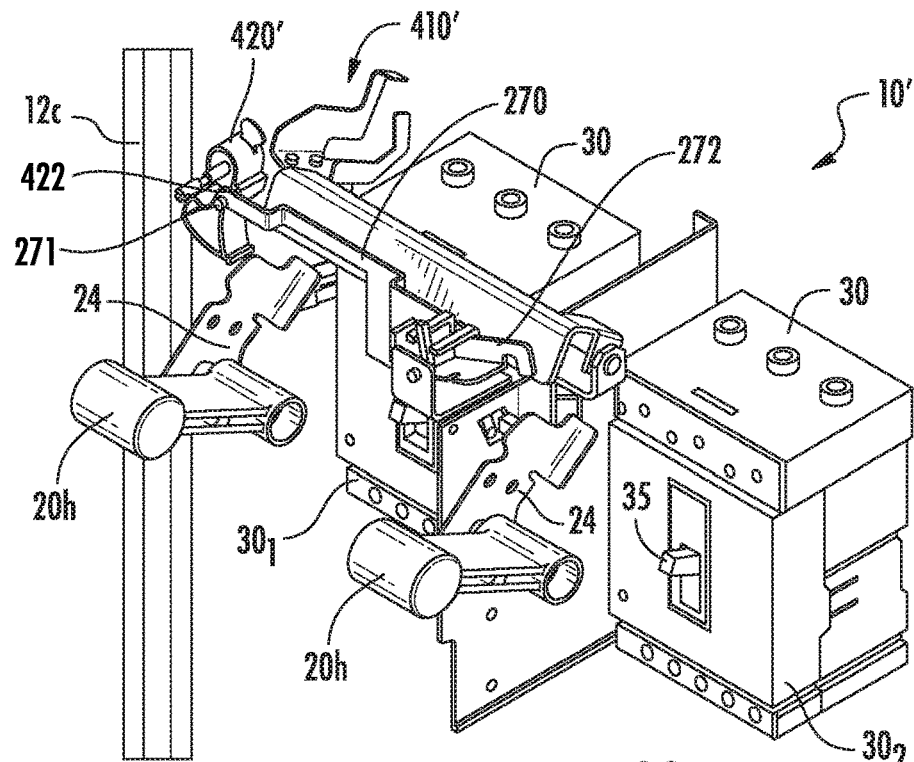

FIGS. 22 and 23 illustrate that the unit latch 420' and power connection position interlock 410' can be configured for a unit 10' comprising dual handles 20h and disconnect switches 30. As shown, the unit latch 420' can be coupled to a laterally extending linkage 270 coupled to a pivot member 272. The linkage member 270 translates the position of the unit latch 420' to a second disconnect switch 302 of a second feeder or starter of the unit 10' residing further away from the unit latch 420' than the first disconnect switch 301 of a first starter or feeder.

FIG. 22 illustrates the unit or bucket 10' not installed and no disconnect switch operable. FIG. 23 illustrates the unit or bucket 10' installed and both disconnect switches 30 operable.

Figure 24:
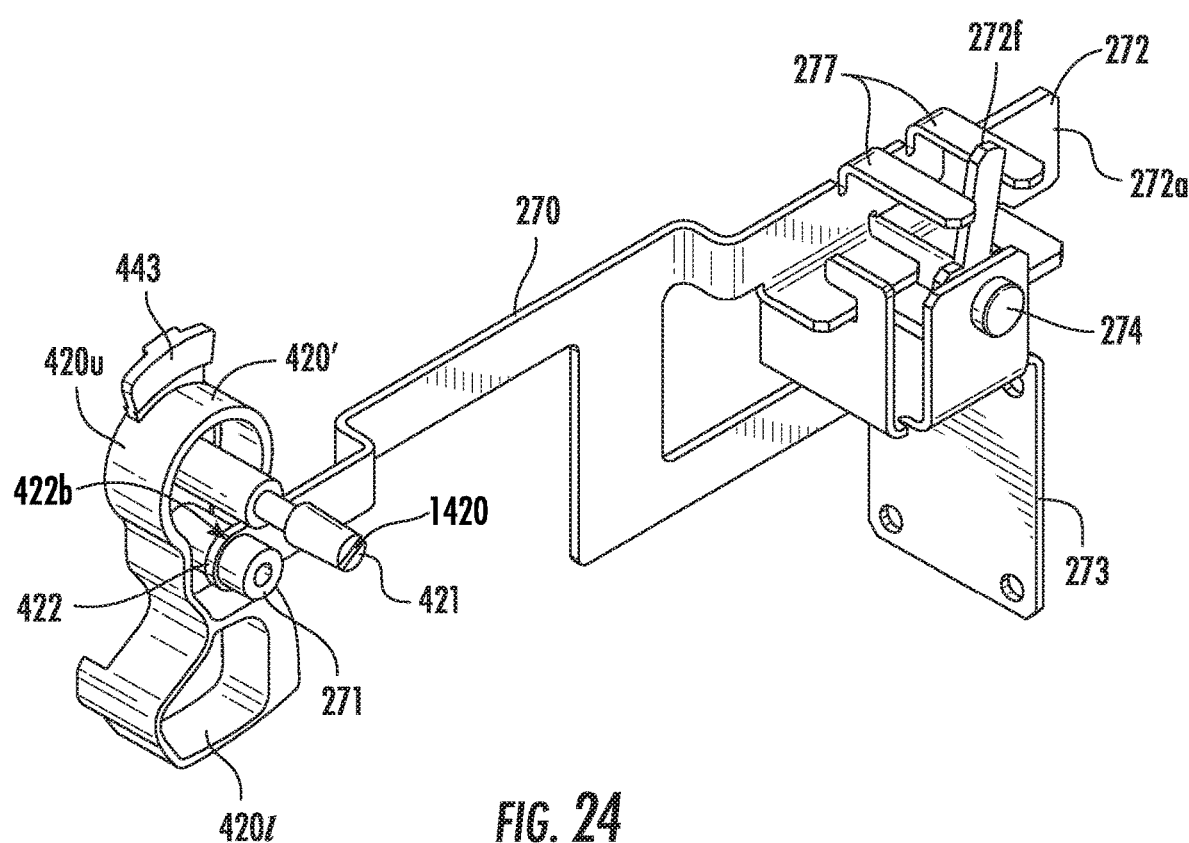
FIG. 24 is a top, rear perspective view of a unit latch sub-assembly of the unit shown in FIGS. 22 and 23.
Figure 25A:
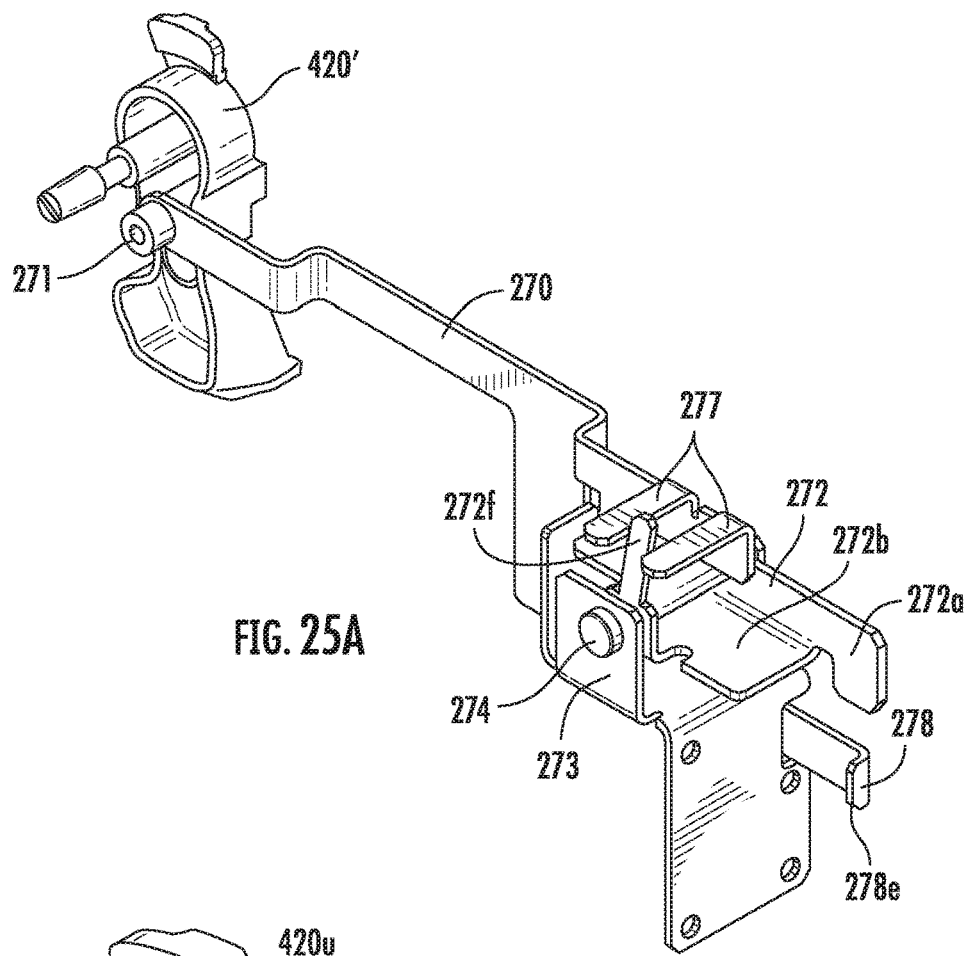
FIG. 25A is a top, side perspective view of the unit latch sub-assembly shown in FIG. 24.
Figure 25B:
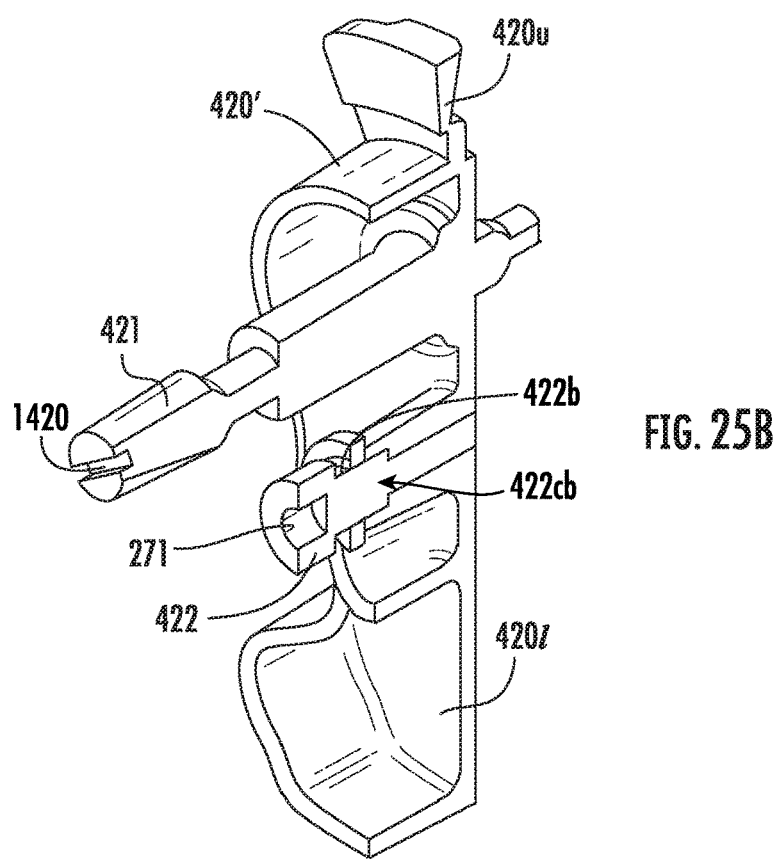
FIG. 25B is a partial, enlarged section view of the unit latch and shoulder assembly shown in FIG. 25A.

Referring now to FIGS. 24, 25A, 25B, the unit latch 420' can include a shoulder 422 that resides medially between upper and lower portions 420u, 420l, respectively, thereof. The shoulder 422 can extend toward the front of the unit in a horizontal orientation (FIGS. 22, 23). The shoulder 422 can include a boss 422b that holds a screw to couple to the linkage 270.

A fixation member 271 (shown as a screw) can attach the linkage 270 to the shoulder 422 of the unit latch 420'. The linkage 270 can be coupled to a pivot support member 273 which can be mounted stationary in the unit housing between adjacent disconnect switches 30 and can be coupled to the pivot member 272 via pivot pin 274.

Referring to FIGS. 24 and 25A, the pivot member 272 can have a base 272b and an arm 272a that extends away from the base 272b to reside adjacent the handle cam 24 of the second disconnect switch $30_2$ (FIGS. 22, 23). The arm 272a can engage and block (FIG. 22) or disengage (and not block) the handle cam 24, depending on the orientation of the unit latch 420'. The linkage 272 can comprise parallel inwardly extending (typically horizontally oriented) arms 277 that cooperate with an upwardly extending finger 272f of the pivot member 272 to limit the travel of the pivot member 272.

Figure 26A:
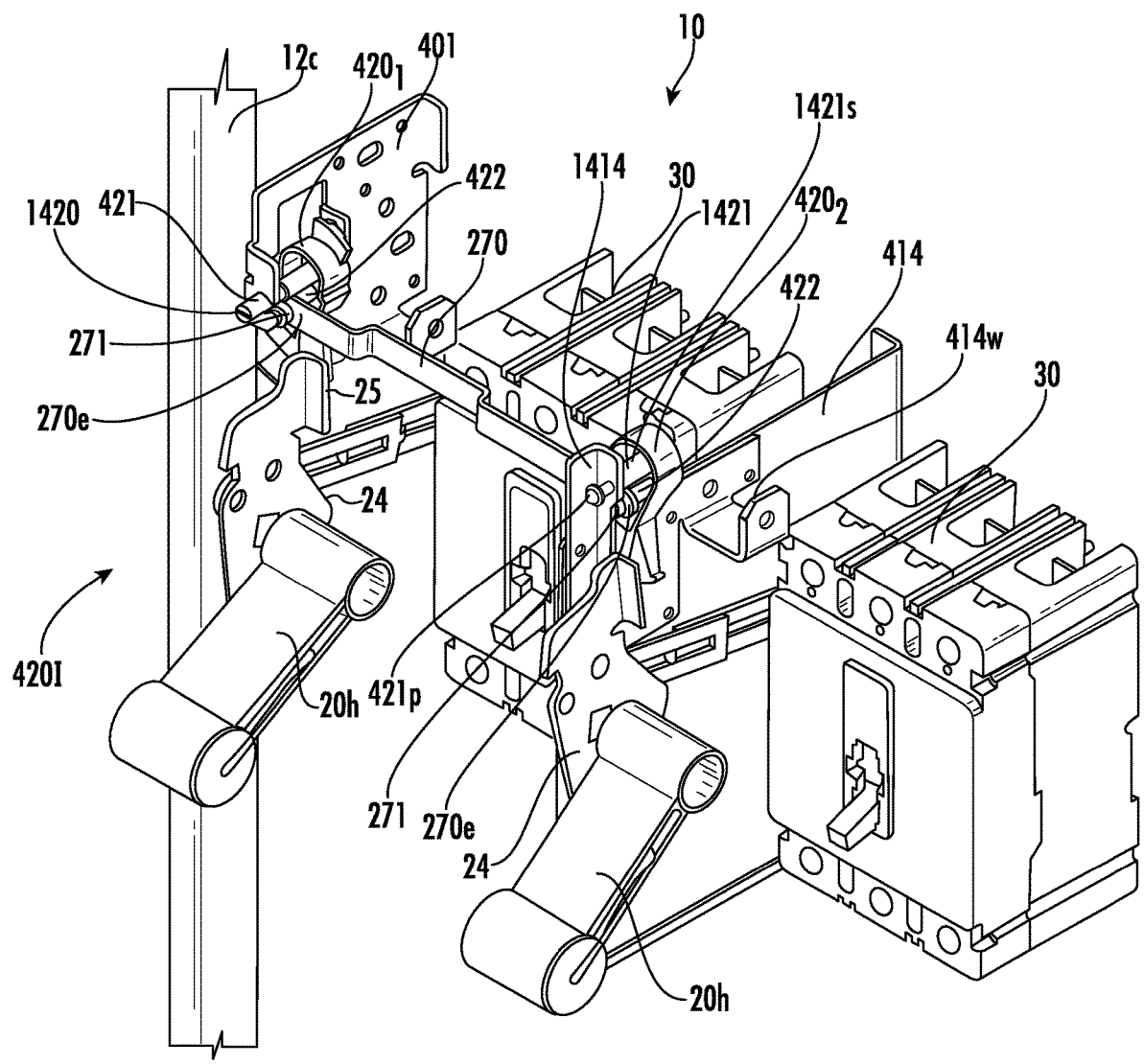
FIGS. 26A and 26B are front, side perspective views of another embodiment of a unit latch according to embodiments of the present invention.
Figure 26B:
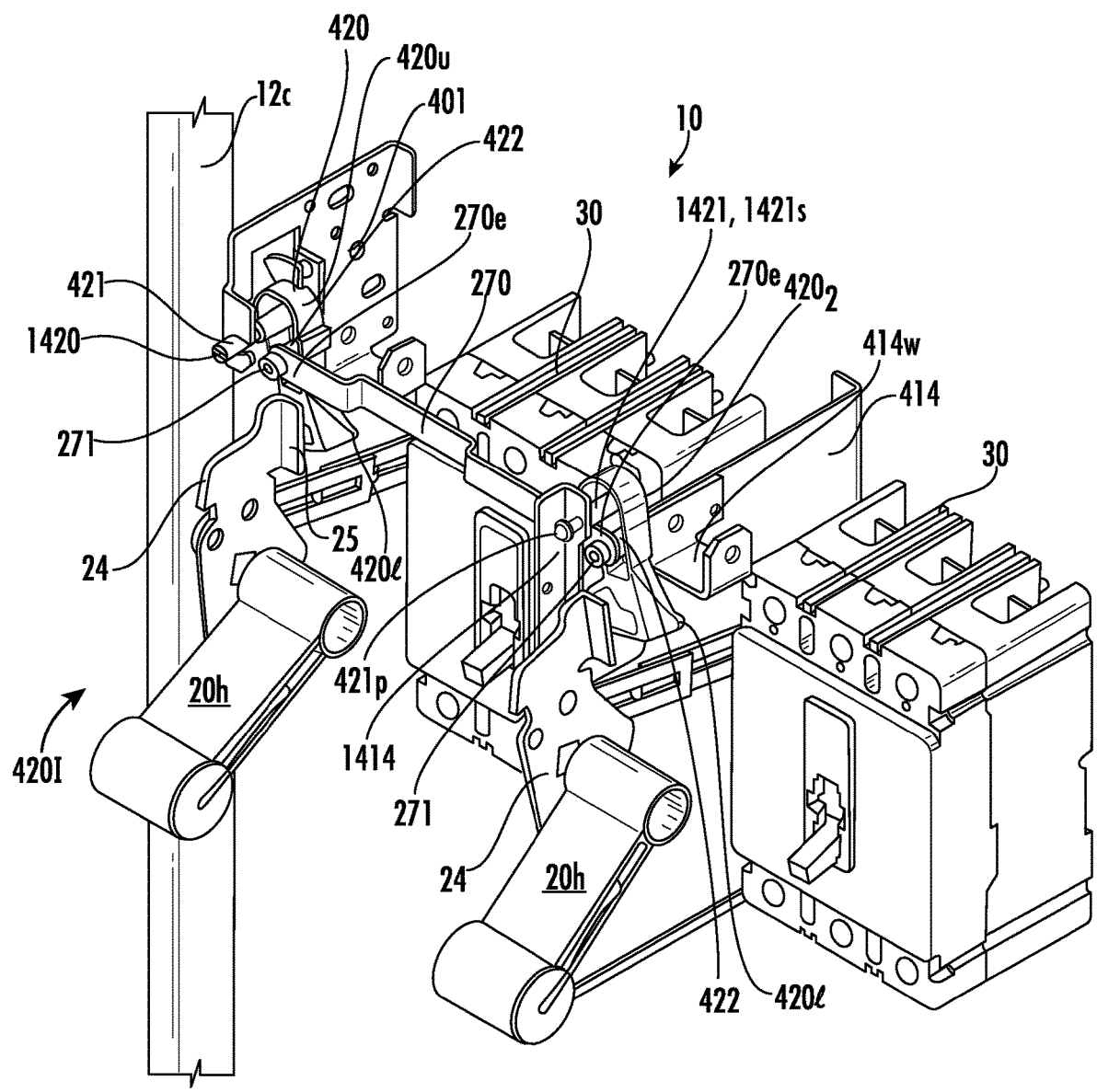

FIGS. 26A and 26B illustrate another unit interlock subsystem 420I for bucket/unit placement according to embodiments of the present invention. In this embodiment, the unit latch subsystem 420I can be configured to include first and second unit latches $420_1$, $420_2$ attached to at least one laterally extending linkage 270. The linkage 270 can be coupled to each of the unit latches $420_1$, $420_2$ by fixation members 271 such as by screws or pins. One end portion 270e of the linkage 270 can be coupled to the first unit latch $420_1$ and an opposing end portion 270e can be coupled to the second unit latch $420_2$. The second unit latch $420_2$ on the right side is similar to the first unit latch $420_1$ on the left side. Each of the first and second unit latches $420_1$, $420_2$ can have a respective unit latch body 420b that can pivot in clockwise and counterclockwise directions. The primary body 420b of the second unit latch $420_2$ interacts with the second (right) handle mechanism 20h in the same ways that the first unit latch body 420b interacts with the first (left) handle mechanism 20h. The second unit latch $420_2$ is entirely internal to the unit housing 10h (FIG. 36B) at all times, it does not require a detent feature, a biasing spring, travel stops, or any way for a user to turn it from outside of the unit with a tool.

The second unit latch $420_2$ can comprise a coupling feature 1421 such as a pivot pin 421p and/or shaft 1421s allowing the body 420b to pivot (clockwise and counterclockwise) in concert with the first unit latch $420_1$. The second unit latch $420_2$ can positionally mimic the first unit latch $420_1$ to be in a corresponding blocked or unblocked position at all times. The coupling feature 1421 can couple the primary body 420b of the second unit latch $420_2$ to an intermediate wrapper 414.

The primary body 420b of the first and second unit latches $420_1$, $420_2$ can have a curvilinear perimeter, upper and lower portions 420u, 420l and a shoulder 422 residing between the upper and lower portions. The linkage 270 can be attached to the shoulder 422, typically to a boss 422b of the shoulder 422 of the first unit latch $420_1$ and a boss 422b of a shoulder 422 of the second unit latch $420_2$ via fixation members 271 such as screws. The shoulders 422 can extend toward the front of the unit housing in a horizontal orientation, orthogonal to the laterally extending shaft 21 of the handles 20h. The shoulder 422 can reside under the coupling feature 1421 and the shaft 422 of the respective primary bodies 420b.

The linkage 270 and one or both of the fixation members 271 can be pivotably coupled (FIG. 25B). At least the internal fixation member 271 adjacent the second unit latch $420_2$ can define a shoulder for the linkage 270.

The linkage 270 can fit loosely around one or both of the fixation members 271. The unit latch primary body 420b can be configured with a counter bore 422cb (FIG. 25B) in the shoulder 422 where the respective fixation member 271, e.g., screw, can be configured to bottom out before it pinches the linkage to hold it in place. Without a sufficiently loose coupling configuration, with the fixation members 271 tightened down to a connection where the linkage 271 is otherwise pinched in between the head of the fixation member 271 and the unit latch boss 422b, an undesired amount of resistance to turning the second (left) unit latch $420_2$ may occur.

The second unit latch $420_2$ can be coupled to a bracket 1414 that is coupled to an intermediate wrapper 414. A coupling feature 1421 of the second unit latch $420_2$ can reside above the shoulder 422 and can be parallel thereto. This coupling feature 1421 is shown as a shaft 1421s. The coupling feature 1421 can be configured to allow the second unit latch $420_2$ to pivot in response to movement of the first unit latch $420_1$. The coupling feature 1421 of the second unit latch $420_2$ can be coupled to the bracket 1411 by a pin 421p that allows the second unit latch $420_2$ to pivot in right and left directions relative to the bracket 1414. Where the coupling feature 1421 comprises a shaft 1421s, the shaft 1421s can be defined by a molded or fabricated projection, a pin, rod or other component that extends through an aperture of the unit latch body, for example. The shaft 1421 may provide structural stability (anti-skew) and/or balance. The coupling feature 1421 of the second unit latch 420$_2$ can comprise a washer and/or shaft 1421s that can position the unit latch primary body 420b at a correct depth position (front to back) inside the unit housing, typically parallel and laterally in-line with the primary body 420b of the first unit latch 420$_1$.

The upper portion 420u of the primary body 420b of the second unit latch 420$_2$ can have a different shape than the upper portion 420u of the primary body 420b of the first unit latch 420$_1$. The flange 443 of the upper portion 420u of the primary body 420b of the first unit latch 420$_1$ is not required and is typically not provided by the upper portion 420u of the primary body 420b of the second unit latch 420$_2$.

As shown in FIG. 26B, the lower portion 420$_1$ of the second unit latch 420$_2$ can abut a ledge 25 of the (right) handle cam 24 to block the corresponding handle 20h from being moved to an ON position if the first unit latch 420$_1$ is not in an extended position, locked to the cabinet 12 (FIG. 26A). When the first unit latch 420$_1$ is in the proper installed interlock position confirming proper bucket installation in a cabinet 12 (FIG. 26A), both handle cams 24 are (concurrently) allowed to move thereby allowing both handles 20h to be moved to the ON position.

Figure 30:
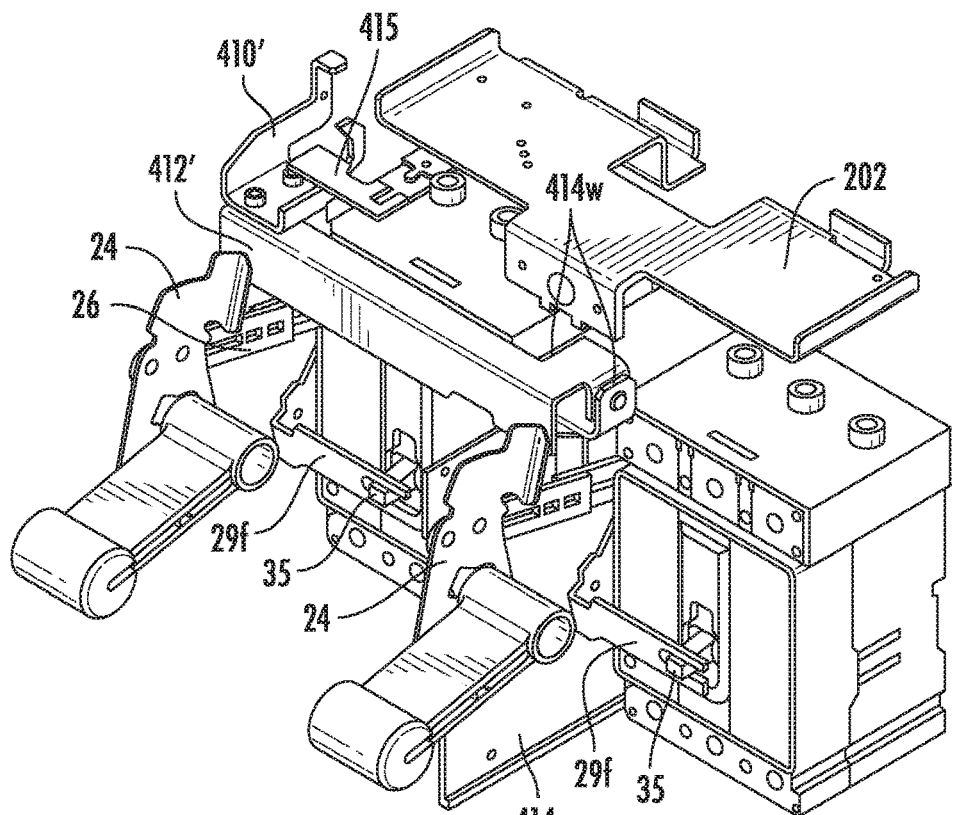
FIGS. 30 and 31 are front partial side perspective views of a unit with the dual disconnect switches and handles that cooperate with a power connection position interlock according to embodiments of the present invention.
Figure 31:
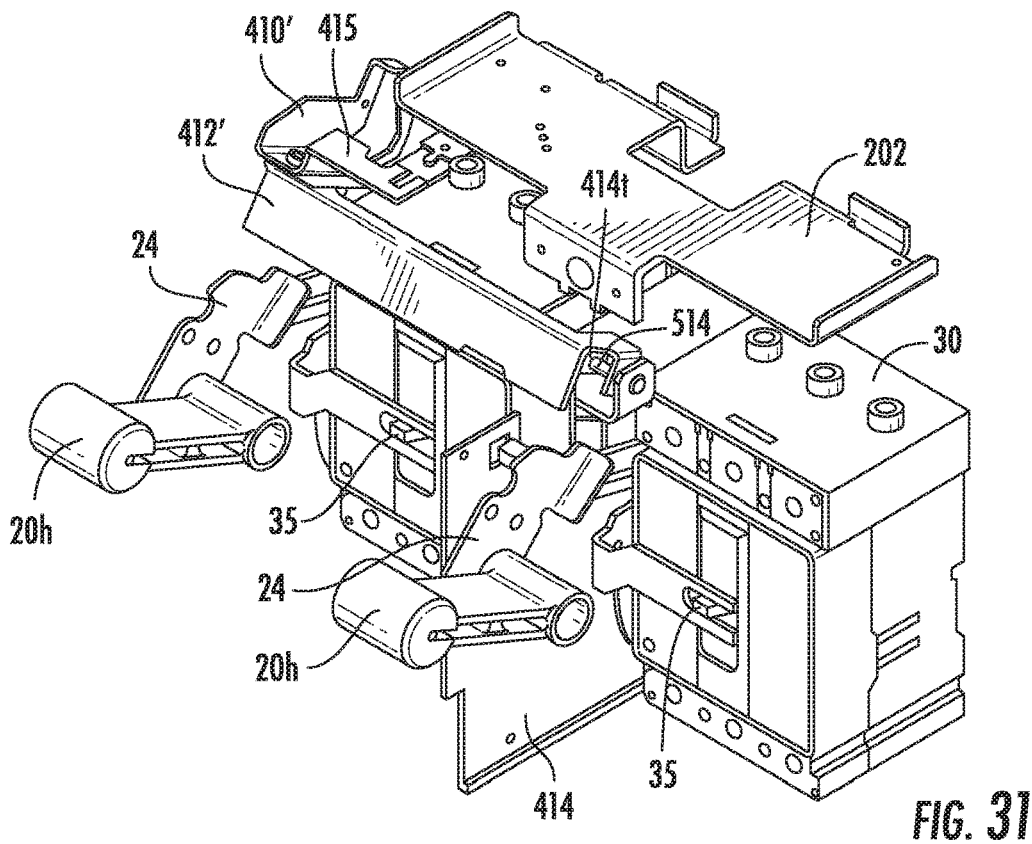
Figure 32:
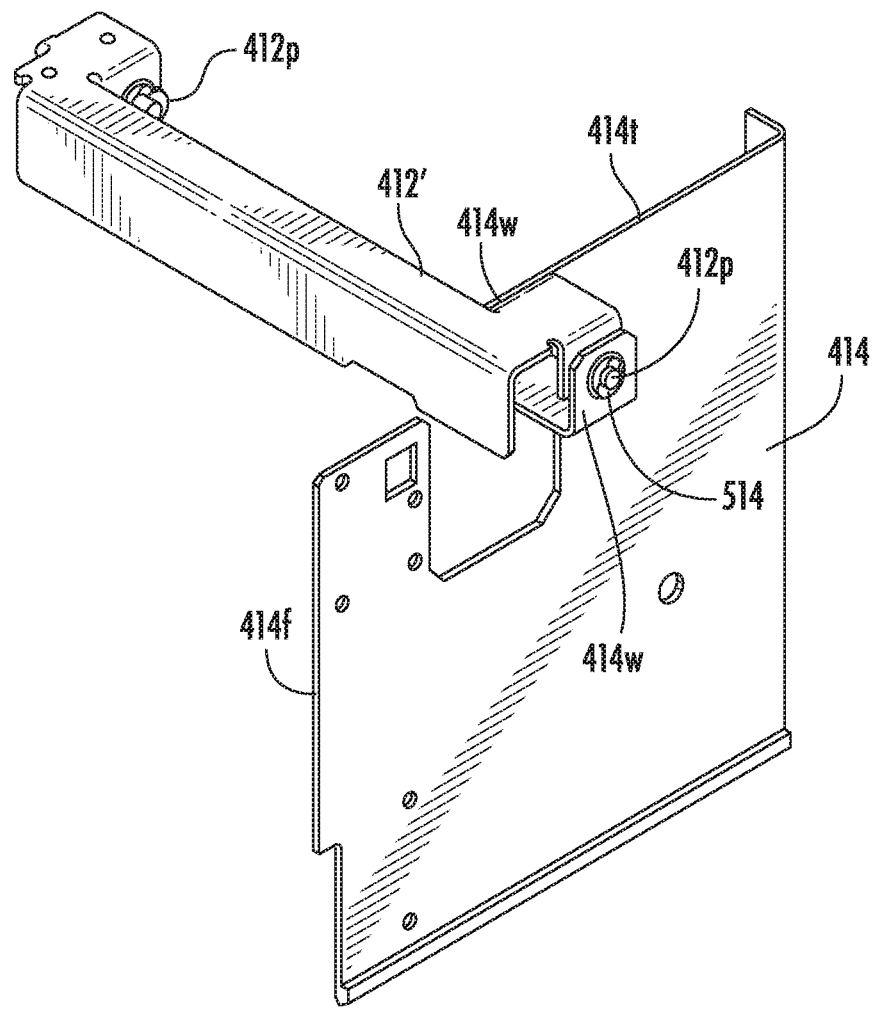
FIG. 32 is a front side perspective with of a power position interlock sub-assembly of the power connection position interlock shown in FIGS. 30 and 31.

The bracket 1414 can also be configured to provide coupler segments 414w for a pivot assembly of the power connection interlock (FIGS. 30-32).

Figure 27:
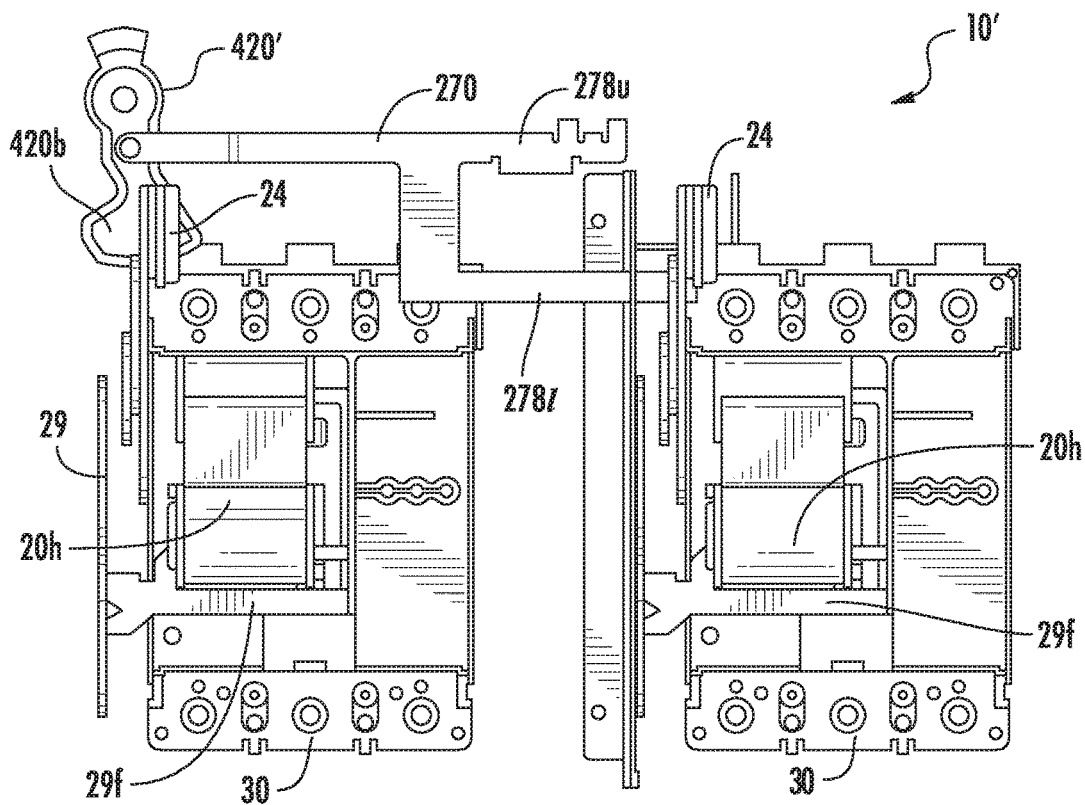
FIGS. 27 and 28 are front partial illustrations of the unit with the dual disconnect switch configuration and an example handle mechanism linkage according to embodiments of the present invention.
Figure 28:
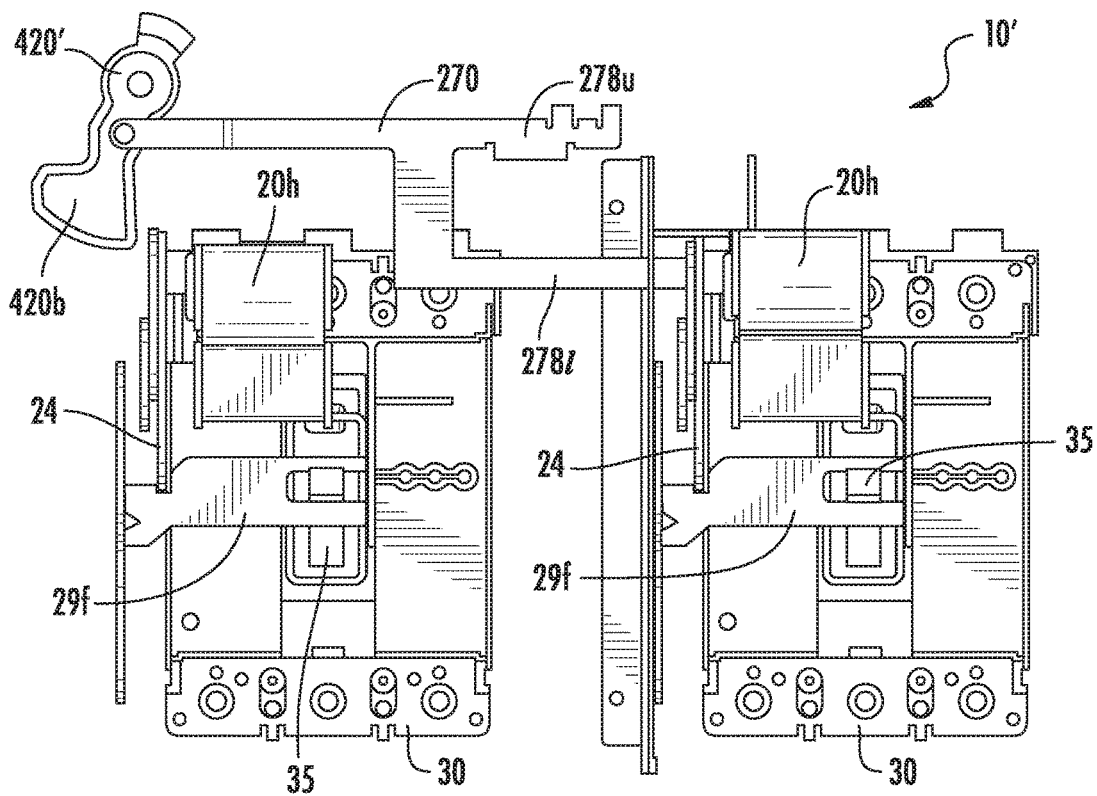

FIGS. 27 and 28 illustrate another interlock for bucket/ unit placement according to embodiments of the present invention. FIG. 27 shows a status of the bucket/unit 10' with all disconnect switches off and the unit latch 420' operable. FIG. 28 shows that if either disconnect switch 30 is on, the unit latch 420' is engaged with the cabinet and inoperable such that it cannot be disengaged from the cabinet.

Figure 29:
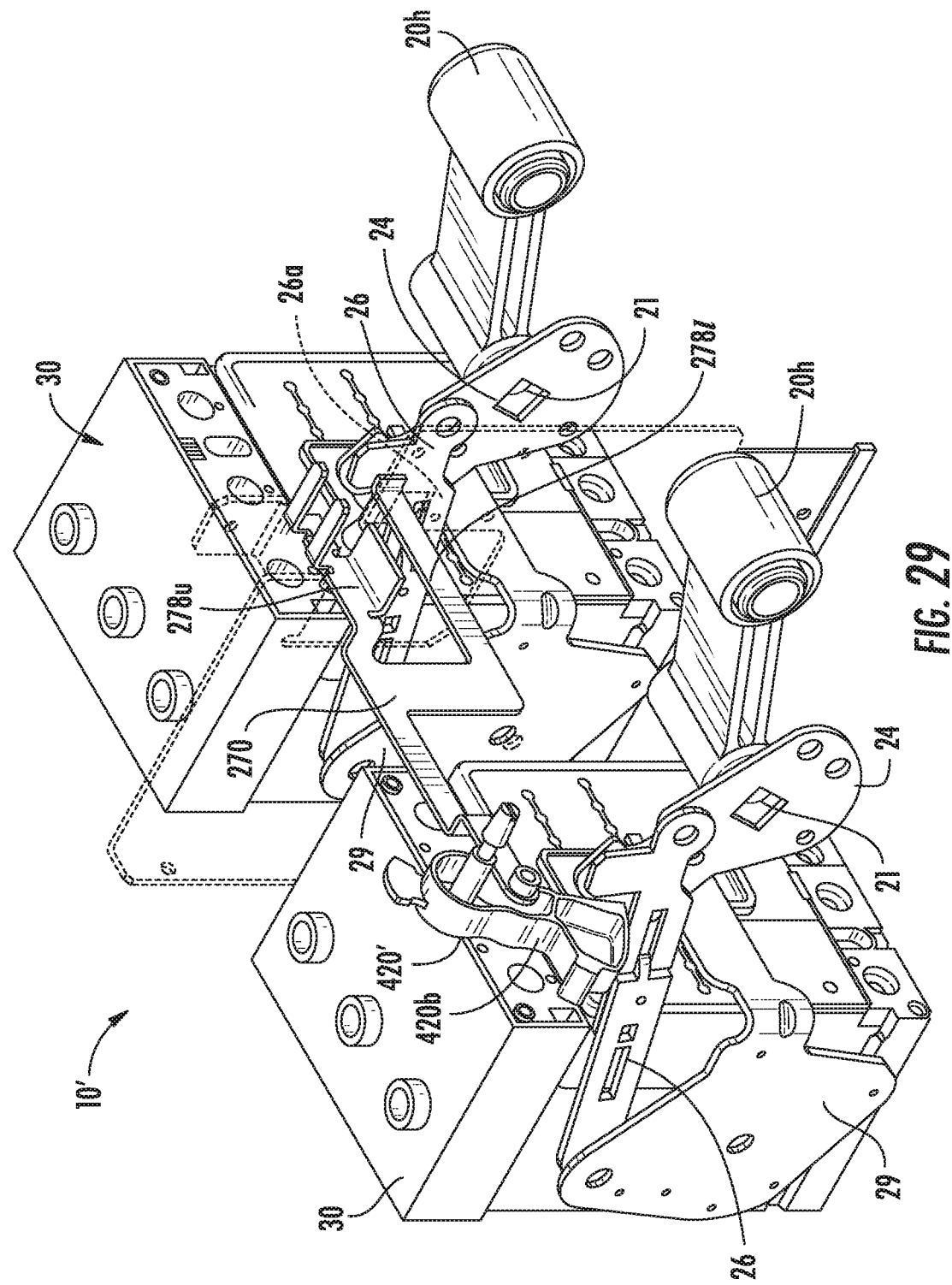
FIG. 29 is a side perspective, partial view of the unit shown in FIGS. 27 and 28 according to embodiments of the present invention.

As shown in FIG. 29, the linkage 270 can have parallel upper and lower arms 278u, 278l. The lower laterally extending arm 278l of the linkage 270 can be used to provide the interlock discussed above with respect to 26e (FIGS. 4D, 4E) to prevent the unit latch 420' from rotation to the unlatched position. The lower arm 278l can have an innermost end 278e that can cooperate with the innermost handle mechanism linkage 26. Thus, as the handle 20h begins to rotate from the Off toward the On position (FIG. 4E), the unit latch 420' can be blocked by an extension 26e on the link 26a of the first disconnect switch 30$_1$ and/by the lower arm 278l of the second disconnect switch 30$_2$ to prevent the unit latch 420' from rotation to the unlatched position.

The first and second handle cams 24 can each comprise a plate with a curvilinear perimeter and a laterally inward extending ledge 25 (FIG. 15A) that is orthogonal to the plate 24. The ledge 25 of the first handle cam 24 contacts the unit latch body 420b and the ledge 25 of the second handle cam contacts the lower arm 278l of the laterally extending linkage 270 when the unit latch 420' is in the unlatched position.

Thus, in some embodiments, the purpose of the lower arm 278l is to contact the extension 26e to prevent operation of the unit latch 420'. In another embodiment, the extension 26e can be omitted and the lower arm 278l can contact the handle cam 24 directly to achieve the same result (in that case, the unit latch body 420b can directly contact the first handle cam 24).

The ledge 25 of the first handle cam 24 can contact the latch body 420b to prevent operation of the first handle mechanism. On the other side, that this function can be achieved by ledge 25 of the second handle cam and the arm 272a of the pivot member 272 (not requiring the use of the lower arm 278l).

FIGS. 30 and 31 illustrate a power connection position interlock 410' that can be used for a dual feeder/starter unit 10'. FIG. 30 shows the orientation of the interlock 410' when the stabs S (FIG. 5) are retracted and the disconnect switches 30 inoperable. FIG. 31 shows the orientation of the interlock 410' when the stabs S are extended and both disconnect switches 30 operable.

As shown, the power connector interlock 410' is connected to the carriage 202. The carriage 202 keys to the power connection position interlock 410' when stabs/power connectors 46, 48, 50 are in a power connected position with stabs extended (FIG. 7B). The pivot plate 412' can pivot up and down. When down, the pivot plate 412' can concurrently block both of the handle cams 24 (from rotation toward an On position) when the power connector assembly 200 is in a retracted position. The pivot plate 412' can have a laterally extending length that is sufficient to extend over both handle cams 24 concurrently. The length can be a laterally extending length that is greater than a laterally extending width of at least one of the disconnect switches 30. The pivot plate 412' can be pivotably attached at both opposing ends as shown (or a single end, not shown).

Referring to FIGS. 30, 31 and 32, the pivot plate 412' can be pivotably attached at both laterally spaced apart end portions 412p, with the innermost one pivotably coupled to an intermediate wrapper 414. The intermediate wrapper 414 resides between the first and second disconnect switches 30$_1$, 30$_2$ in the unit housing 10h (FIG. 6C). As shown, the intermediate wrapper 414 is parallel to the sidewalls of the unit housing and has a front edge 414f that is forward of the first and second disconnect switches.

The top portion 414t of the intermediate wrapper 414 can comprise laterally spaced apart coupler segments 414w. The coupler segments 414w can hold a fixation member 514 that is pivotably attached to the innermost end portion of the pivot plate 412'.

The coupler segments 414w can be defined by a shaped portion of the intermediate wrapper 414 and/or can be provided by a bracket coupled to the intermediate wrapper 414. The coupler segments 414w can reside at an upper portion of the intermediate wrapper 414.

Figure 33:
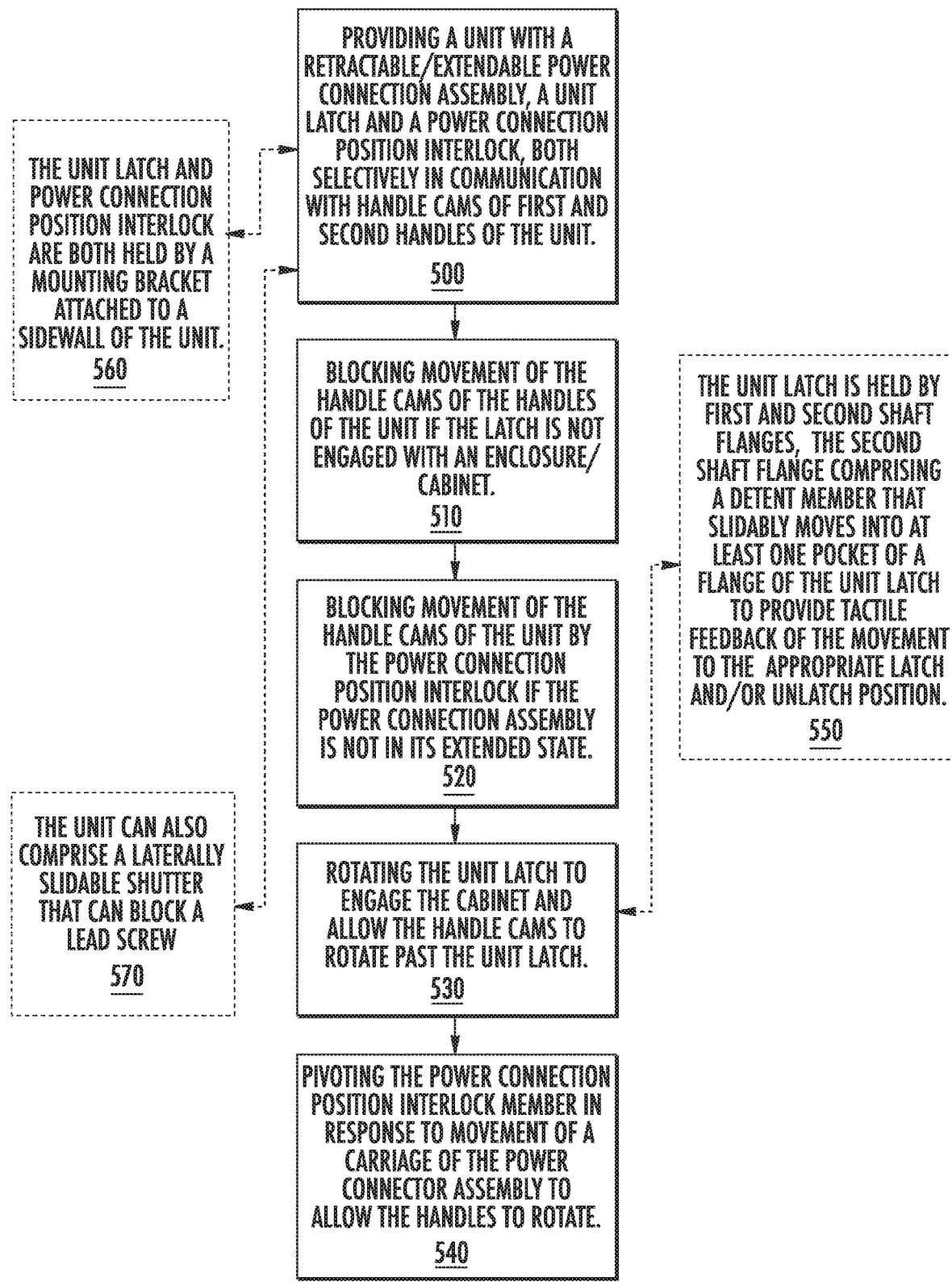
FIG. 33 is a flow chart of exemplary actions that can be used to engage and disengage interlocks of a unit according to embodiments of the present invention.

Referring to FIG. 33, actions for controlling operation of a unit are shown. A unit with a retractable/extendable power connection assembly, a unit latch and a power connection position interlock, both selectively in communication with first and second handle cam s of first and second handles of the unit is provided (block 500). Movement of the handle cams of the handles of the unit are concurrently blocked by the unit latch if the latch is not engaged with an enclosure/ cabinet (block 510). Movement of the first and second handle cams of the unit by the power connection position interlock are concurrently also blocked if the power connection assembly is not in its extended state (block 520). The unit latch rotates to engage the cabinet and allow the handle cams to rotate past the unit latch (block 530). The power connection position interlock member pivots in response to movement of a carriage of the power connector assembly to allow the handles to rotate (block 540).

The unit latch can be held by first and second posts, the second post comprising a detent member that slidably moves into at least one pocket of a flange of the unit latch to provide tactile feedback of movement to the appropriate latch and/or unlatch position (block 550).

The unit latch and power connection position interlock can both be held by a mounting bracket attached to a sidewall of the unit (block 560). The unit can also comprise a laterally slidable shutter (block 570) that can block a lead screw if either of the breakers are On. The shutter can operate independently of the power connection assembly. If the power connection assembly is retracted (not engaged with the power bus bars) then the handles are prevented from rotating from the Off to On position by the power connection interlock 410'. In this case the shutter allows access to the lead screw and the shutter cannot slide to the right to block access to the lead screw. If the power connection assembly is extended (engaged with the power bus bars) then the handles are free to rotate from the Off to On position (assuming the unit latch is also engaged and not blocking the handle cam). If the power is Off, then the shutter provides access to the lead screw. If the power is On, then the shutter slides to the right and blocks access to the lead screw.

Figure 34A:
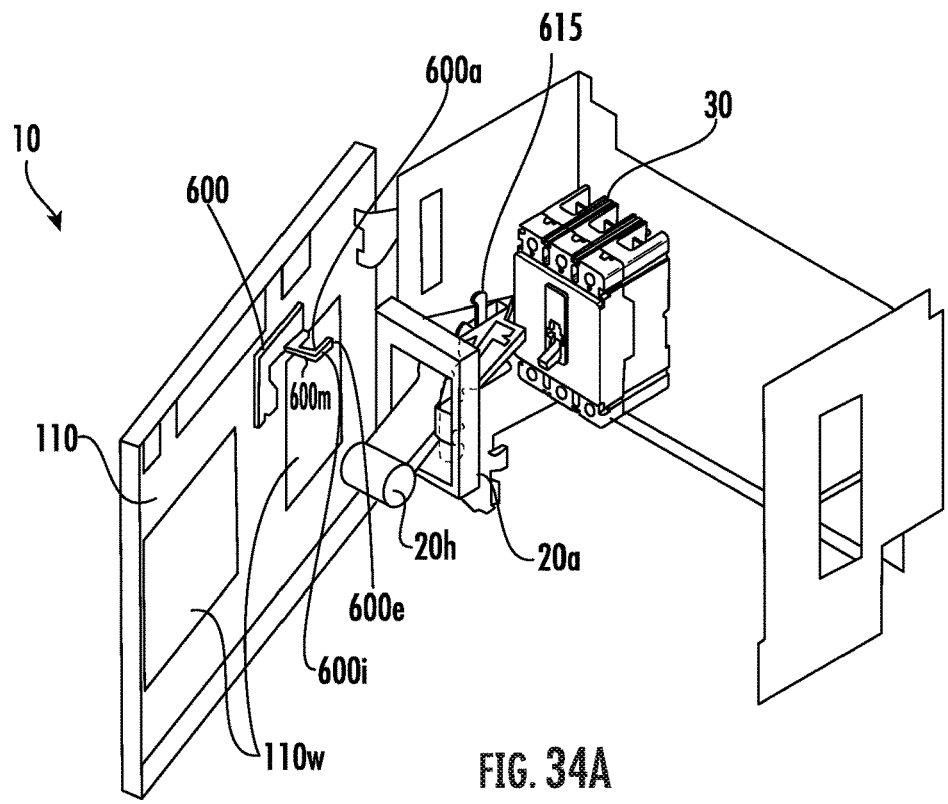
FIG. 34A is a front perspective view of a unit comprising a front door with a door position interlock according to embodiments of the present invention.
Figure 34B:
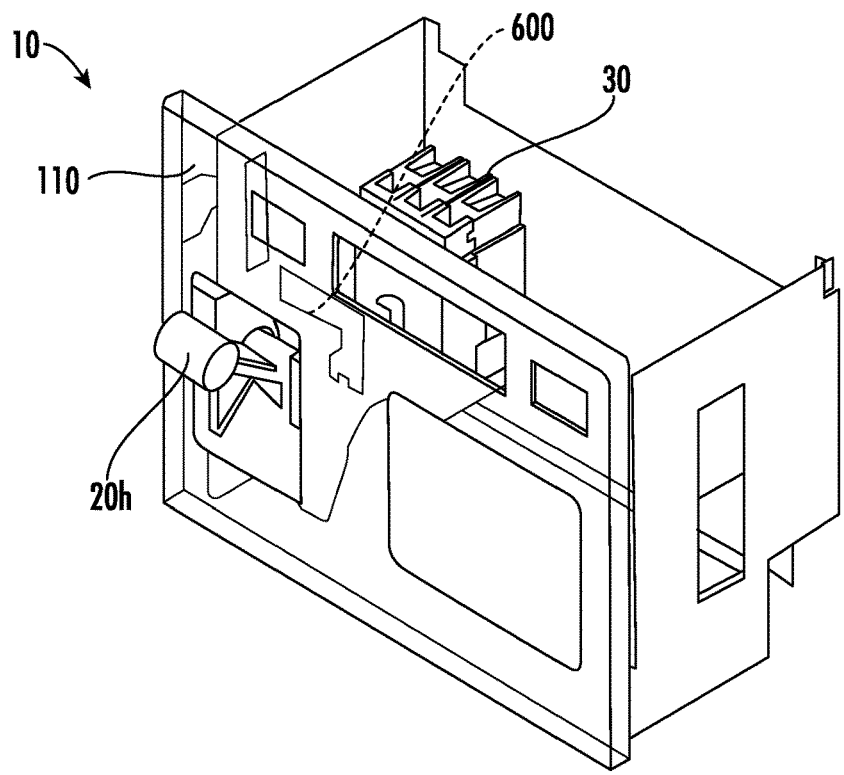
FIG. 34B is a front perspective view of the unit shown in FIG. 34A illustrating the door in a closed position.

Referring to FIGS. 34A and 34B, the unit 10 can also comprise at least one door position interlock 600. The unit 10 comprises a front door 110 that has a least one window 110w and a door position interlock 600 that faces the interior of the unit 10. The handle assembly 20a is configured to couple to the unit with the handle 20h extending out through the window 110w. The door position interlock 600 can include an inwardly extending arm 600a can have a hook shape, e.g., an inner end segment 600i that is orthogonal to an adjacent medial segment 600m, with the inner end segment comprising a free inner end 600e. The inner end segment 600i is configured to engage a handle interlock member 615 coupled to the handle 20h when the door 110 is closed. When the door 110 is open, the handle interlock member 615 is in a position that prevents the handle 20h from movement, e.g., the handle 20h cannot be moved to an ON position from an OFF position. When the door 110 is closed, the inner end segment 600i of the door position interlock 600 engages the handle interlock member 615 which disengages the handle interlock member 615 allowing the handle to be operable to be able to move to an ON position (FIG. 34B). The door position interlock 600 can also be configured to prevent a user from opening the door 110 if the handle is not in the OFF position.

The door position interlock 600 can reside above the window 110w and the inner end 600i can be oriented with the free end 600e facing a left sidewall 30 of the unit 10 and/or with the inner end segment 600i being perpendicular to the sidewall 13, in some particular embodiments.

Figure 35A:
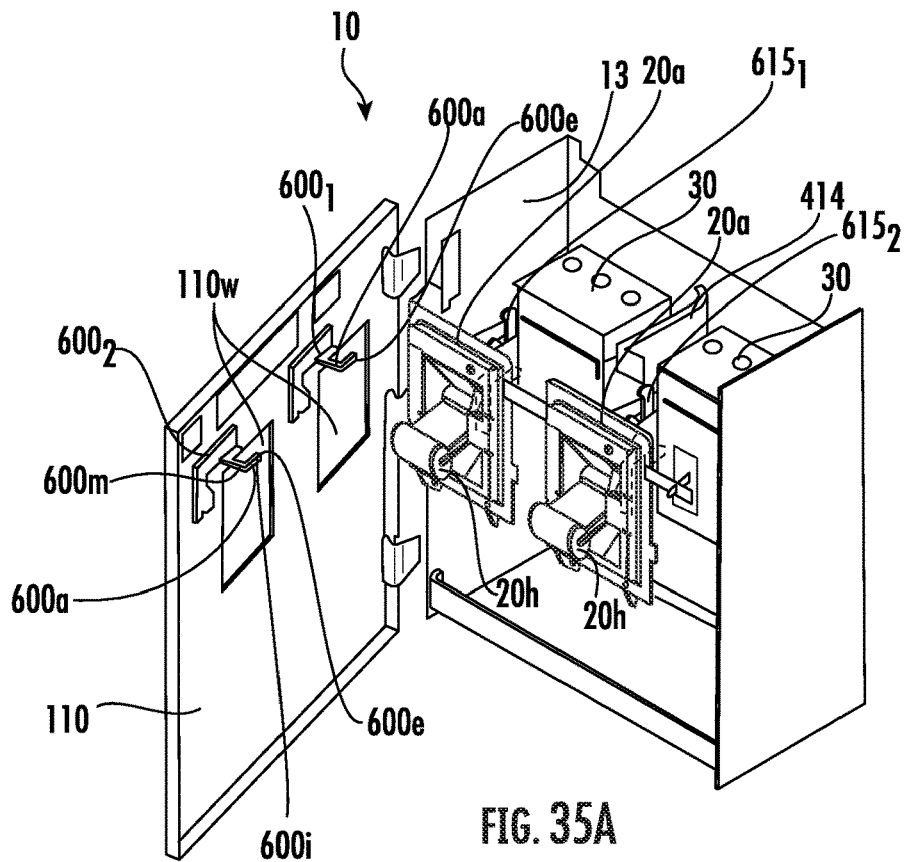
FIG. 35A is a front perspective view of a unit comprising dual internal disconnect switches and comprising a front door with door position interlocks according to embodiments of the present invention.
Figure 35B:
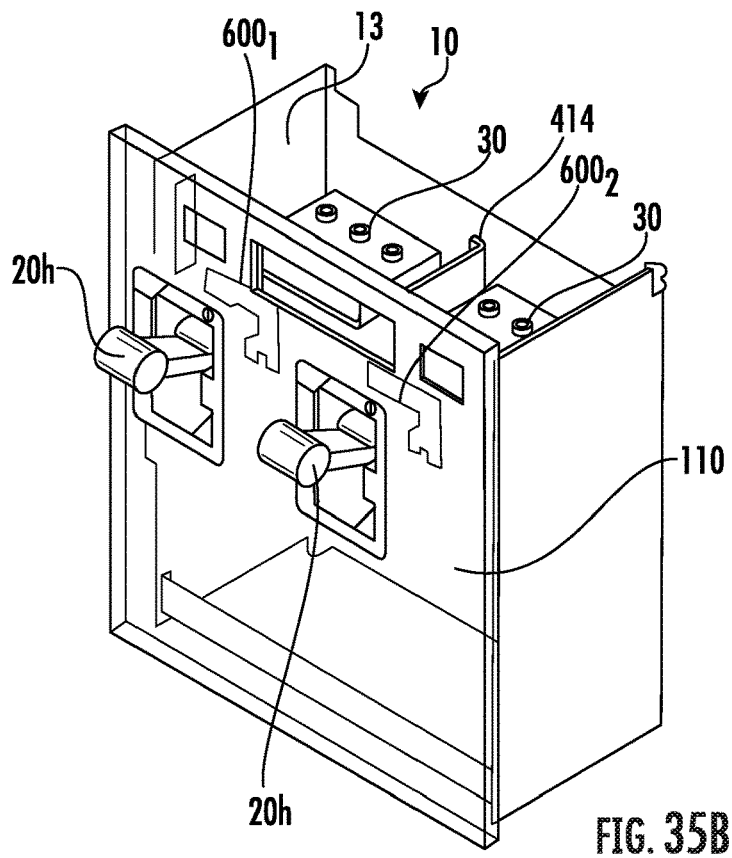
FIG. 35B is a front perspective view of the unit shown in FIG. 35A illustrating the door in a closed position.

FIGS. 35A and 35B illustrate a dual door position interlock $600_1$, $600_2$, one for each handle assembly 20a and each with the arm 600a described above configured to engage a respective handle interlock member $615_1$, $615_2$. An internal intermediate wrapper 414 can reside between dual disconnect switches 30 that are connected to respective handle assemblies 20a. When the door 110 is closed, the door position interlocks $600_1$, $600_2$ disengage the corresponding handle interlock member $615_1$, $615_2$. When the door 110 is open (FIG. 35A), the handle interlock members $615_1$, $615_2$ are both in a position that prevents a corresponding handle 20h from movement, e.g., the handle 20h cannot be moved to an ON position from an OFF position. When the door 110 is closed, the inner end segment 600i of each of the door position interlocks $600_1$, $600_2$ engages the corresponding handle interlock member $615_1$, $615_2$ which, in turn, disengages the handle interlock members $615_1$, $615_2$, allowing the handles 20h to be operable to be moveable to an ON position (FIG. 35B). The door position interlocks $600_1$, $600_2$ can also be configured to prevent a user from opening the door 110 if the handles are not in the OFF position.

The door position interlocks $600_1$, $600_2$ can reside above a corresponding window 110w and/or handle 20h.

As shown, the inner end 600i of each of the interlocks $600_1$, $600_2$ can both be oriented with the free end 600e facing a left sidewall of the unit 10 and/or with the inner end segment 600i being perpendicular to the sidewall 13, in some particular embodiments. In other embodiments, the free end 600e can face a right sidewall or one free end 600e can face the right sidewall and the other face the left sidewall (not shown). The arm 600a of the door position interlock $600_1$, $600_2$ can have other configurations.

Figure 36A:
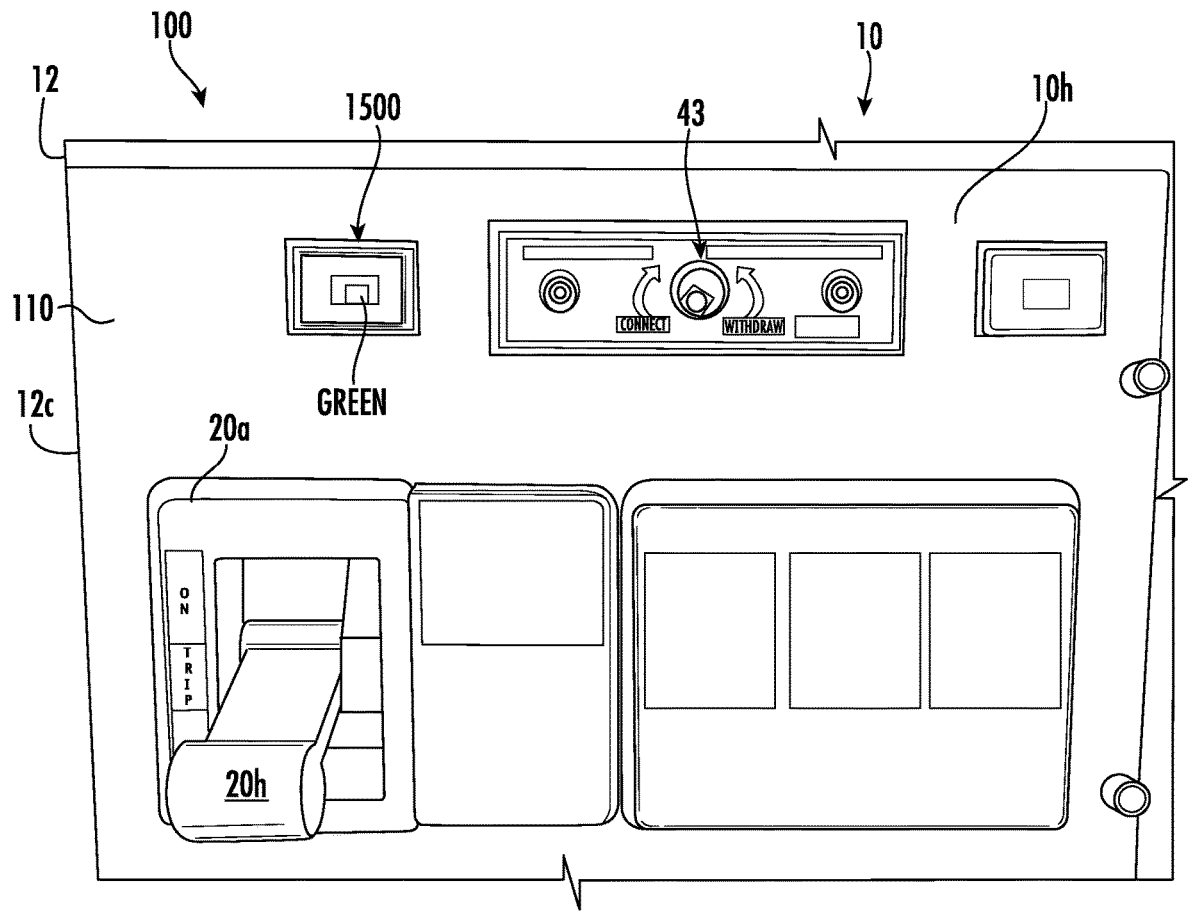
FIG. 36A is a front view of an example unit in a cabinet according to embodiments of the present invention.
Figure 36B:
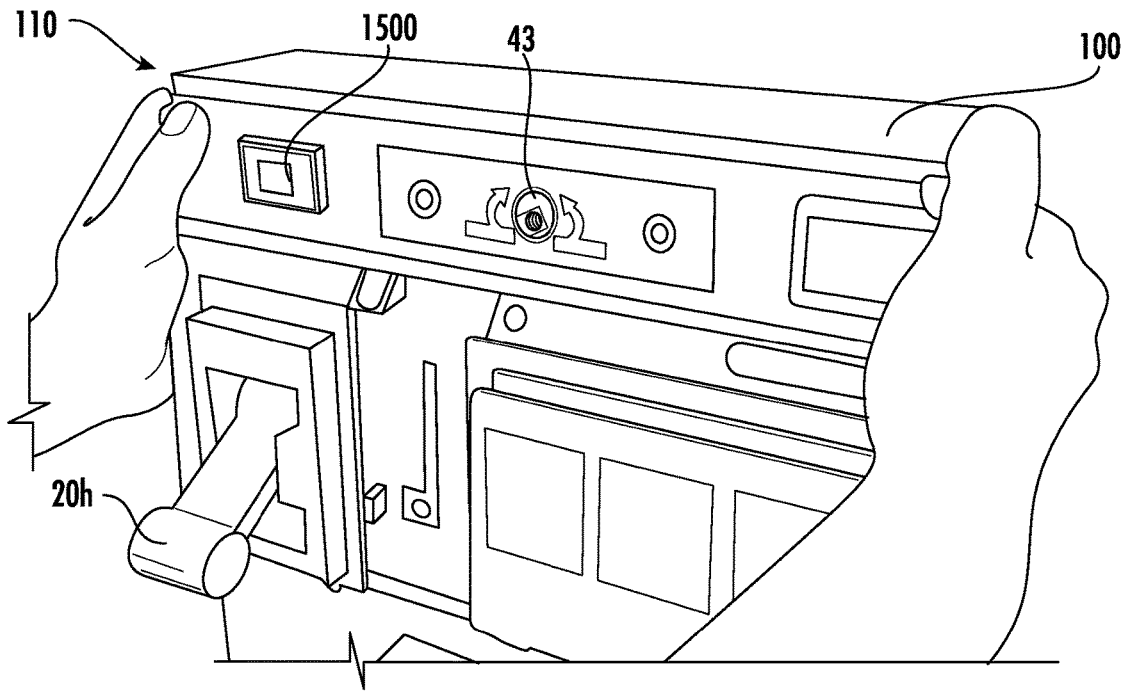
FIG. 36B is a side perspective view of the unit shown in FIG. 36A with the door open and the unit in a configuration that allows the unit to be withdrawn from the cabinet according to embodiments of the present invention.

FIG. 36A is an example view of a unit 10 comprising a unit housing 10h in a cabinet 12 with a front corner post 12c, typically an MCC 199 with the power stab position indicator 1500 in a "green" position indicating the stabs are in a withdrawn/not connected position. The unit 10 has a racking receiver 43 and the handle 20h is in the Off position. FIG. 36B illustrates that the unit 10 has the appropriate interlocks disengaged, with the door 110 open, allowing the unit 10 to be withdrawn.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A bucket assembly, comprising:
   a unit housing having a front and opposing laterally spaced apart sidewalls;
   a first operator handle supported by the unit housing that faces the front of the unit housing;
   a second operator handle supported by the unit housing that faces the front of the unit housing and that is laterally spaced apart from the first operator handle;
   a first laterally extending shaft attached to the first operator handle and that resides inside the unit housing;
   a first handle cam attached to the first operator handle and that resides inside the unit housing;
   a second laterally extending shaft attached to the second operator handle and that resides inside the unit housing;
   a second handle cam attached to the second operator handle and that resides inside the unit housing;
   a power connection assembly held in the unit housing, the power connection assembly comprising power connectors movable between power connection extended and retracted positions; and
   a power connection position interlock in the unit housing, wherein the power connection position interlock is coupled to the power connection assembly and engages the first and second handle cams to block the first and second handle cams from movement toward an ON position when the power connection assembly is in the retracted position.

2. The bucket assembly of claim 1, further comprising a coupler attached to a carriage of the power connection assembly that is configured to pivot a laterally extending pivot plate of the power connection position interlock when the power connection assembly is in the extended position to unblock the first and second handle cams to allow movement toward the ON position, and wherein the laterally extending pivot plate has a laterally extending length that is greater than a laterally extending width of one disconnect switch and less than a laterally extending width between the sidewalls of the unit housing.

3. The bucket assembly of claim 1, wherein the bucket assembly further comprises:
   first and second spaced apart disconnect switches, the first disconnect switch coupled to the first operator handle and the second disconnect switch coupled to the second operator handle; and
   an intermediate wrapper that resides between the first and second disconnect switches in the unit housing, wherein the intermediate wrapper is parallel to the sidewalls of the unit housing and has a front edge that is forward of the first and second disconnect switches,
   wherein the power connection position interlock comprises a laterally extending pivot plate that is pivotably attached to the intermediate wrapper, and wherein the laterally extending pivot plate is configured to concurrently engage the first and second handle cams of the power connection position interlock to block the first and second handle cams from movement toward the ON position when the power connection assembly is in the retracted position.

4. The bucket assembly of claim 3, wherein the intermediate wrapper comprises a top portion with first and second laterally spaced apart wall segments, and wherein a fixation member is attached to the first and second wall segments and an innermost end portion of the pivot plate.

5. The bucket assembly of claim 1, further comprising a unit latch comprising a unit latch body configured to pivot between a first extended position to extend out of one of the sidewalls of the unit housing and a second retracted position to reside inside the unit housing, wherein the unit latch further comprises a laterally extending linkage wherein the laterally extending linkage has opposing first and second end portions, with the first end portion coupled to the unit latch body and the second end portion residing adjacent the second handle cam in the unit housing.

6. The bucket assembly of claim 1, further comprising:
   first and second spaced apart disconnect switches, the first disconnect switch coupled to the first operator handle and the second disconnect switch coupled to the second operator handle;
   an intermediate wrapper that resides between the first and second disconnect switches in the unit housing, wherein the intermediate wrapper is parallel to the sidewalls of the unit housing and has a front edge that is forward of the first and second disconnect switches; and
   a unit latch assembly comprising a first unit latch and a laterally spaced apart second unit latch, wherein the first unit latch and the second unit latch are configured to pivot in concert whereby the first unit latch blocks the first operator handle from movement and the second unit latch blocks the second operator handle from movement when the first unit latch is in a retracted position inside the unit housing.

7. The bucket assembly of claim 6, further comprising a bracket coupled to the intermediate wrapper and coupled to the second unit latch, wherein the bracket is configured to allow the second unit latch to pivot in right and left directions, wherein when the first unit latch is in an extended position associated with the first unit latch extending out of one of the sidewalls confirming an installed bucket assembly placement in a cabinet, the first unit latch allows the first operator handle to move to the ON position and the second unit latch allows the second operator handle to move to the ON position.

8. The bucket assembly of claim 6, further comprising an externally accessible screw facing the front of the unit housing and coupled to the first unit latch, wherein a user rotates the externally accessible screw in a first direction to extend the first unit latch out of the sidewall to a latched position whereby the second unit latch concurrently pivots to a first position, and wherein a user rotates the externally accessible screw in a second opposing direction to retract the first unit latch into the unit housing to the retracted position whereby the second unit latch concurrently pivots to a second position.

9. The bucket assembly of claim 6, wherein the first unit latch and the second unit latch each comprise a shaft that is orthogonal to the first and second laterally extending shafts of the first and second operator handles, wherein the first and second unit latches each have a body with a curvilinear perimeter, upper and lower portions and a shoulder residing between the upper and lower portions, and wherein the shoulders are attached to the laterally extending linkage to couple the opposing end portions of the laterally extending linkage to the first and second unit latches.

10. The bucket assembly of claim 1, further comprising first and second spaced apart disconnect switches, the first disconnect switch coupled to the first operator handle and the second disconnect switch coupled to the second operator handle,
   wherein the first and second operator handles pivot vertically between a first position associated with the ON position (power conduction) and a second position associated with an OFF position (no power conduction).

11. The bucket assembly of claim 10, further comprising:
   a unit latch subsystem comprising a first unit latch and a laterally spaced apart second unit latch residing inside the unit housing, the first unit latch comprising a shaft and the second unit latch comprising a coupling feature; and
   a laterally extending linkage coupled to the first and second unit latches,
   wherein the shaft of the first unit latch is orthogonal to the first and second laterally extending shafts of the first and second operator handles, wherein the first and second unit latches are configured to pivot between latched and unlatched positions, wherein in the latched position, the first unit latch is configured to latch to a cabinet of a motor control center (MCC), and wherein when the bucket assembly is installed in the cabinet of the MCC (a) if either of the first and second disconnect switches are in an ON state with the first and second operator handles in the first position, the unit latch is in the latched position and the bucket assembly cannot be disengaged from the cabinet and (b) if both of the first and second disconnect switches are in an OFF state with the first and second operator handles in the second position, the unit latch is configured to be disengaged from the cabinet by a user rotating an externally accessible slot of a shaft coupled to the first unit latch whereby the first and second unit latches pivot in concert to the unlatched position.

12. The bucket assembly of claim 1, wherein each of the first and second handle cams comprises a plate with a curvilinear perimeter and a laterally inward extending ledge that is orthogonal to the plate, and wherein the ledge of the first handle cam contacts a first unit latch of a unit latch subsystem and the ledge of the second handle cam contacts a second unit latch of the unit latch subsystem when the unit latch subsystem is in the unlatched position.

13. The bucket assembly of claim 1, wherein the power connection assembly further comprises an internal lead screw that faces the front of the unit housing, wherein the bucket assembly further comprises:
    first and second spaced apart disconnect switches, the first disconnect switch coupled to the first operator handle and the second disconnect switch coupled to the second operator handle, wherein the first and second operator handles pivot vertically between a first position associated with the ON position and a second position associated with an OFF position;
    a shutter with a shutter portal that is in front of the internal lead screw, closer to the front of the unit housing;
    a first shutter cam in the unit housing and coupled to the first operator handle and a second shutter cam in the unit housing and coupled to the second operator handle; and
    a biasing member coupled to one side of the shutter and the unit housing, wherein, when both the first and second shutter cams are disengaged from the shutter, the biasing member mechanically slides the shutter laterally to align the shutter portal with the internal lead screw to thereby allow access to the internal lead screw, wherein the first and second shutter cams are configured to engage the shutter to slide the shutter portal laterally to block access to the internal lead screw if either of the first and second operator handles is in the ON position.

14. The bucket assembly of claim 13, wherein the biasing member comprises a coil spring.

15. The bucket assembly of claim 13, wherein the shutter comprises a primary body with the shutter portal and outwardly extending and laterally spaced apart first, second and third projections, wherein the first projection engages the first shutter cam, the second projection engages the second shutter cam, and the third projection is coupled to the biasing member.

16. A motor control center comprising the bucket assembly of claim 1.

17. A method of operating a unit of a Motor Control Center (MCC), comprising:
    providing a unit with a retractable/extendable power connection assembly, a unit latch and a power connection position interlock, both selectively in communication with first and second handle cams of respective first and second operator handles of the unit;
    concurrently blocking movement of the first and second handle cams of the first and second operator handles of the unit by the unit latch if the unit latch is not engaged with a cabinet of the MCC;
    concurrently blocking movement of the first and second handle cams of the unit by the power connection position interlock if the power connection assembly is not in an extended position;
    rotating the unit latch from an unlatched position to a latched position whereby the unit latch engages the cabinet and allows the first and second handle cams to rotate inward past the unit latch; and
    pivoting the power connection position interlock in response to movement of a carriage of the power connector assembly to allow the first and second operator handles to rotate past the power connection position interlock when the power connector assembly is in the extended position.

18. The method of claim 17, wherein the unit latch and the power connection position interlock are both coupled to a mount bracket attached to one sidewall of the unit, with the unit latch residing in front of the power connection position interlock closer to a front of the unit, wherein the pivoting of the power connection position interlock is carried out by contacting an upwardly extending leg of the power connection position interlock with a coupler attached to a carriage of the power connection assembly, and wherein the blocking movement of the first and second handle cams of the unit by the power connection position interlock is carried out by pivoting a pivot plate down so the pivot plate of the power connection position interlock concurrently blocks the first and second handle cams from rotation toward an On position.

19. The method of claim 18, wherein the unit latch comprises first and second unit latches that pivot in concert as the first unit latch pivots between a latched position and an unlatched position.

20. The method of claim 19, wherein the first unit latch is configured to pivot to extend outside a unit housing to engage the cabinet when in the latched position while the second unit latch resides entirely inside the unit housing, and wherein the first unit latch blocks the first handle cam and the second unit latch blocks the second handle cam when the first unit latch is in the unlatched position.

* * * * *

UNITED STATES PATENT AND TRADEMARK OFFICE
CERTIFICATE OF CORRECTION

PATENT NO. : 11,177,088 B2
APPLICATION NO. : 16/795702
DATED : November 16, 2021
INVENTOR(S) : Tyleshevski et al.

It is certified that error appears in the above-identified patent and that said Letters Patent is hereby corrected as shown below:

In the Specification

Column 12, Line 47: Please correct "lever of" to read -- lever 35 of --

Column 13, Line 24: Please correct ""P"" to read -- "β" --

Column 14, Line 36: Please correct "4101" to read -- 410*l* --

Column 17, Line 41: Please correct "175/that" to read -- 175*l* that --

Column 18, Line 14: Please correct "175/attached" to read -- 175*l* attached --

Column 20, Line 55: Please correct "extent 13" to read -- extent β --

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*